(12) United States Patent
Cao et al.

(10) Patent No.: US 9,669,744 B2
(45) Date of Patent: Jun. 6, 2017

(54) SEAT BACK FOR VEHICLE SEAT

(71) Applicant: FAURECIA AUTOMOTIVE SEATING, LLC., Troy, MI (US)

(72) Inventors: Yang Cao, Troy, MI (US); John M. Perraut, Rochester Hill, MI (US); Ravikant K. Deore, Nashik (IN); Adrian Negrut, Windsor (CA); Kevin L. Wright, Highland, MI (US); Lola Lafferty, Capac, MI (US); Harsh Bhagat, Rochester, MI (US); Todd Sieting, Clarkston, MI (US); Benjamin Louis, Royal Oak, MI (US); Olivier Boinais, West Bloomfield, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 5 days.

(21) Appl. No.: 14/764,628

(22) PCT Filed: Feb. 18, 2014

(86) PCT No.: PCT/US2014/016899
§ 371 (c)(1),
(2) Date: Jul. 30, 2015

(87) PCT Pub. No.: WO2014/127355
PCT Pub. Date: Aug. 21, 2014

(65) Prior Publication Data
US 2016/0009209 A1  Jan. 14, 2016

Related U.S. Application Data

(60) Provisional application No. 61/766,030, filed on Feb. 18, 2013.

(51) Int. Cl.
A47C 7/02 (2006.01)
A47C 7/18 (2006.01)
(Continued)

(52) U.S. Cl.
CPC .............. *B60N 2/686* (2013.01); *B60N 2/22* (2013.01); *B60N 2/4249* (2013.01);
(Continued)

(58) Field of Classification Search
CPC ...... B60N 2/22; B60N 2/4249; B60N 2/4802; B60N 2/58; B60N 2/5816; B60N 2/66; B60N 2/686
(Continued)

(56) References Cited

U.S. PATENT DOCUMENTS 5,328,248 A * 7/1994 Nishiyama ............. B60N 2/071
297/452.18
5,468,050 A * 11/1995 Hall ......................... B60N 2/00
297/452.18 X (Continued)

FOREIGN PATENT DOCUMENTS

WO 2008/019981 A1 2/2008
WO 2010/101874 A1 9/2010

OTHER PUBLICATIONS

PCT International Search Report and Written Opinion completed by the ISA/EP on May 19, 2014 and issued in connection with PCT/US2014/016899.
(Continued)

*Primary Examiner* — Rodney B White
(74) *Attorney, Agent, or Firm* — Barnes & Thornburg LLP

(57) ABSTRACT

A vehicle seat includes a seat bottom (16) and a seat back (18) extending upwardly from the seat bottom. The seat back (18) includes a backrest and a backrest cover (28) coupled to the backrest, said backrest including a backrest frame (26) made from composite materials.

16 Claims, 34 Drawing Sheets

(51) Int. Cl.
*A47C 7/24* (2006.01)
*A47C 31/02* (2006.01)
*B60N 2/68* (2006.01)
*B60N 2/48* (2006.01)
*B60N 2/58* (2006.01)
*B60N 2/66* (2006.01)
*B60N 2/42* (2006.01)
*B60N 2/22* (2006.01)

(52) U.S. Cl.
CPC .............. *B60N 2/4802* (2013.01); *B60N 2/58* (2013.01); *B60N 2/5816* (2013.01); *B60N 2/66* (2013.01)

(58) Field of Classification Search
USPC .............. 297/216.1, 216.13, 216.14, 452.14, 297/452.18, 452.2, 218.1–218.5, 452.56
See application file for complete search history.

(56) References Cited

U.S. PATENT DOCUMENTS

| | | | |
|---|---|---|---|
| 5,918,943 A * | 7/1999 | Mitschelen | B60N 2/68 297/452.18 X |
| 5,988,757 A | 11/1999 | Vishey et al. | |
| 6,027,171 A * | 2/2000 | Partington | B60N 2/0232 297/452.18 X |
| 6,056,366 A * | 5/2000 | Haynes | B60N 2/688 297/216.1 |
| 6,152,534 A * | 11/2000 | Maeda | B60N 2/5825 297/218.3 |
| 6,231,125 B1 * | 5/2001 | Maeda | A47C 7/282 297/452.56 X |
| 6,375,269 B1 * | 4/2002 | Maeda | A47C 7/282 297/218.2 |
| 6,378,949 B1 * | 4/2002 | Maeda | B60N 2/5825 297/452.56 |
| 6,478,381 B1 | 11/2002 | Cramb, III et al. | |
| 6,607,247 B2 * | 8/2003 | Becker | B60N 2/4228 297/216.13 |
| 6,896,324 B1 * | 5/2005 | Kull | B60N 2/4242 297/216.1 |
| 6,994,401 B1 * | 2/2006 | Fischer | A47C 7/725 297/452.14 X |
| 7,252,341 B2 * | 8/2007 | Kircher | B60N 2/449 297/452.24 |
| 7,416,256 B2 * | 8/2008 | Fujita | B60N 2/502 297/216.1 |
| 7,850,246 B2 * | 12/2010 | Kolich | B60N 2/70 297/452.14 X |
| 8,690,255 B2 * | 4/2014 | Yamaki | B60N 2/4228 297/216.14 |
| 8,708,418 B2 * | 4/2014 | Mizobata | B60N 2/5825 297/452.56 X |
| 8,801,094 B2 * | 8/2014 | Nishiura | B60N 2/7011 297/218.1 |
| 8,894,154 B2 * | 11/2014 | Kulkarni | B60N 2/686 297/452.14 X |
| 8,973,990 B2 * | 3/2015 | Krupiczewicz | A47C 31/02 297/218.1 |
| 9,039,093 B2 * | 5/2015 | Nishiura | B60N 2/68 297/216.13 |
| 9,393,891 B2 * | 7/2016 | Beier | B60N 2/4492 |
| 2002/0060493 A1 * | 5/2002 | Nishino | B60N 2/58 297/452.56 |
| 2002/0117882 A1 * | 8/2002 | Takezawa | B60N 2/5825 297/218.1 |
| 2003/0116999 A1 * | 6/2003 | Fujita | B60N 2/4228 297/216.13 |
| 2004/0183356 A1 * | 9/2004 | Philippot | B60N 2/70 297/452.18 |
| 2004/0227389 A1 * | 11/2004 | Yoshida | B60N 2/64 297/452.18 |
| 2005/0168041 A1 * | 8/2005 | Glance | B60N 2/68 297/452.18 |
| 2005/0236884 A1 * | 10/2005 | Neale | B60N 2/5816 297/452.56 |
| 2008/0136240 A1 * | 6/2008 | Matthews | B60N 2/4235 297/452.18 X |
| 2010/0219674 A1 * | 9/2010 | Sakkinen | B60N 2/0722 297/452.18 |
| 2011/0057498 A1 * | 3/2011 | Fujita | B60N 2/0705 297/452.18 |
| 2011/0169317 A1 * | 7/2011 | Fujita | A47C 7/02 297/452.2 |
| 2011/0278892 A1 * | 11/2011 | Kroener | B23K 20/122 297/452.18 |
| 2012/0169107 A1 * | 7/2012 | Sakkinen | B23K 26/32 297/452.18 |
| 2012/0217775 A1 * | 8/2012 | Fujita | B60N 2/4221 297/216.13 |
| 2012/0313409 A1 * | 12/2012 | Michalak | B60N 2/56 297/216.1 |
| 2013/0082504 A1 * | 4/2013 | Archambault | B60N 2/68 297/452.18 |
| 2013/0320742 A1 * | 12/2013 | Murolo | B60N 2/68 297/452.18 |
| 2013/0334862 A1 * | 12/2013 | Gibbs | B60N 2/682 297/452.18 |
| 2015/0008716 A1 * | 1/2015 | Dry | B60N 2/44 297/452.18 |
| 2015/0145303 A1 * | 5/2015 | Line | B60N 2/643 297/452.18 X |
| 2015/0165948 A1 * | 6/2015 | Kish | B60N 2/68 297/452.18 X |

OTHER PUBLICATIONS

Chinese Office Action for Chinese Application Serial No. 201480009130.X received Sep. 27, 2016, 13 pages.

* cited by examiner

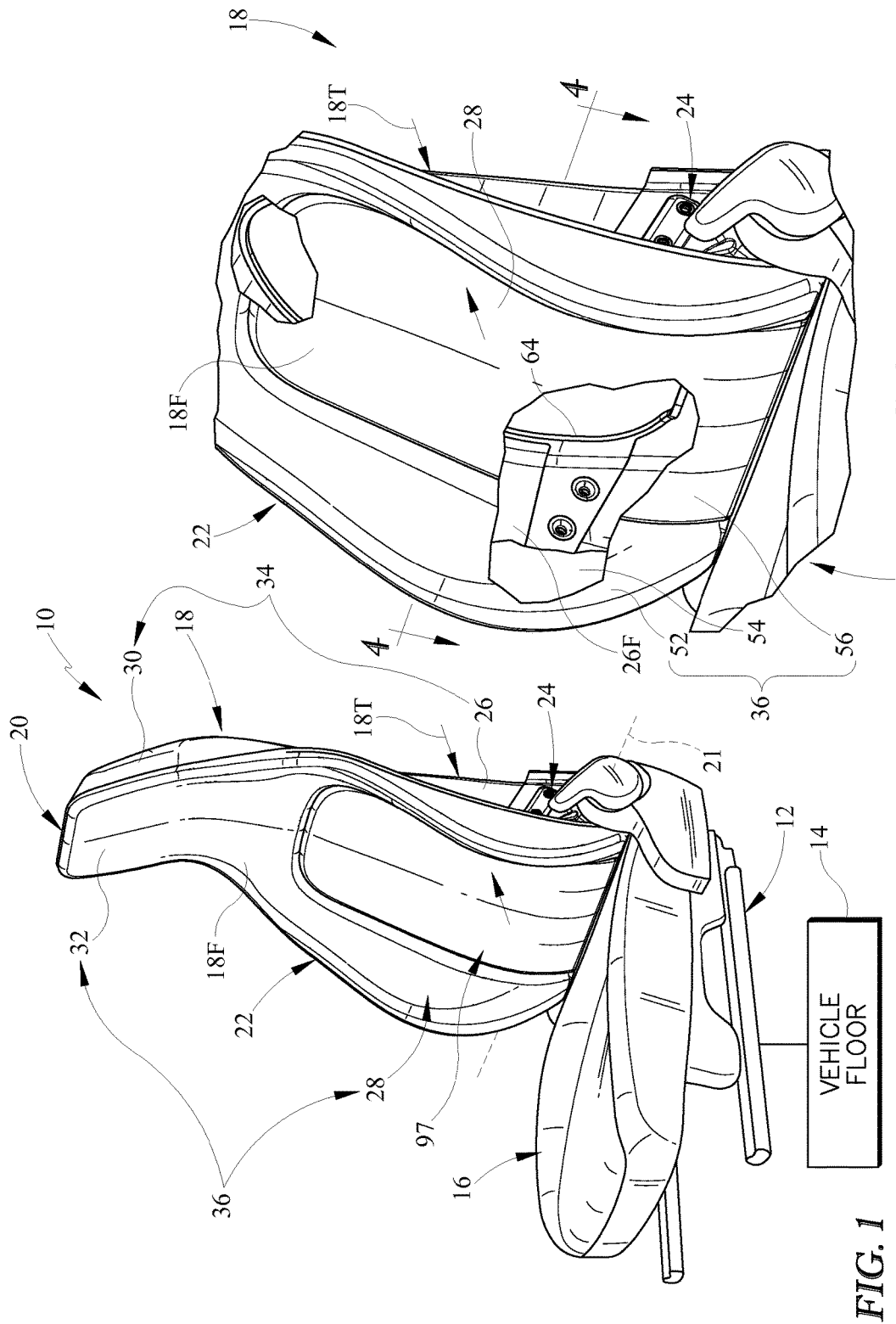

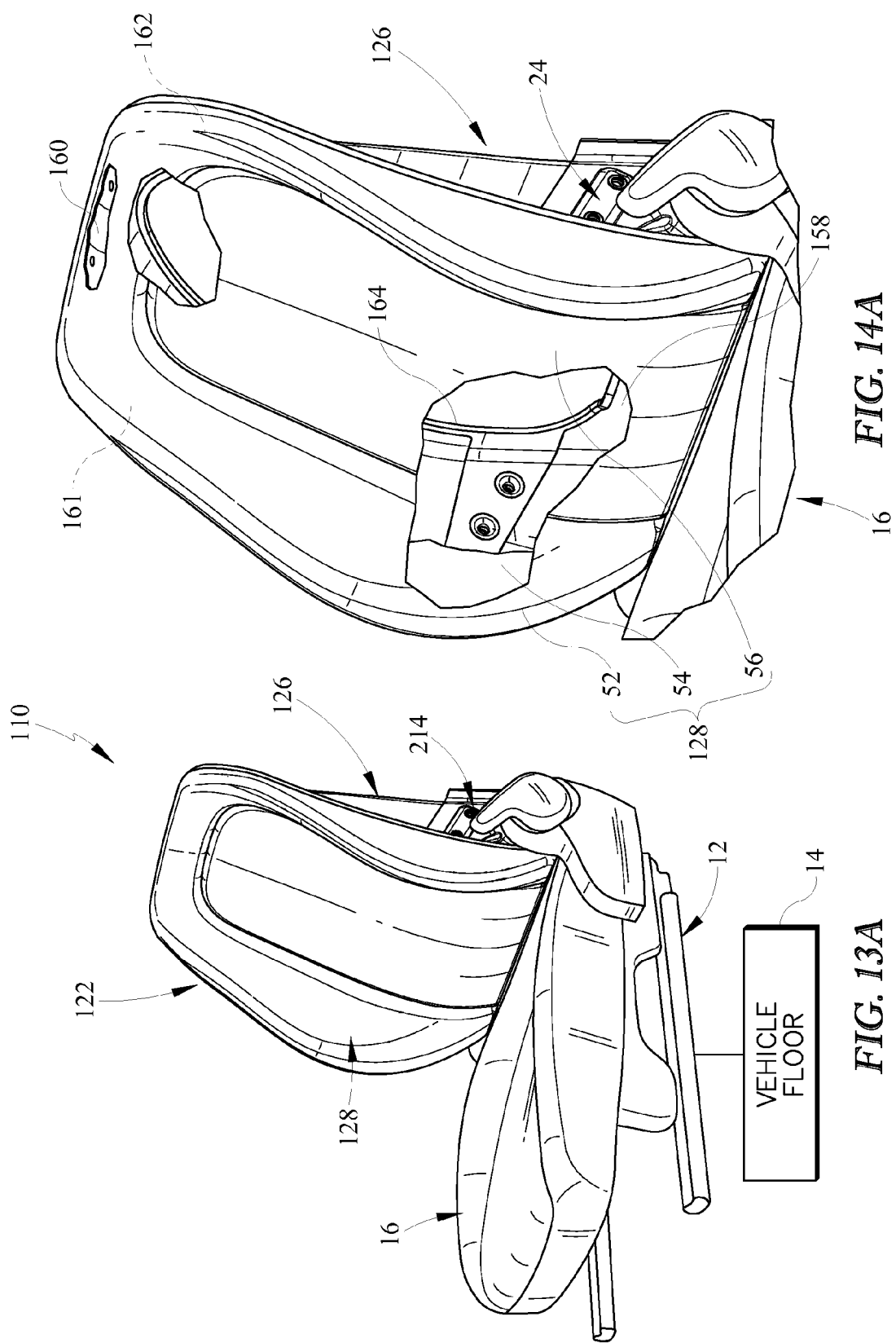

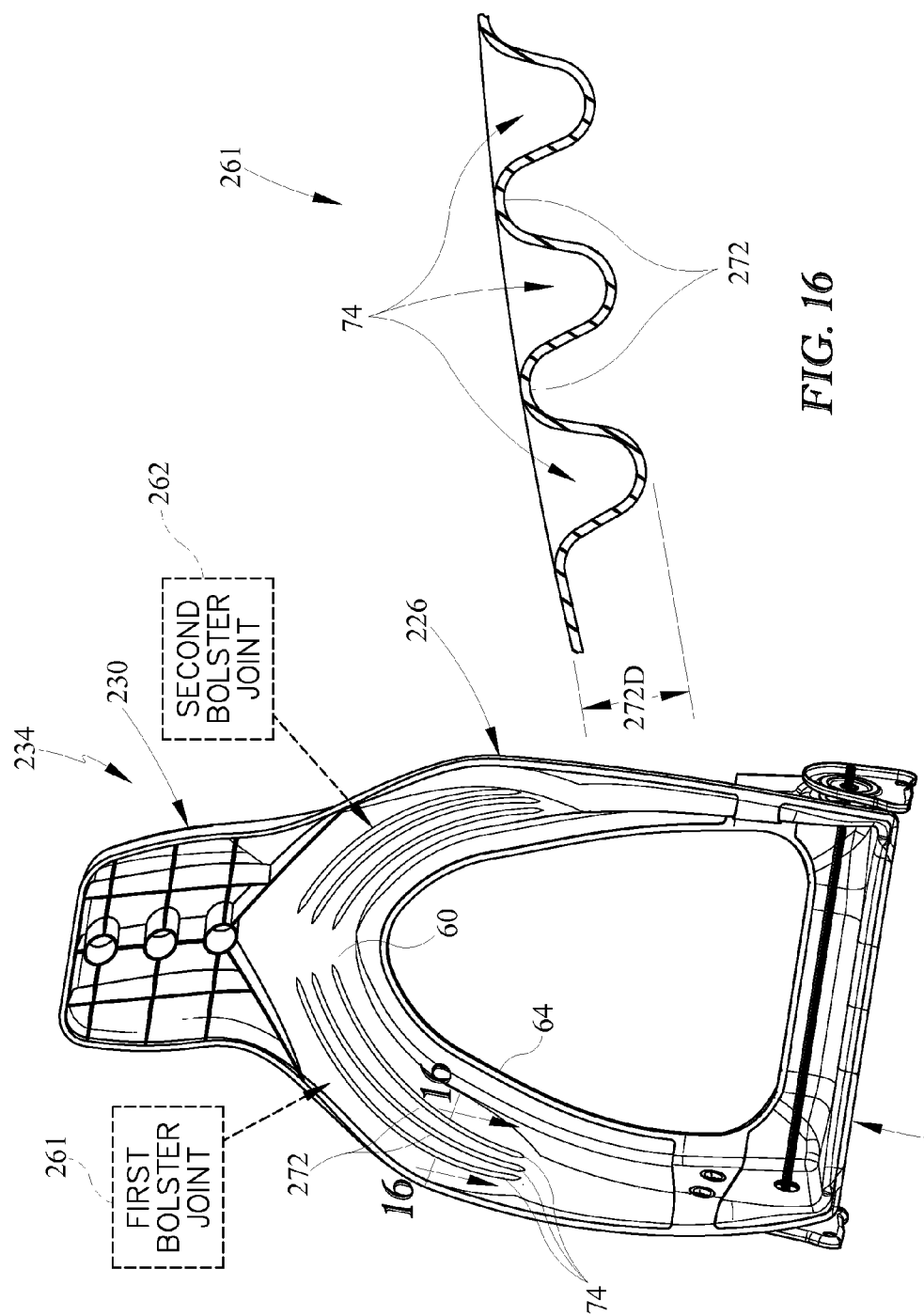

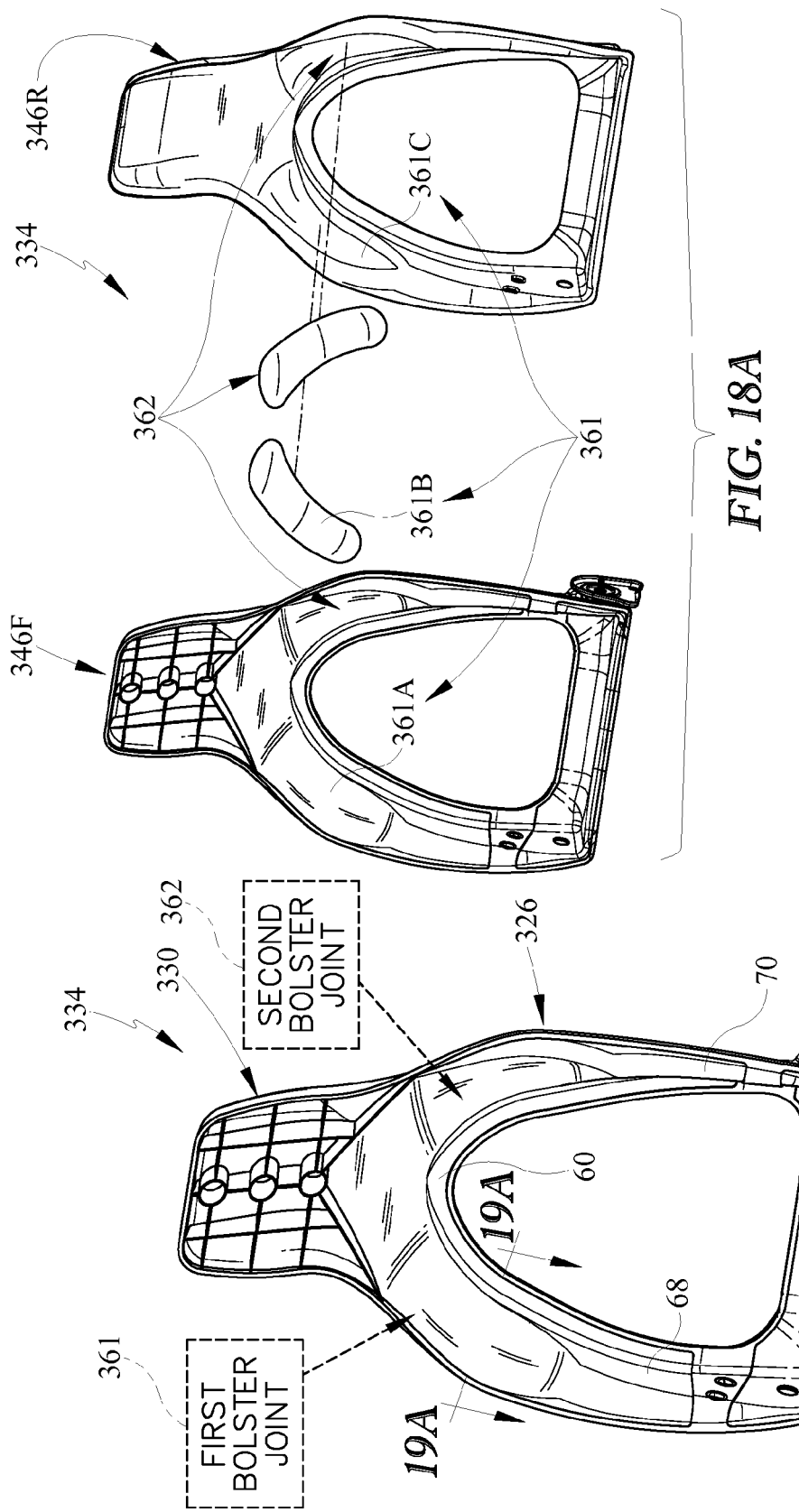

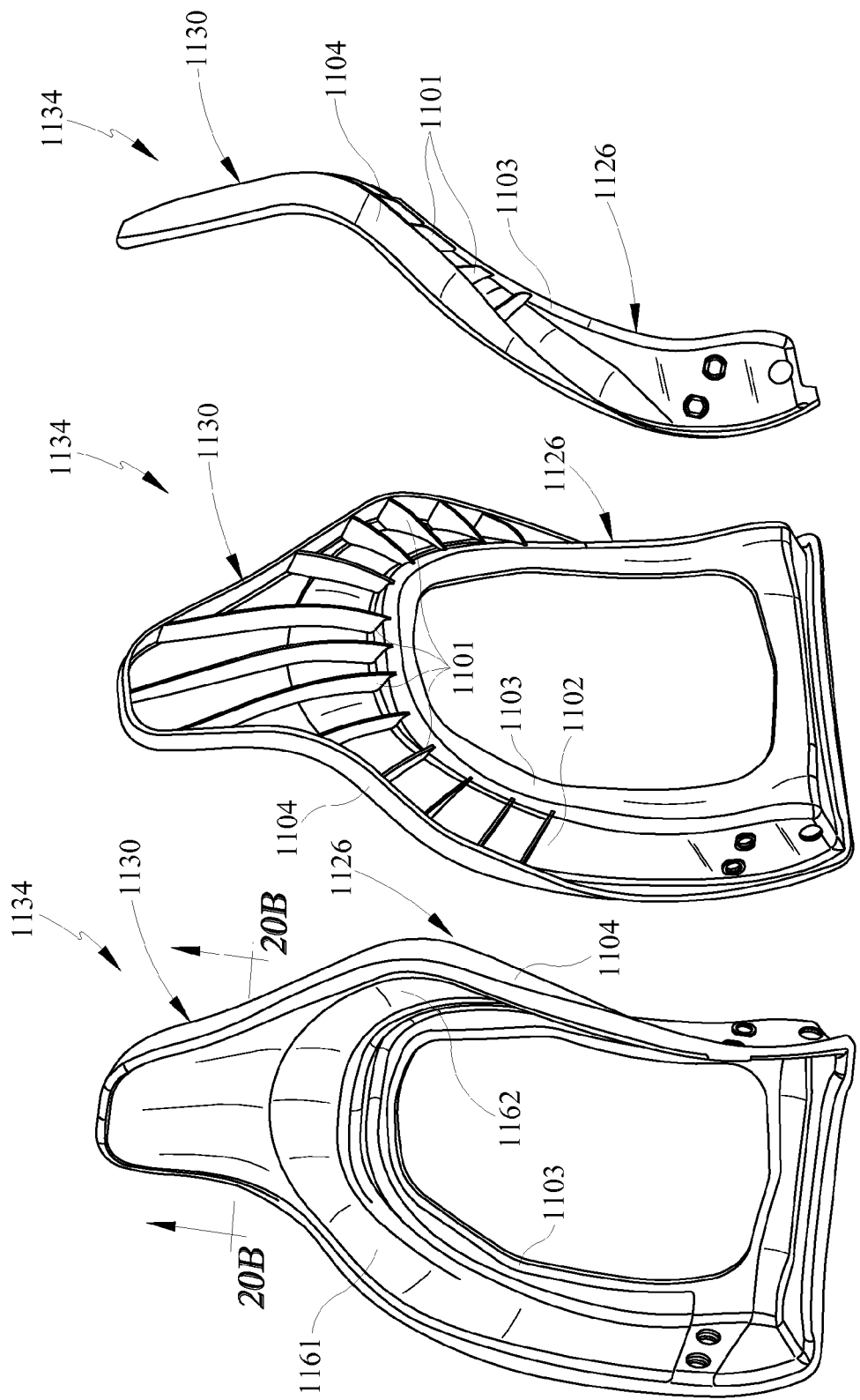

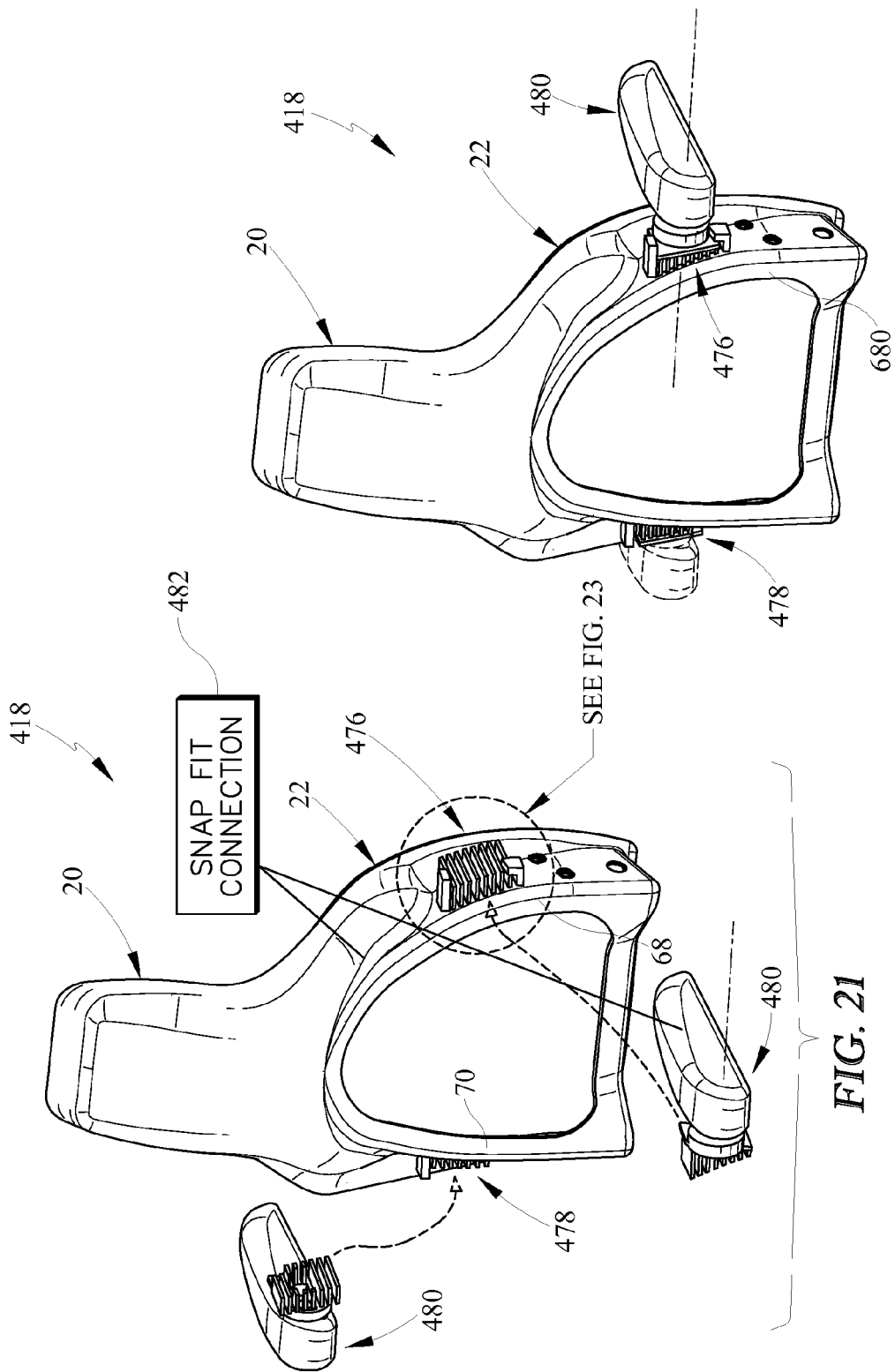

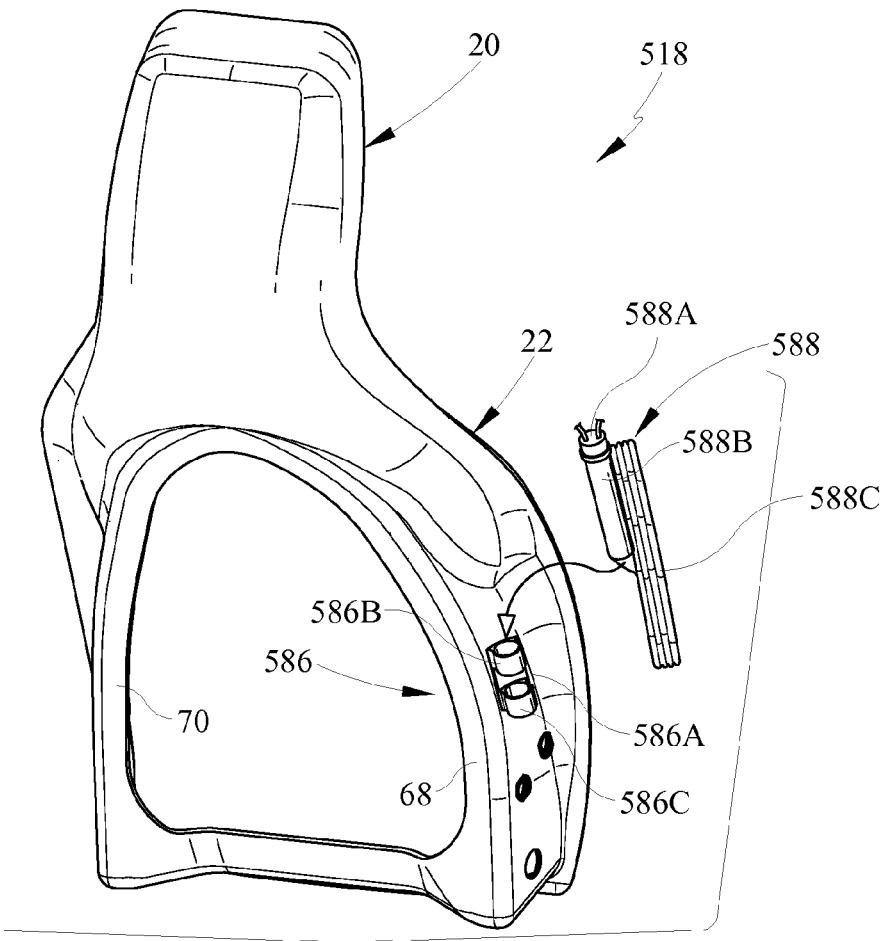
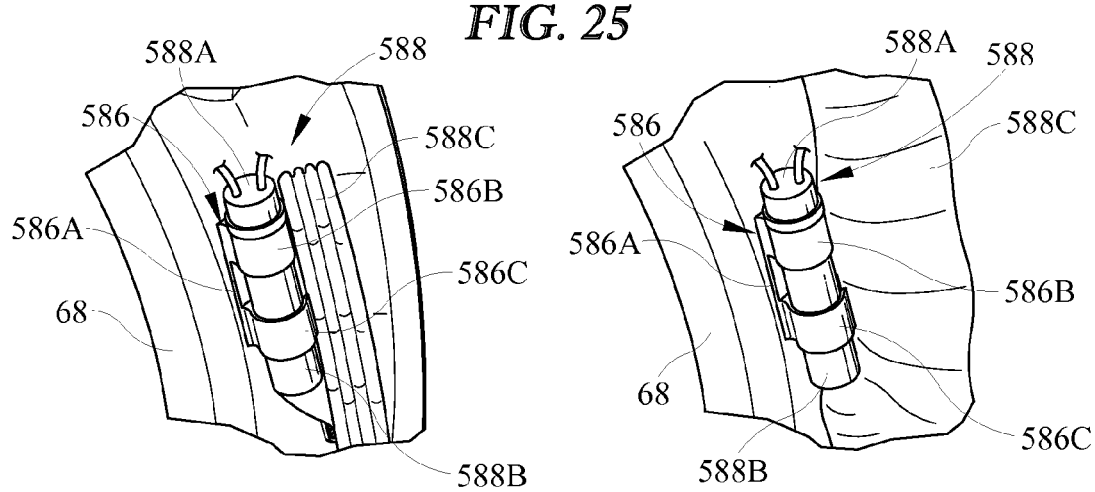
FIG. 25
FIG. 26   FIG. 27

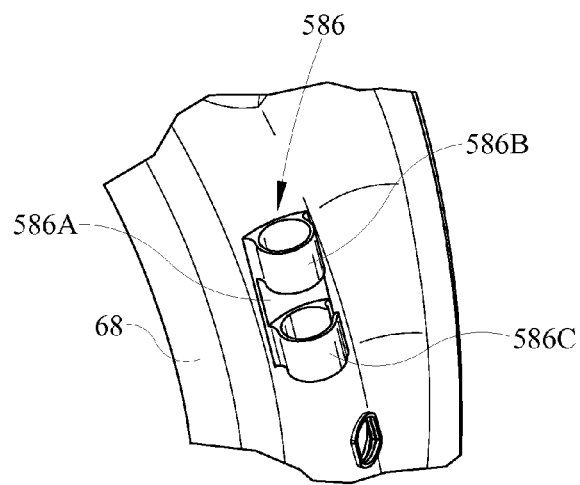
FIG. 28A
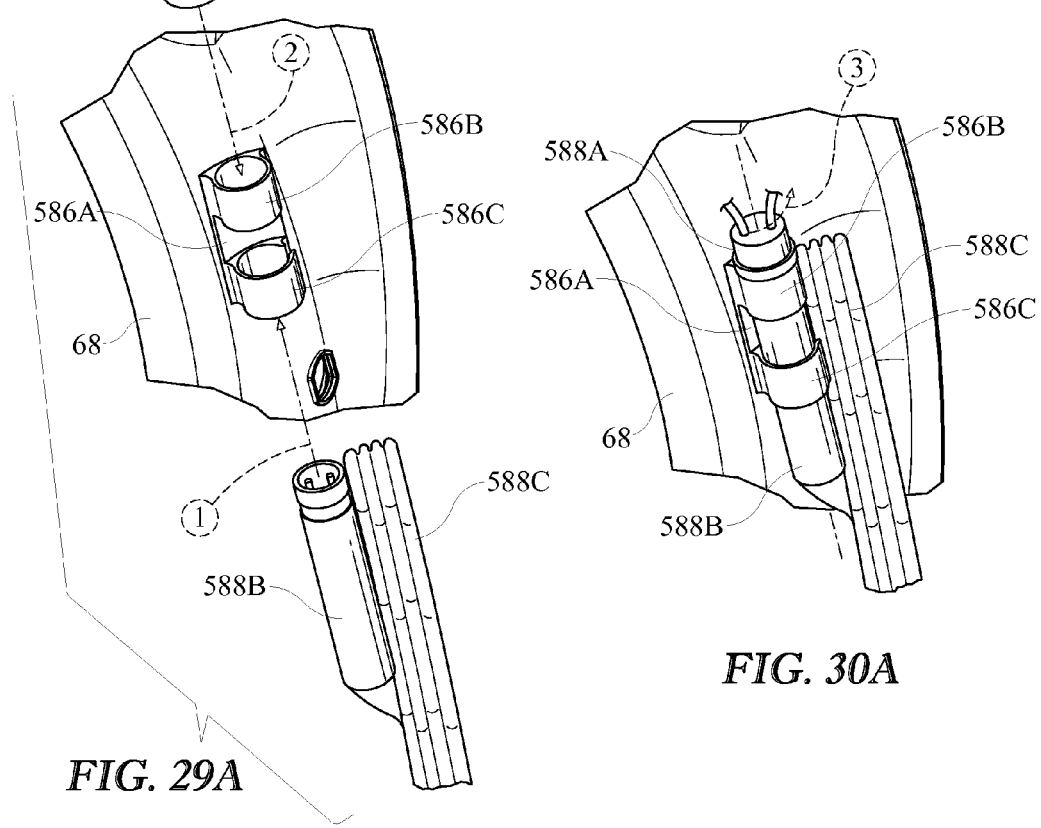
FIG. 29A
FIG. 30A

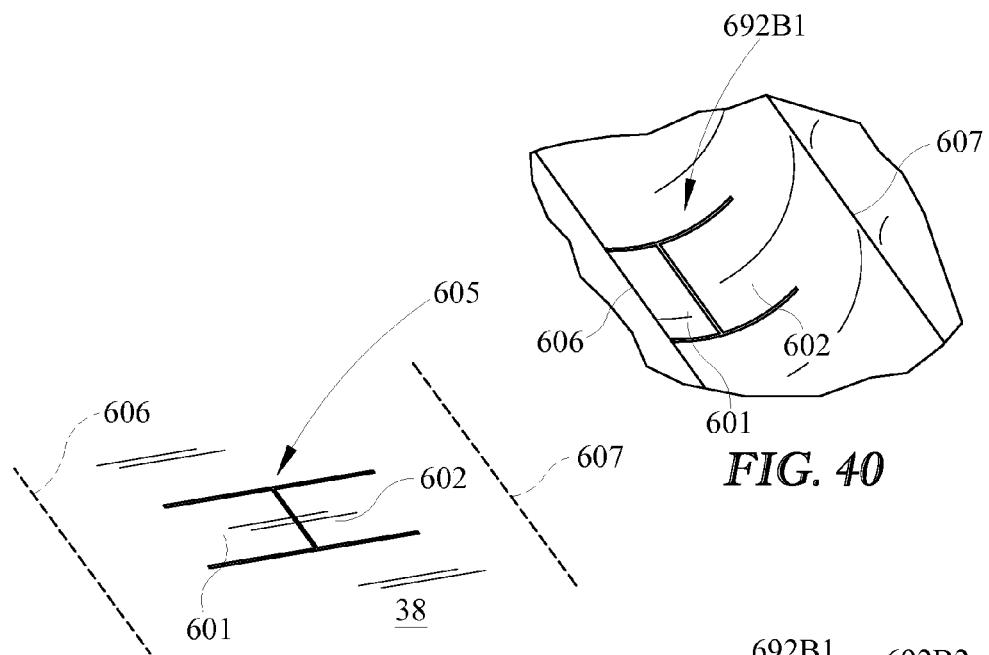
FIG. 39
FIG. 40
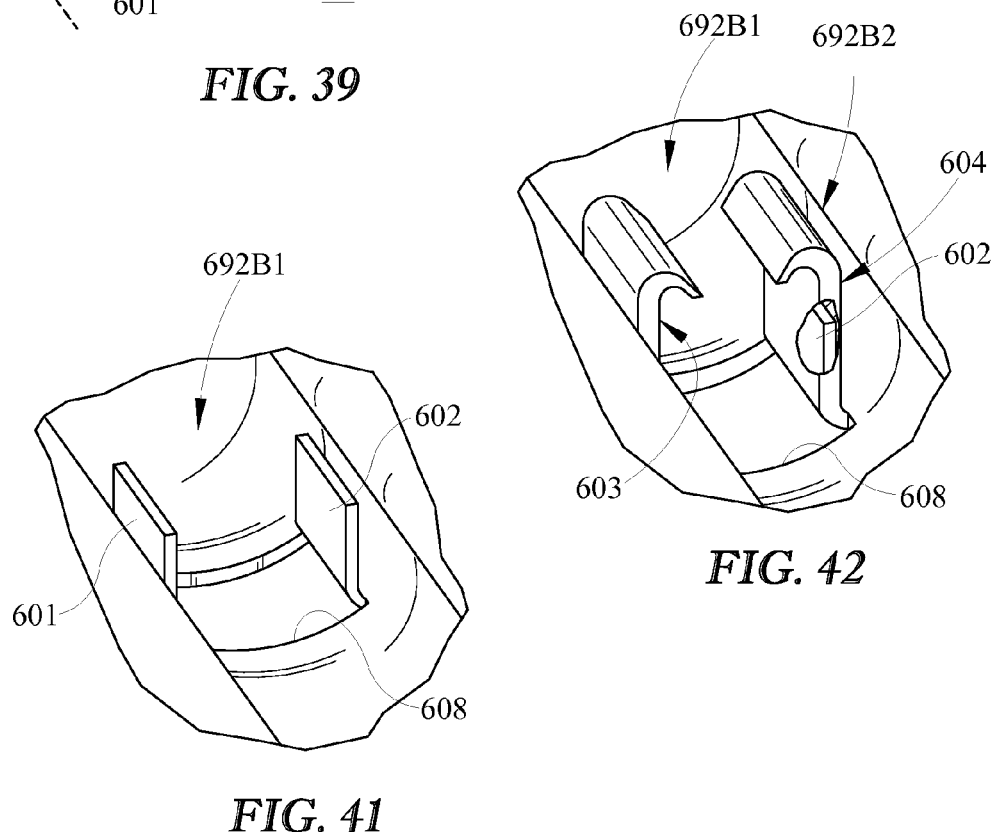
FIG. 41
FIG. 42

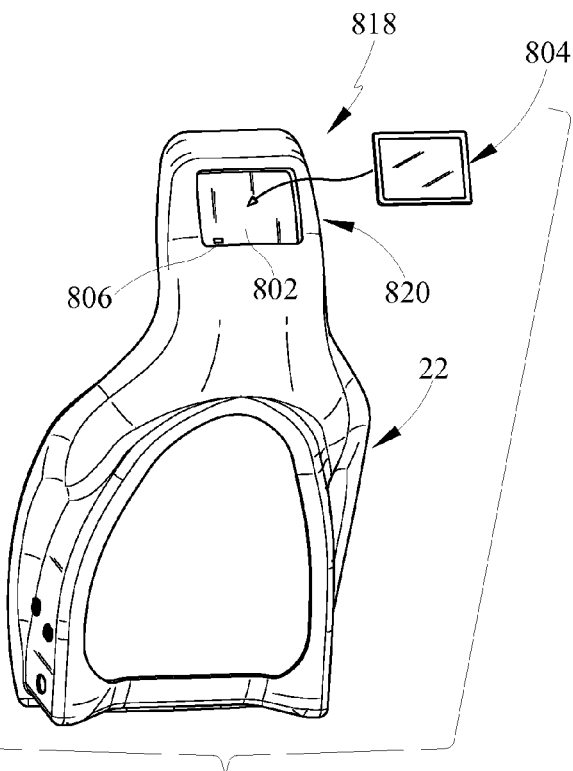
FIG. 49
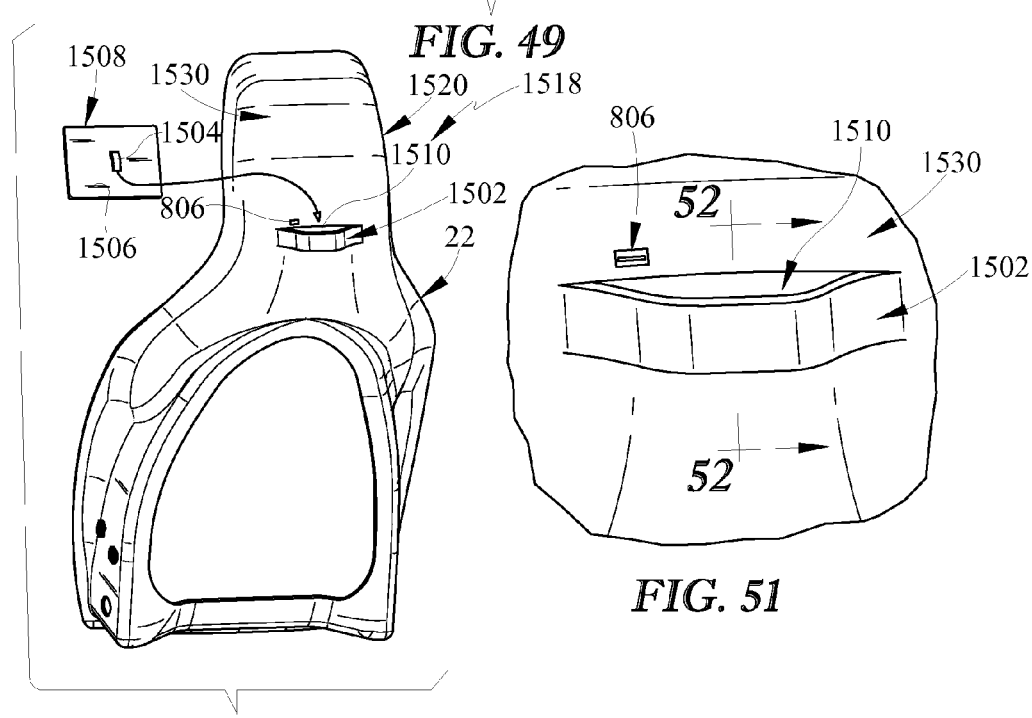
FIG. 50
FIG. 51

SEAT BACK FOR VEHICLE SEAT

CROSS REFERENCE TO RELATED APPLICATIONS

This application is a U.S. national counterpart application of international application serial No. PCT/US2014/016899 filed Feb. 18, 2014, which claims priority to U.S. Provisional Application No. 61/766,030, filed Feb. 18, 2013, which are expressly incorporated by reference herein.

BACKGROUND

The present disclosure relates to vehicles seats, and particularly to vehicle seats with seat bottoms and seat backs. More particularly, the present disclosure relates to a seat back including in a seat-back frame and a seat-back cover coupled to the seat-back frame.

SUMMARY

According to the present disclosure, a vehicle seat includes a seat bottom and a seat back extending upwardly from the seat bottom. The seat back includes a backrest and a backrest cover coupled to the backrest.

In illustrative embodiments, the backrest includes a backrest frame made from composite materials and a backrest cover coupled to the backrest frame to cover a forward face of the backrest frame. Together the backrest frame and the backrest cover cooperate to provide means for establishing a sympathetic shape in response to an occupant applying a force to the backrest when an occupant rests on the vehicle seat to cause the force to be distributed over the front face of the backrest cover so that a reaction force applied back to an occupant is minimized and to cause a weight and a thickness of the seat back to be minimized while strength of the seat back is maximized so that the vehicle seat withstands application of an external impact force to the vehicle seat while an occupant is resting on the vehicle seat.

In illustrative embodiments, the backrest cover includes a backrest pad configured to cover the forward face of the backrest frame, an elastics support web arranged to extend over and cover a backrest aperture formed in the backrest frame and an inner cover mount. The inner cover mount is arranged to interconnect the backrest pad and the backrest frame along the backrest aperture. The inner cover mount is configured to provide means for coupling the elastic support web to the backrest frame along a path to cause the elastic support web to form a lumbar support so that a lumbar region of an occupant is supported when an occupant is resting on the vehicle seat.

In a further embodiment, a vehicle seat comprises a seat bottom and a seat back coupled to the seat bottom to extend upwardly away from the seat bottom. The seat back includes a backrest adapted to support a back of an occupant resting on the vehicle seat and a backrest mount arranged to interconnect the backrest and the seat bottom to cause the backrest to pivot back and forth about a pivot axis relative to the seat bottom.

In a further embodiment, the backrest includes a backrest frame made from composite materials and a backrest cover. The backrest has a forward surface adapted to face toward an occupant and an opposite rear surface arranged to face opposite the forward surface. The backrest cover is coupled to the backrest frame and includes a rear face arranged to face toward and cover the forward surface of the backrest frame and a front face arranged to face opposite the rear face.

In a further embodiment, the backrest includes a backrest frame and a backrest cover. Together, the backrest frame and the backrest cover cooperate to provide means for establishing a sympathetic shape in response to an occupant applying a force to the backrest when an occupant rests on the vehicle seat to cause the force to be distributed over the front face of the backrest cover so that a reaction force applied back to an occupant is minimized and to cause a weight and a thickness of the seat back to be minimized while strength of the seat back is maximized so that the vehicle seat withstands application of an external impact force to the vehicle seat while an occupant is resting on the vehicle seat.

In a further embodiment, a vehicle seat comprises a seat bottom and a seat back coupled to the seat bottom to extend upwardly away from the seat bottom. The seat back includes a backrest and a backrest mount arranged to interconnect the backrest and the seat bottom to cause the backrest to pivot back and forth about a pivot axis relative to the seat bottom. The backrest includes a backrest frame made from composite materials and having a forward surface adapted to face toward an occupant and an opposite rear surface arranged to face opposite the forward surface and a backrest cover being coupled to the backrest frame to move therewith and including a rear face arranged to face toward and cover the forward surface of the backrest frame and a front face arranged to face opposite the rear face.

In a further embodiment, the backrest frame includes a backrest foundation, particularly a U-shaped backrest foundation, coupled to the seat bottom by the backrest mount, a horizontal bolster spaced apart from the backrest foundation to locate the backrest foundation between the seat bottom and the horizontal bolster, and first and second bolster joints interconnecting and the backrest foundation and the horizontal bolster.

In a further embodiment, the backrest foundation includes a backrest base, a first upright bolster arranged to extend between and interconnect the first bolster joint and a first end of the backrest base, and a second upright bolster spaced apart from the first bolster joint and arranged to extend between and interconnect second bolster joint and an opposite second end of the backrest base.

In a further embodiment, the backrest foundation, the horizontal bolster, and first and second bolster joints cooperate to define a backrest aperture formed in the backrest frame.

In a further embodiment, the seat back further includes a headrest adapted to support a head of an occupant resting on the vehicle seat, coupled to the backrest to extend away from the seat bottom and to locate the backrest between the headrest and the seat bottom In a further embodiment, the headrest includes a headrest frame made from composite material and having a forward surface adapted to face toward an occupant and an opposite rear surface arranged to face opposite the forward surface of the headrest frame and a headrest cover coupled to the headrest frame and having a rear face arranged to face toward and cover the forward surface of the headrest frame and a front face arranged to face opposite the rear face of the headrest cover.

In a further embodiment, the headrest frame and the backrest frame cooperate with the headrest frame to establish a monolithic seat-back frame included in the vehicle seat.

In a further embodiment, the backrest cover further includes an elastic support web.

In a further embodiment, the backrest cover includes a backrest sheet providing the front face of the backrest cover and being located in spaced-apart relation to the forward surface of the backrest frame and a backrest cushion providing the rear face of the backrest cover and being located between the backrest frame and the backrest sheet.

In a further embodiment, the elastic support web is coupled to the backrest sheet and the backrest cushion and arranged to extend over and cover a backrest aperture formed in the backrest frame.

In a further embodiment, the backrest cover further includes an inner cover mount arranged to interconnect the backrest sheet and the backrest cushion.

In a further embodiment, the inner cover mount interconnects the backrest sheet and the backrest cushion to the backrest frame along a backrest aperture formed in the backrest and configured to provide means for coupling the elastic support web to the backrest frame along a path to cause the elastic support web to form a lumbar support so that a lumbar region of an occupant is supported when an occupant is resting on the vehicle seat.

In a further embodiment, the backrest cover further includes an outer cover mount arranged to interconnect the backrest sheet and the backrest cushion.

In a further embodiment, the outer cover mount interconnects the backrest sheet and the backrest cushion to the opposite rear surface of the backrest frame to cause the backrest cover to cover the forward surface of the backrest frame and extend from the opposite rear surface of the backrest frame to a backrest aperture formed in the backrest.

In a further embodiment, the composite materials of the backrest frame include a frame body made from a continuous fiber reinforced sheet and a skin made from plastics materials.

In a further embodiment, the skin is located between the frame body and the backrest cover and provides the forward surface of the backrest frame.

In a further embodiment, the backrest cover includes a backrest pad arranged to cover the forward surface of the backrest frame, an elastic support web arranged to extend over and cover a backrest aperture formed in the backrest frame, and an inner cover mount provided by the skin of the backrest frame.

In a further embodiment, the inner cover mount is arranged to interconnect the backrest pad to the backrest frame along the backrest aperture and configured to provide means for coupling the elastic support web to the backrest frame along a path to cause the elastic support web to form a lumbar support so that a lumbar region of an occupant is supported when an occupant is resting on the vehicle seat.

In a further embodiment, the backrest pad, the elastic support web, and the inner cover mount are arranged to couple the backrest pad to the backrest frame along a path to cause the elastic support web to form a lumbar support.

In a further embodiment, the backrest mount includes a pair of bushings coupled to associated bushing receivers formed in the backrest frame to cause the pair of bushings to extend through the backrest frame from the forward surface to the opposite rear surface.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a front perspective view of a first embodiment of a vehicle seat in accordance with the present disclosure showing that the vehicle seat includes a seat bottom and a seat back mounted on an underlying seat foundation coupled to a floor of a vehicle and showing that the seat back provides a headrest, a backrest coupled to the headrest, and a backrest mount interconnecting the backrest and the seat bottom;

FIG. 2 is an enlarged partial perspective view of the seat back of FIG. 1, with portions broken away, showing that the seat back includes a monolithic seat-back frame and a seat-back cover overlying portions of the monolithic seat-back frame to provide comfort and support to an occupant resting on the vehicle seat;

Figure 3:
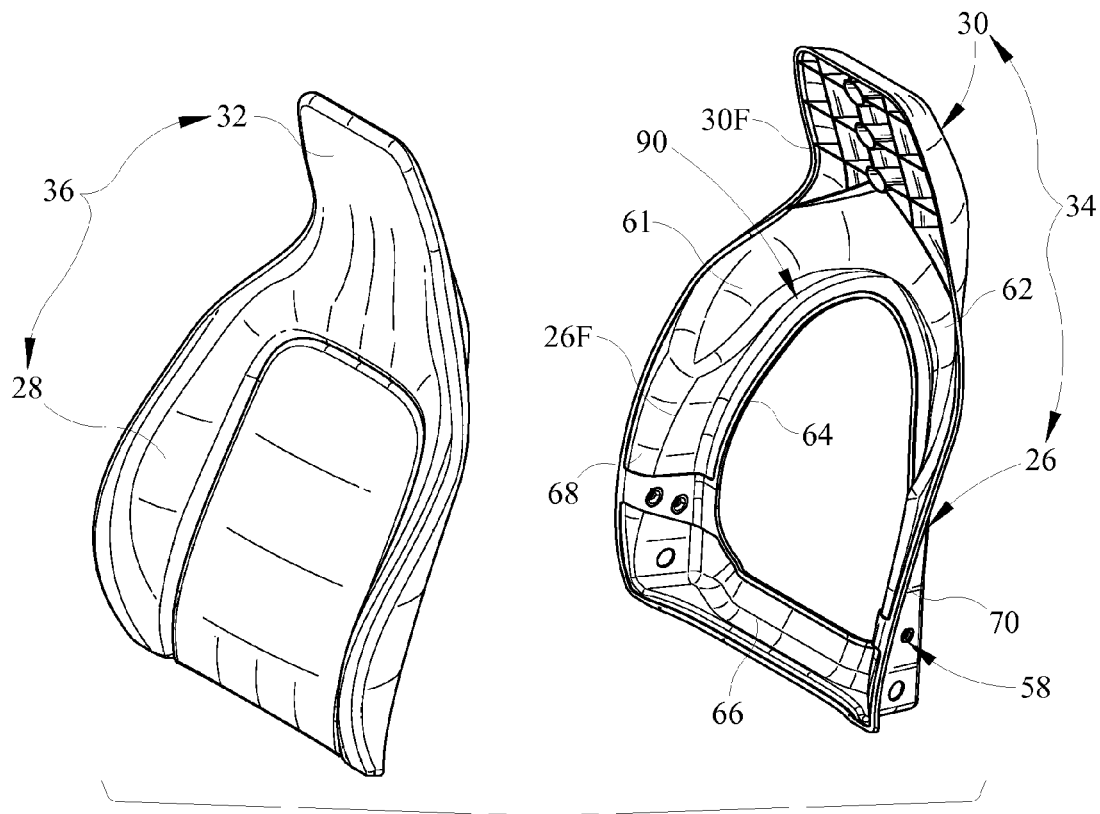
FIG. 3 is an exploded assembly view of the seat back of FIG. 2 showing that the seat back includes, from left to right, the seat-back cover and the monolithic seat-back frame.
Figure 4:
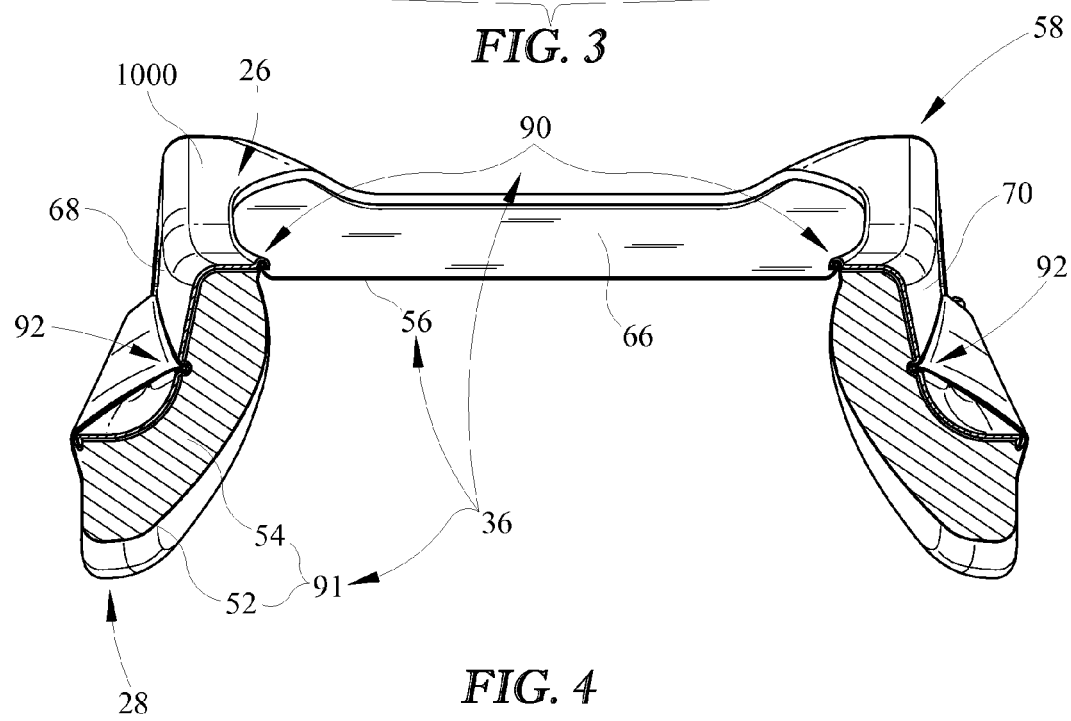
Figure 5:
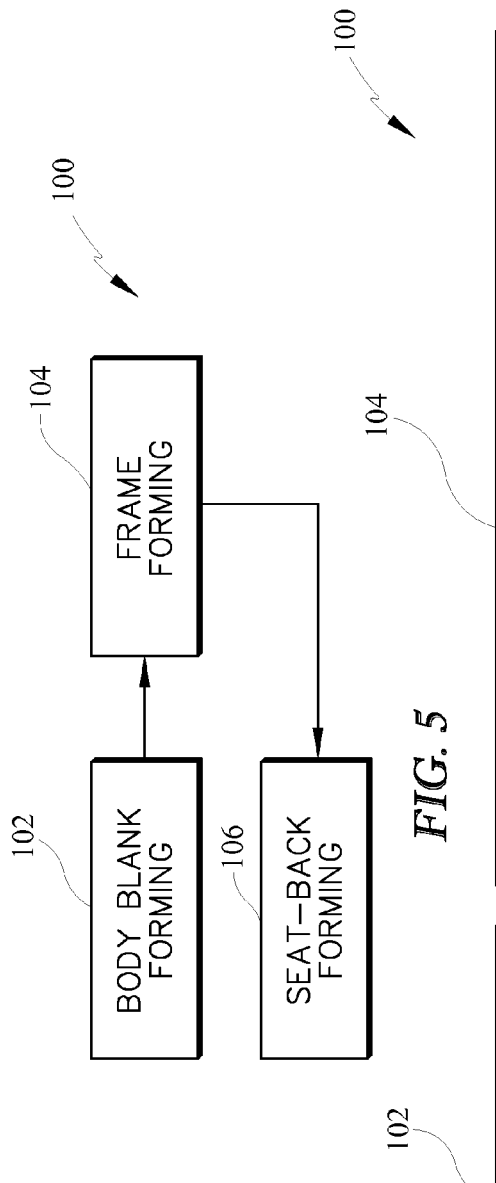
Figure 6:
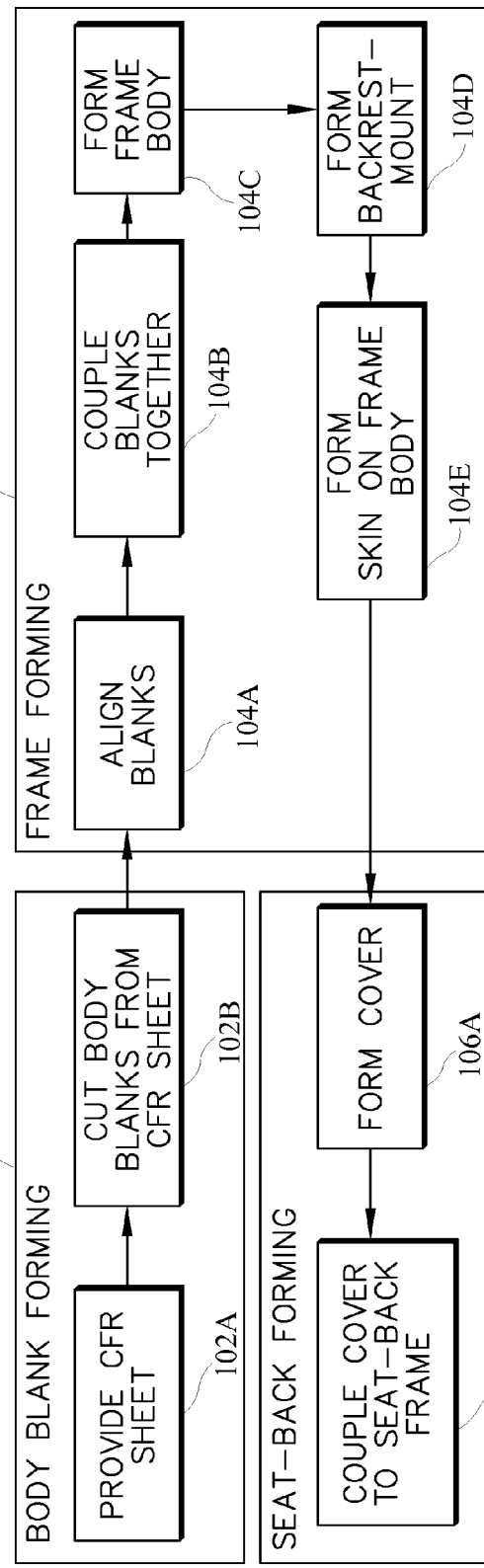
Figure 7:
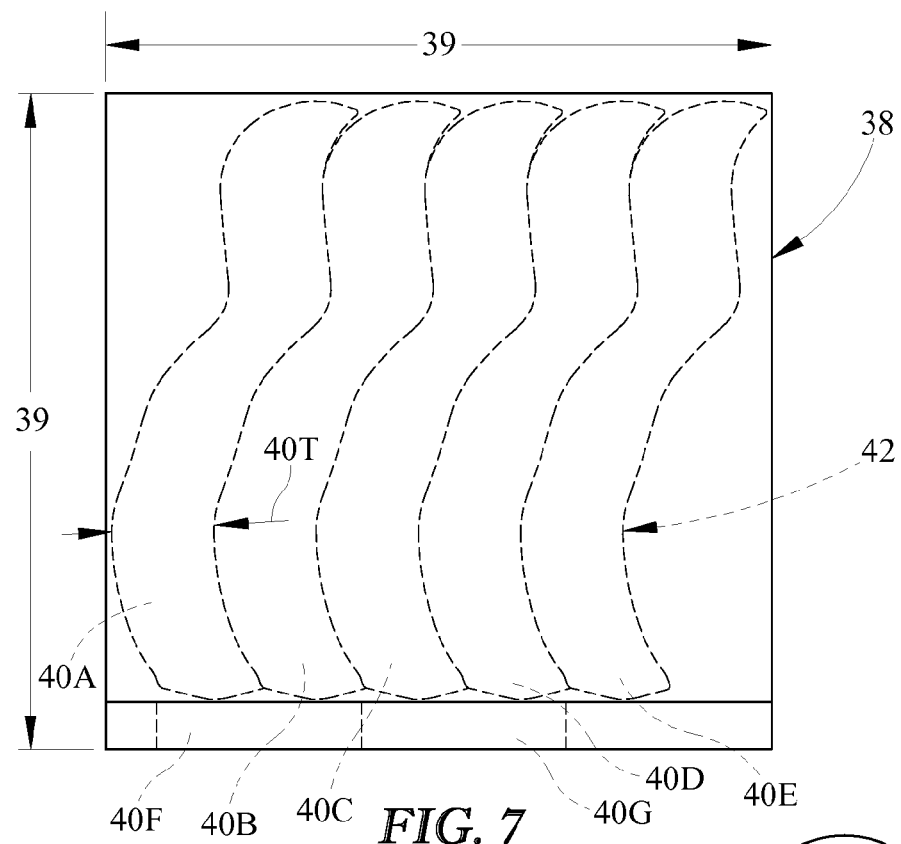
Figure 8A:
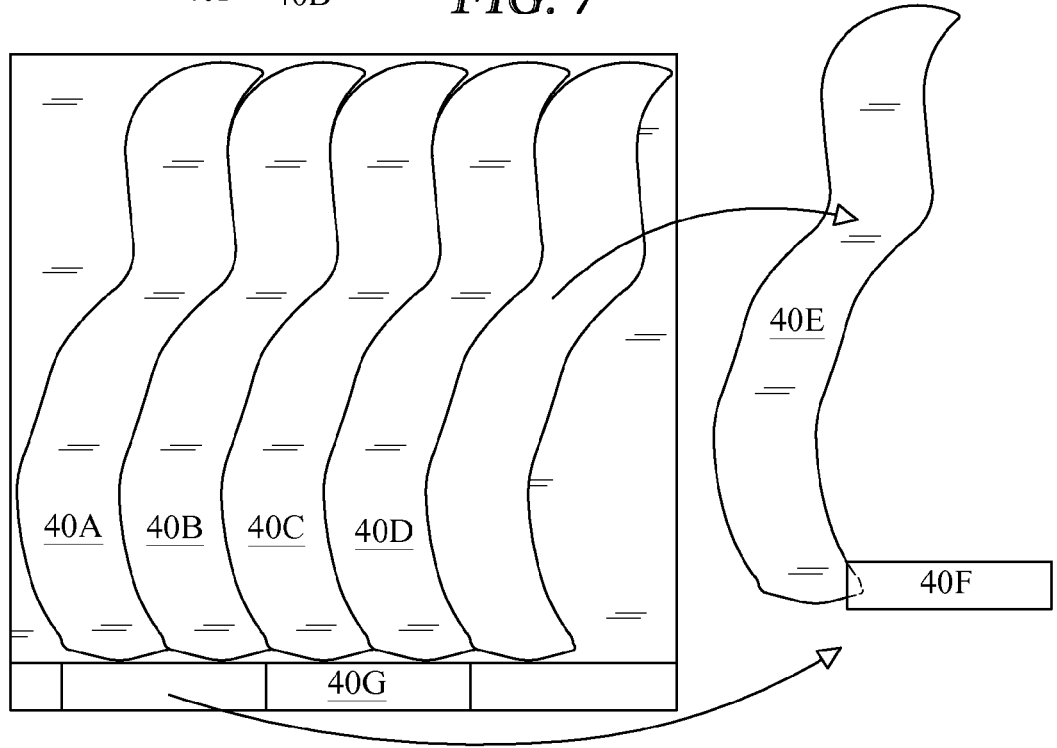
Figure 8B:
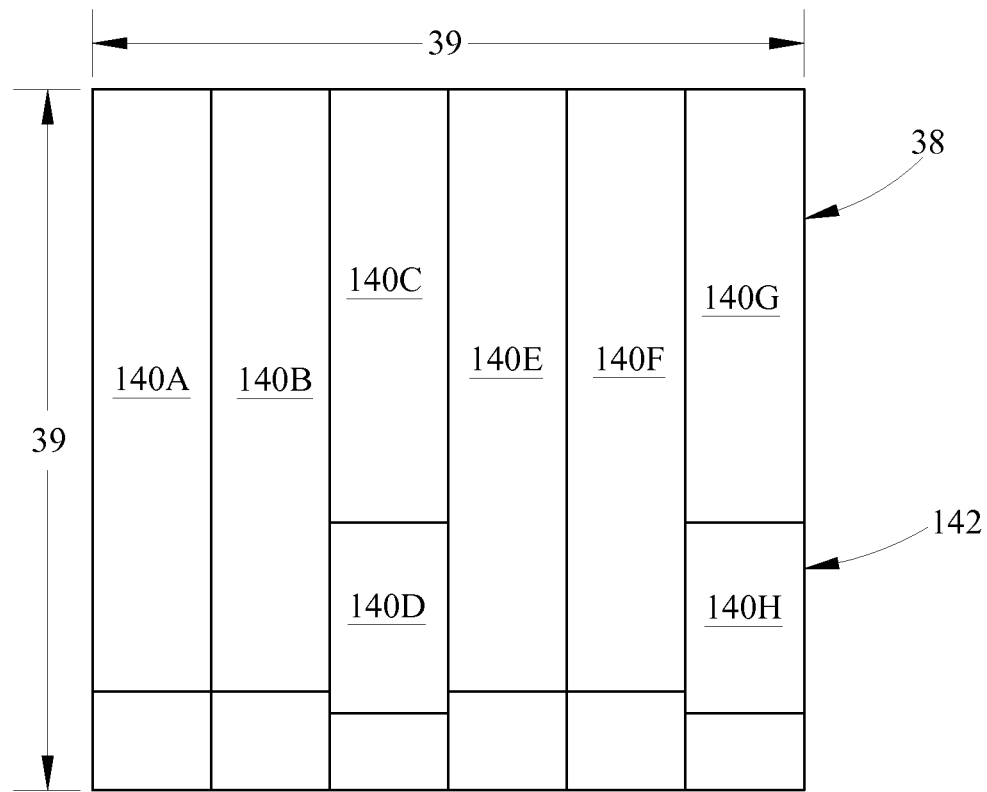
Figure 9B:
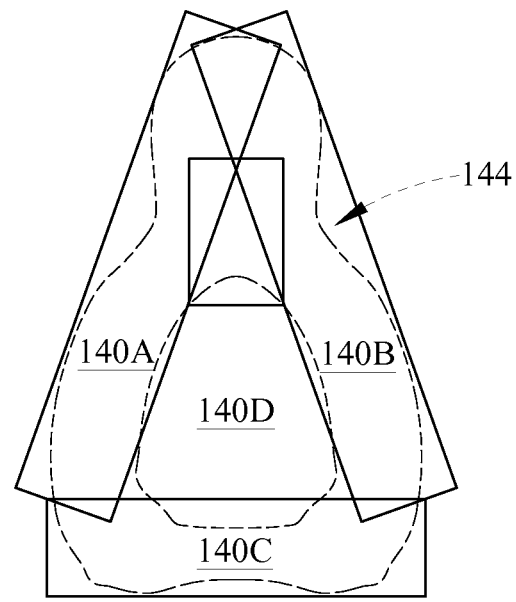
Figure 9A:
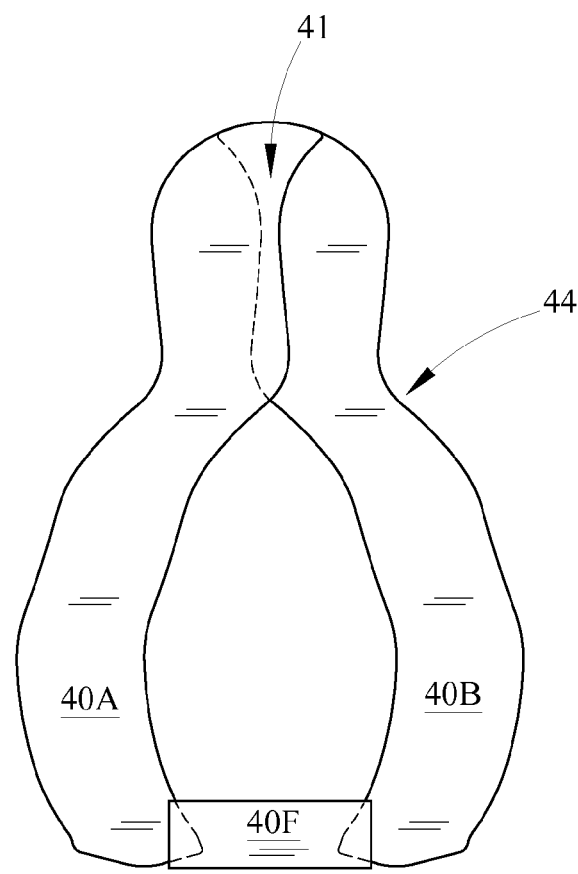
Figure 10:
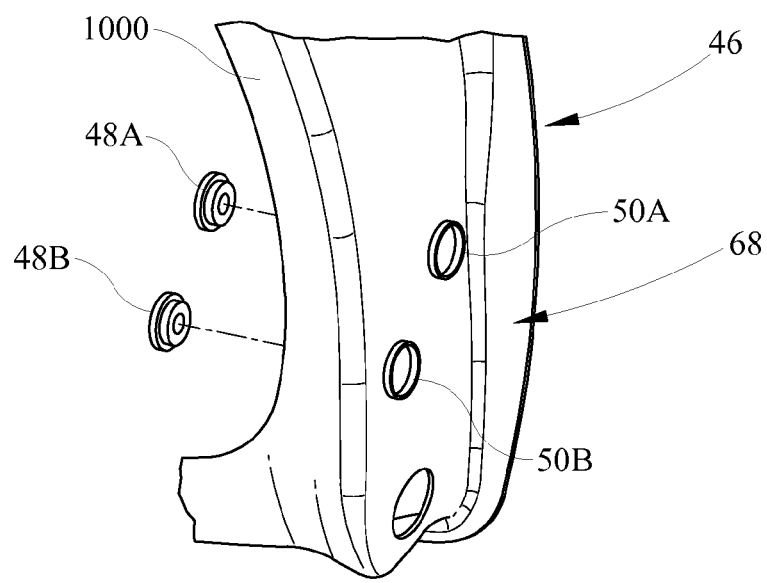
Figure 11:
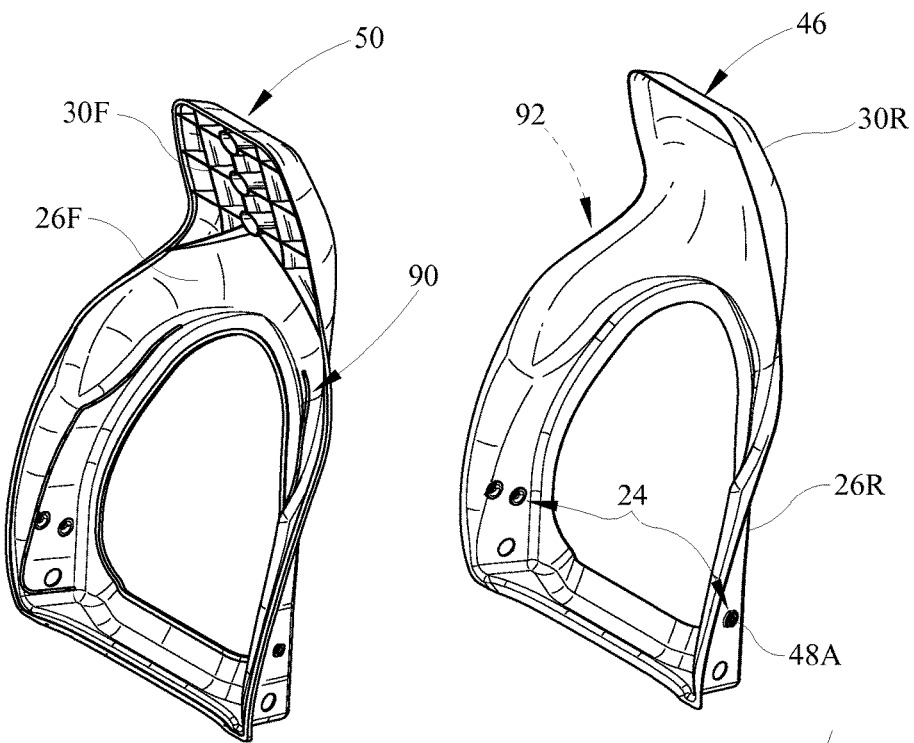
Figure 12:
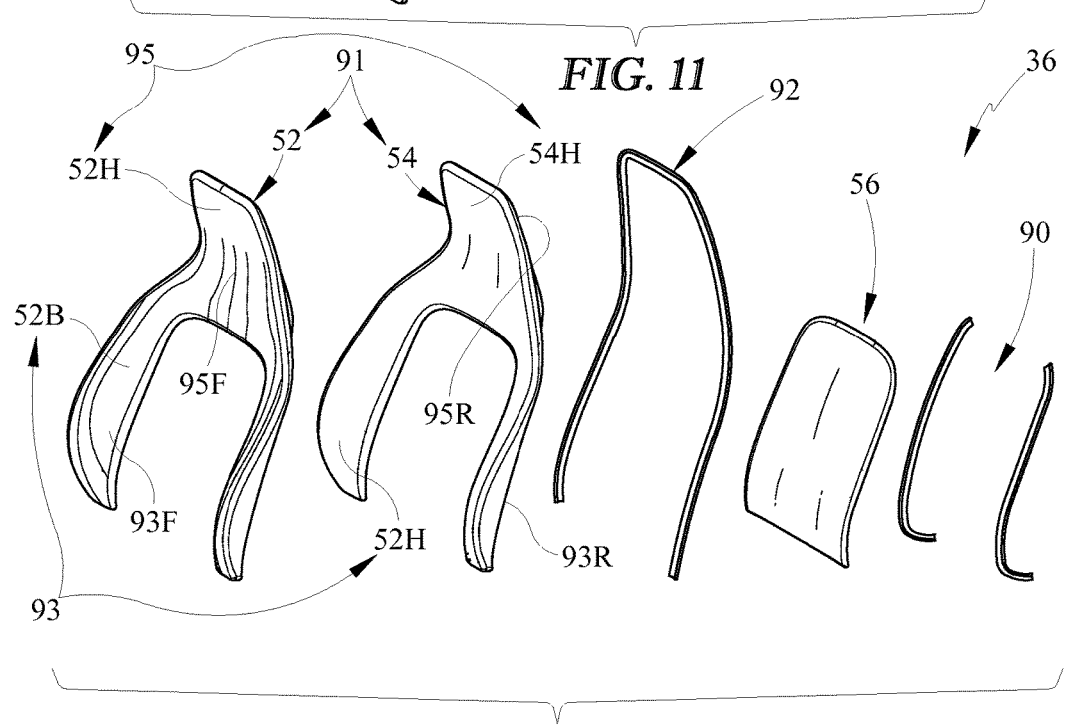
Figure 14C:
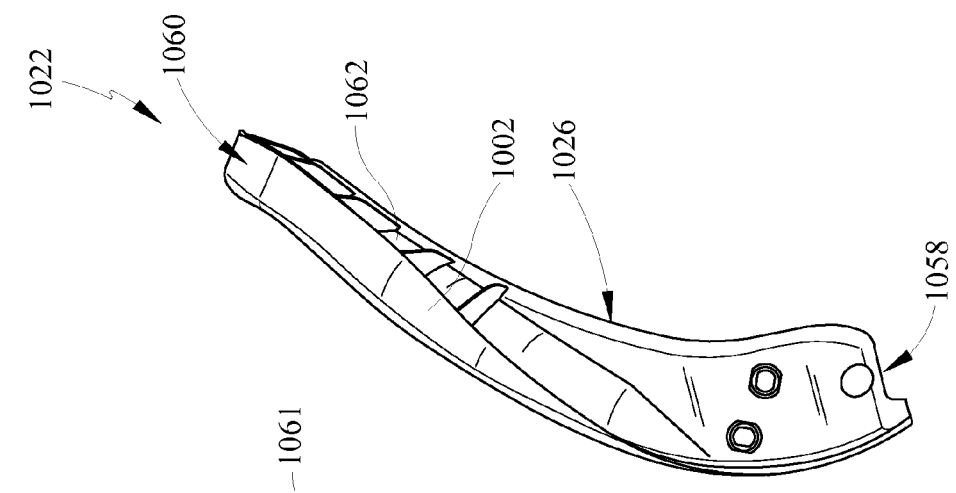
Figure 14B:
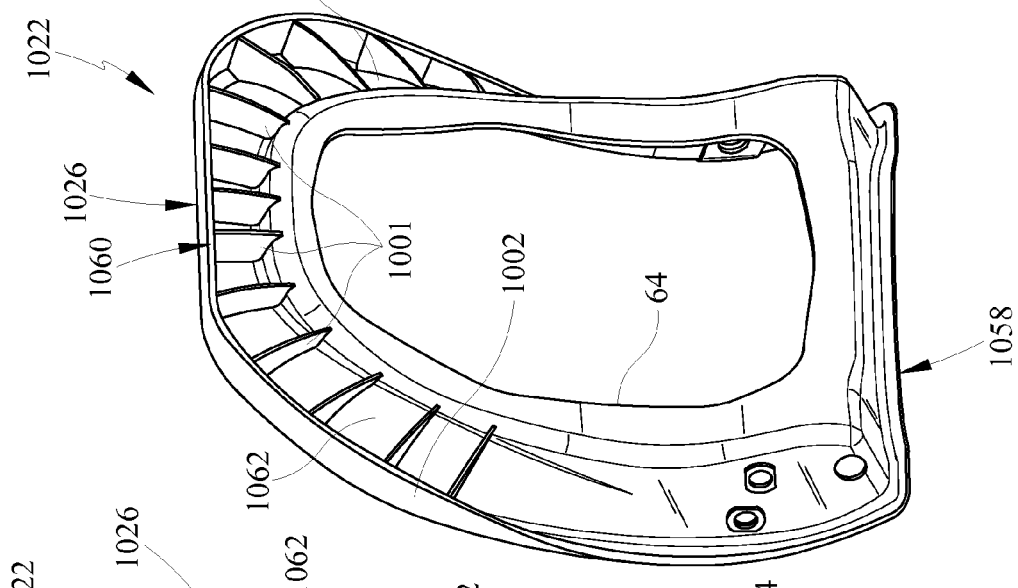
Figure 13B:
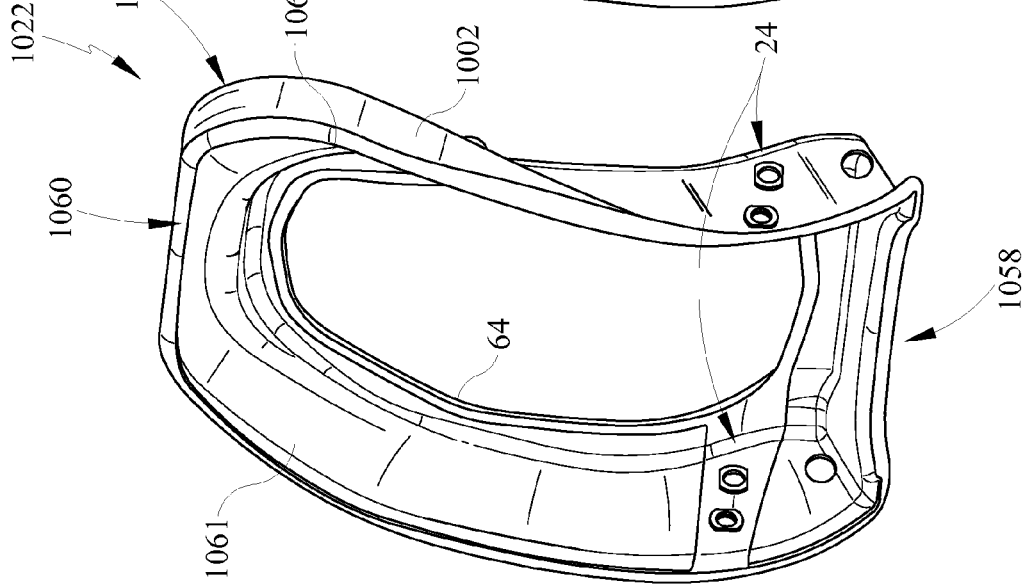
Figure 19A:
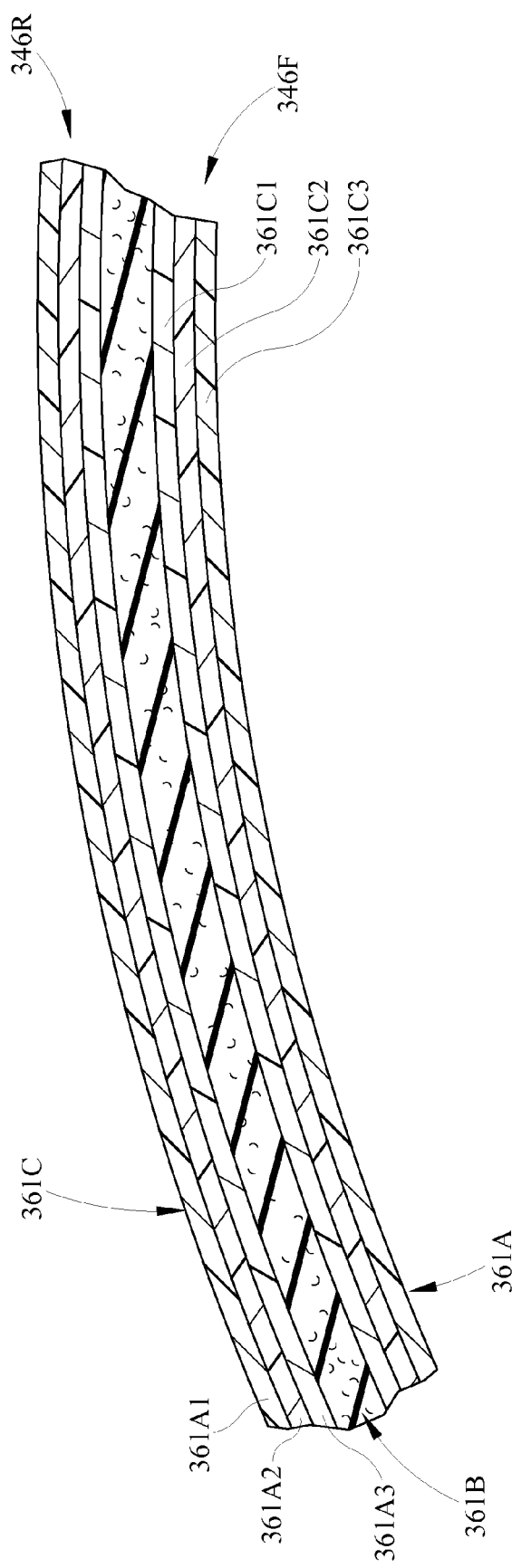
Figure 20A:
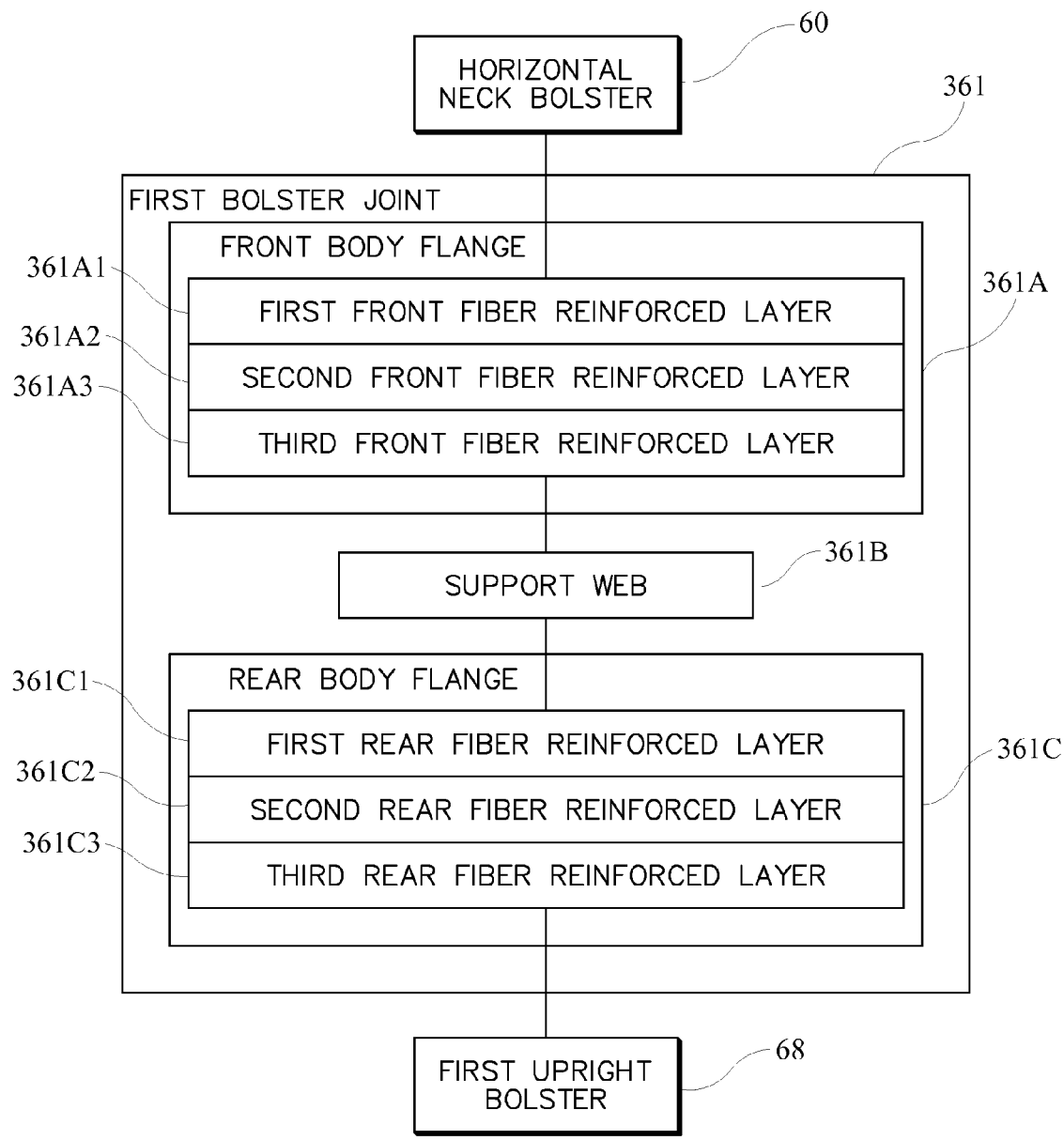
Figure 20B:
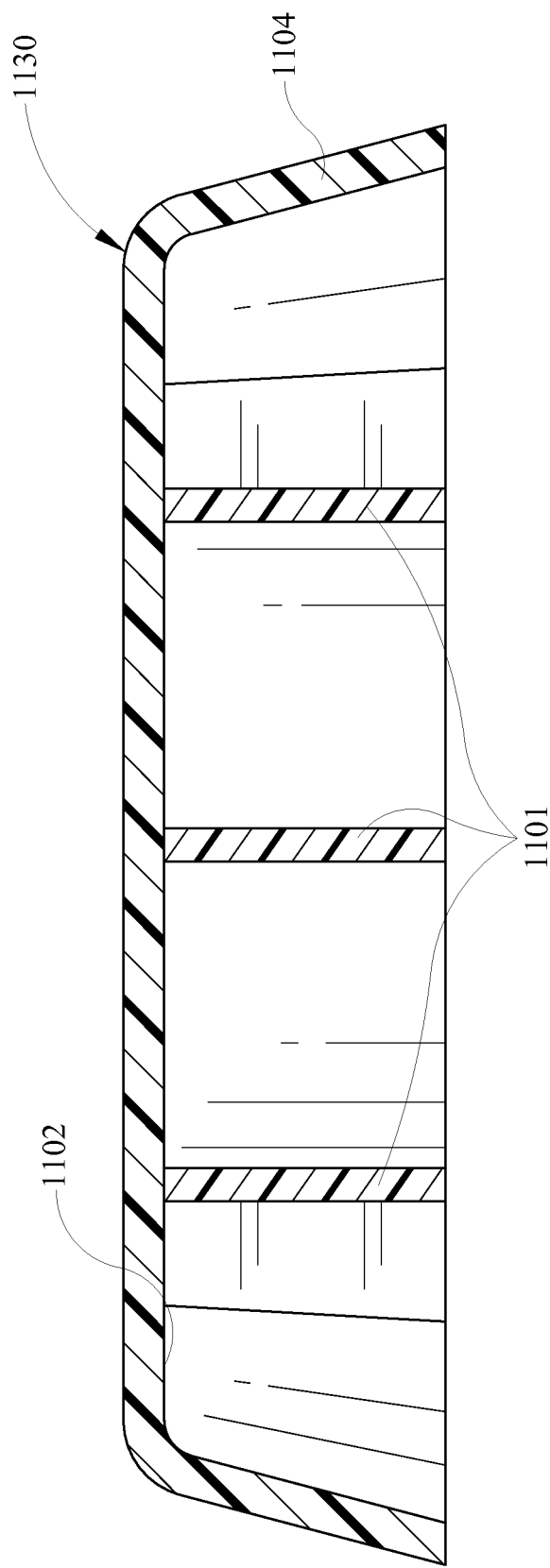
Figures 23, 24:
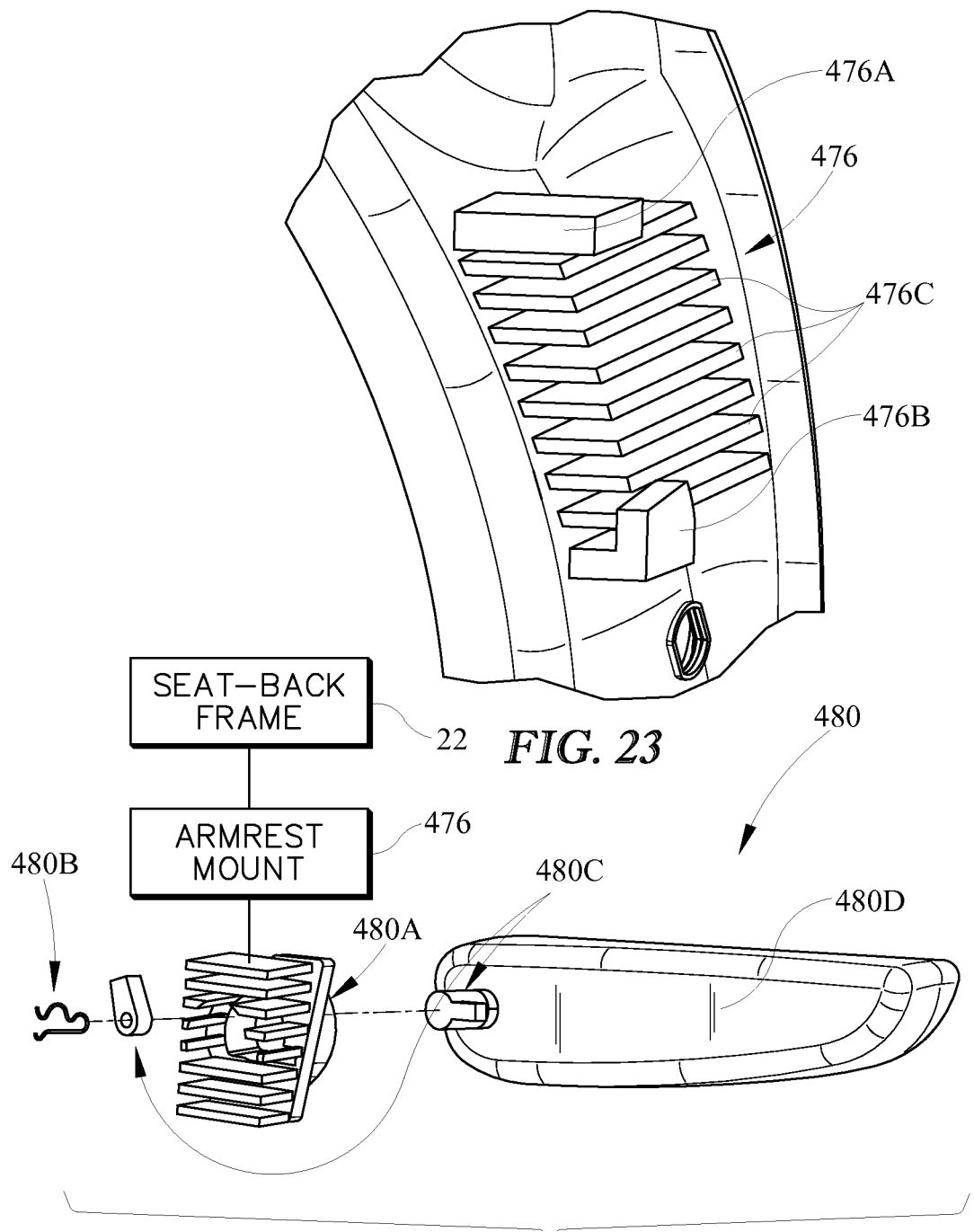
Figure 29B:
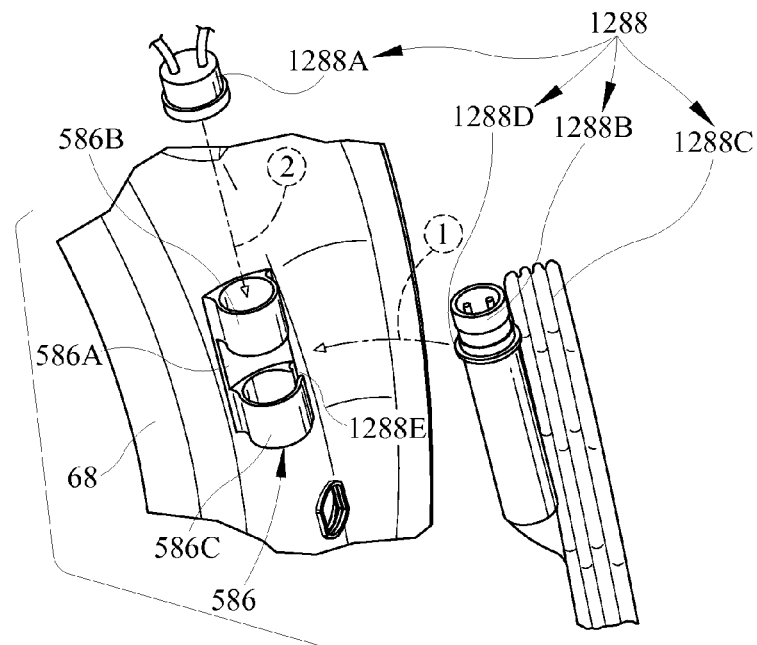
Figure 30B:
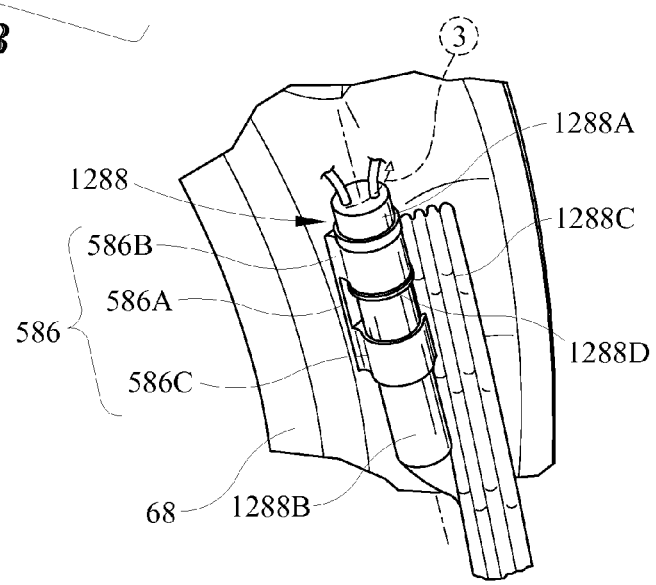
Figure 31:
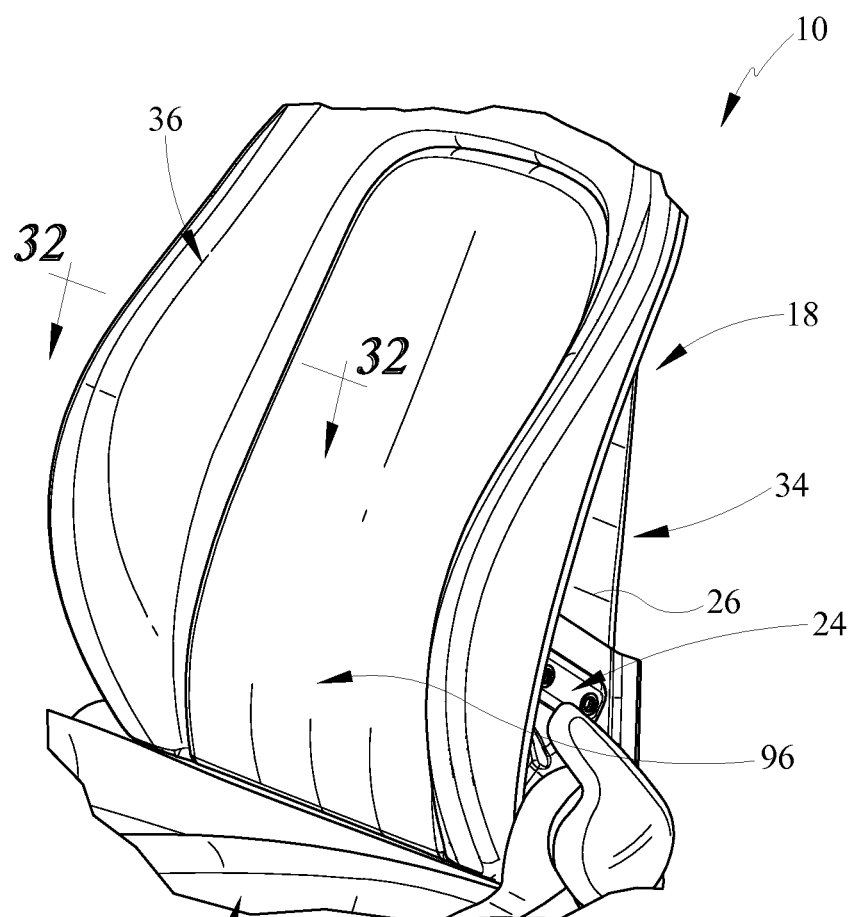
Figure 32:
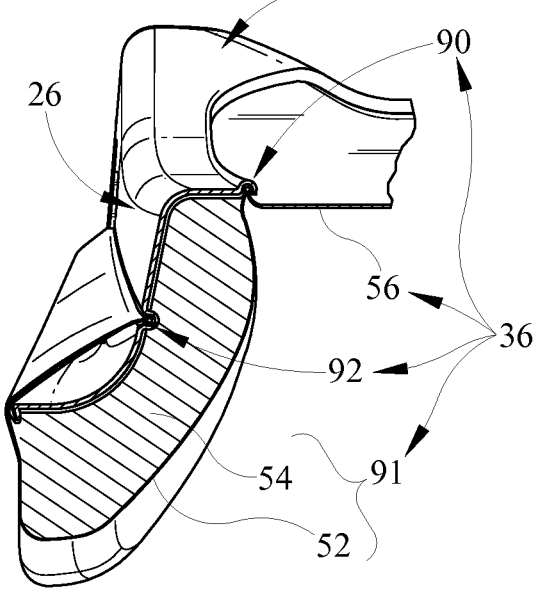
Figure 33:
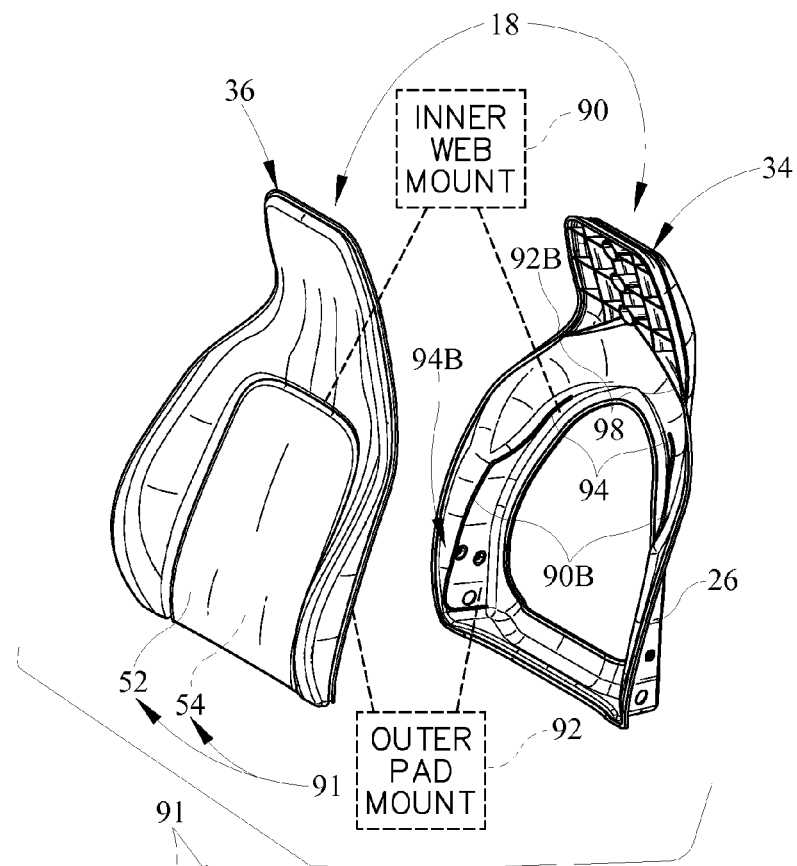
Figure 34:
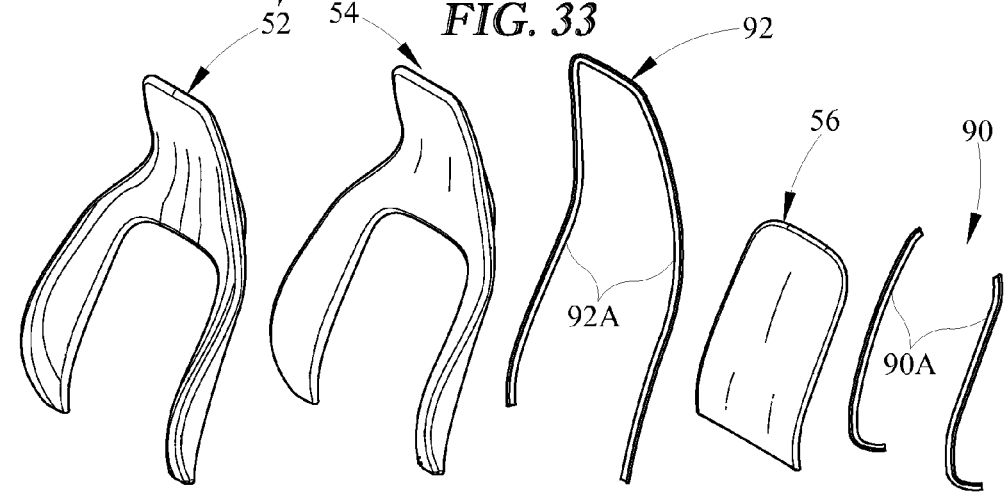
Figure 35:
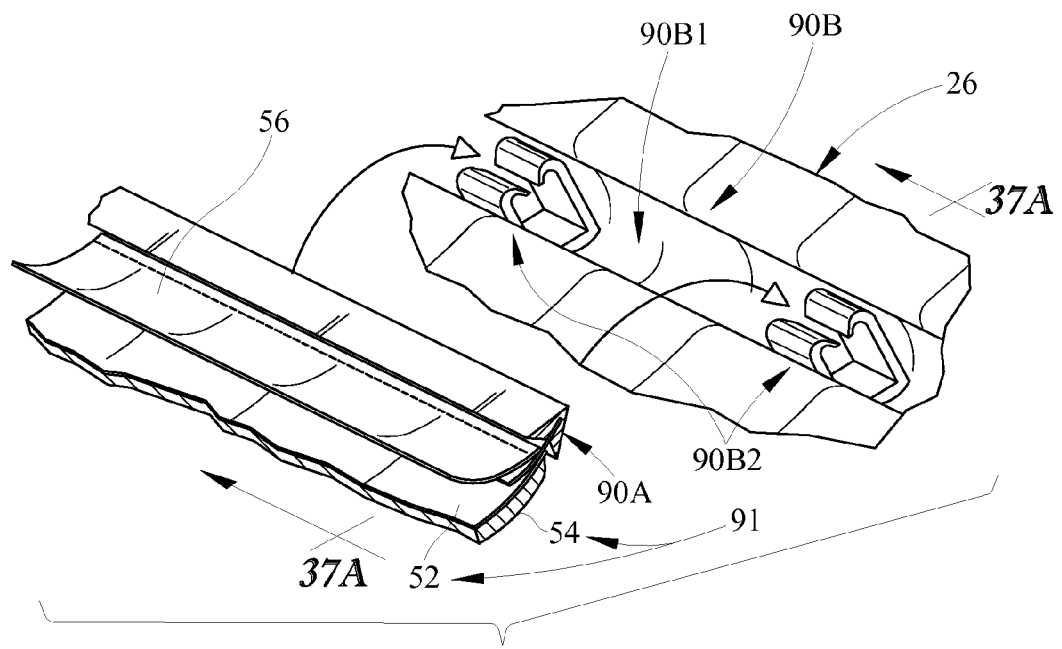
Figure 36:
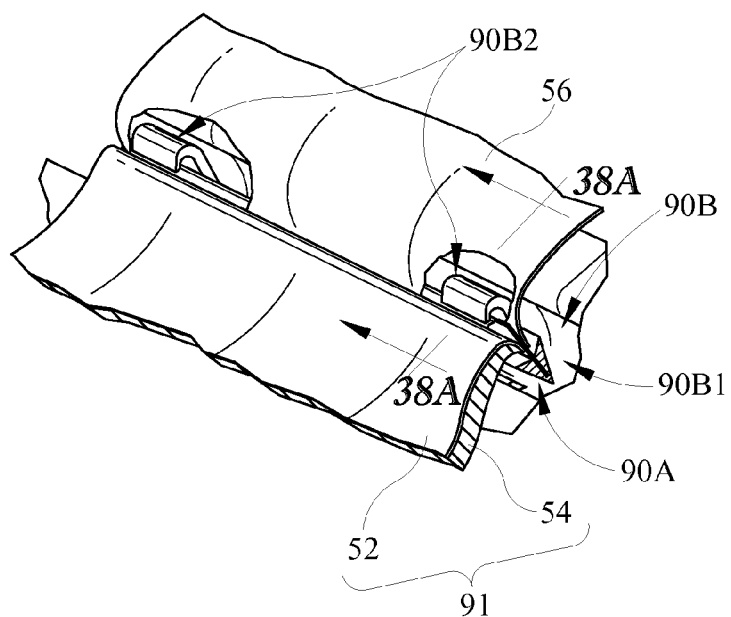
Figure 37A:
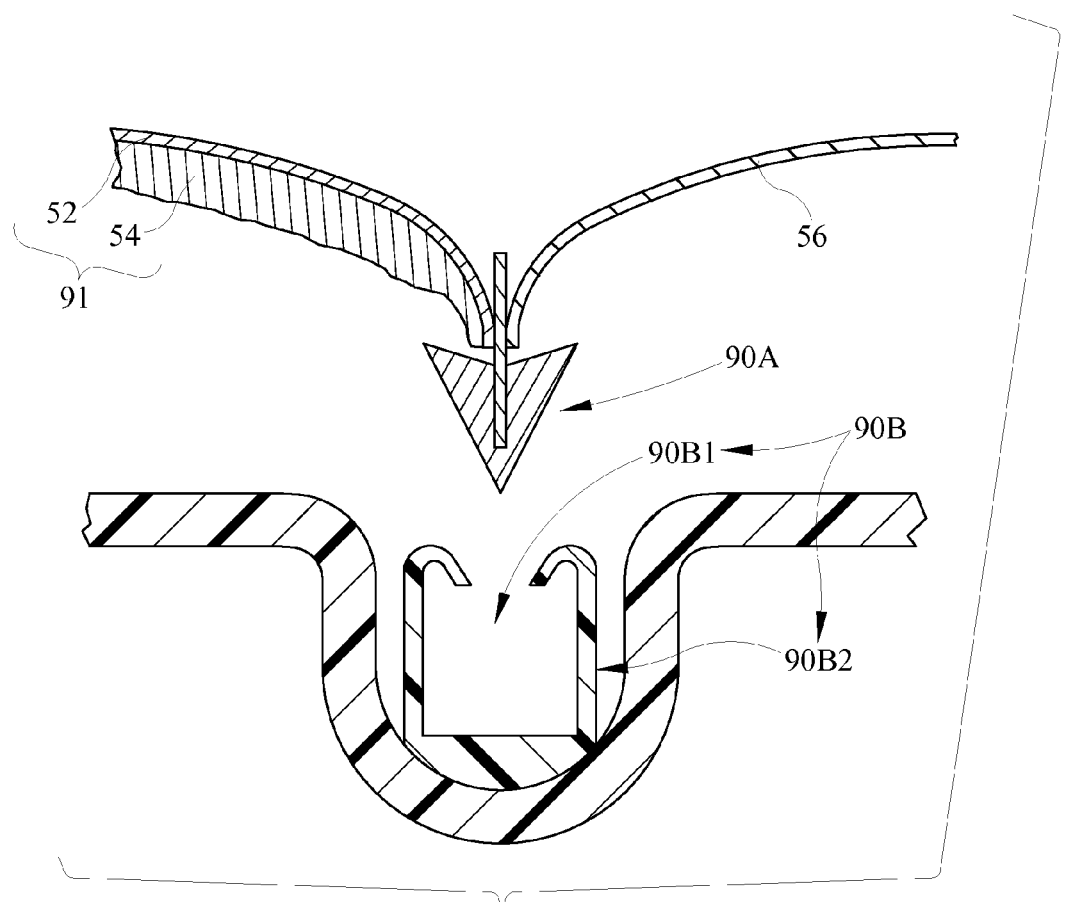
Figure 38A:
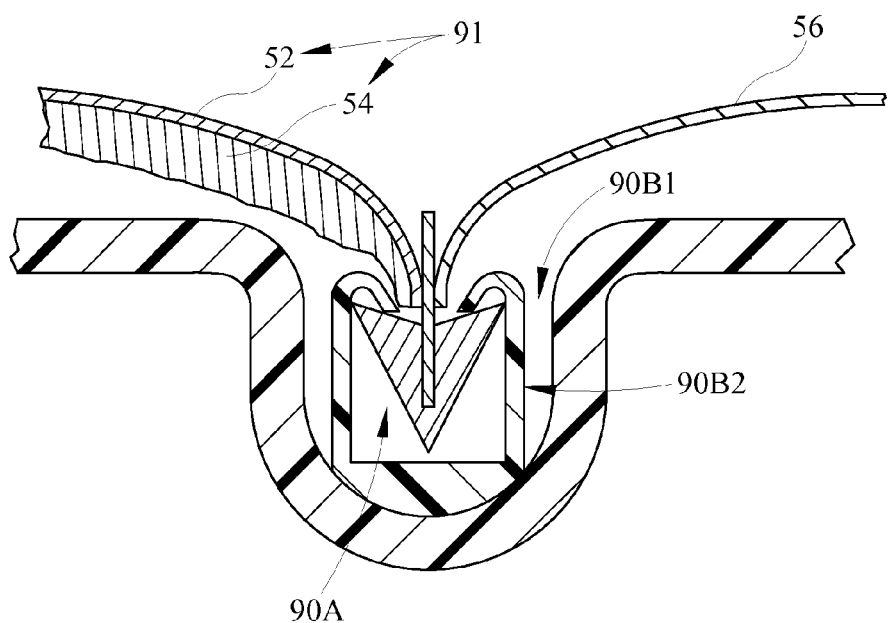
Figure 37B:
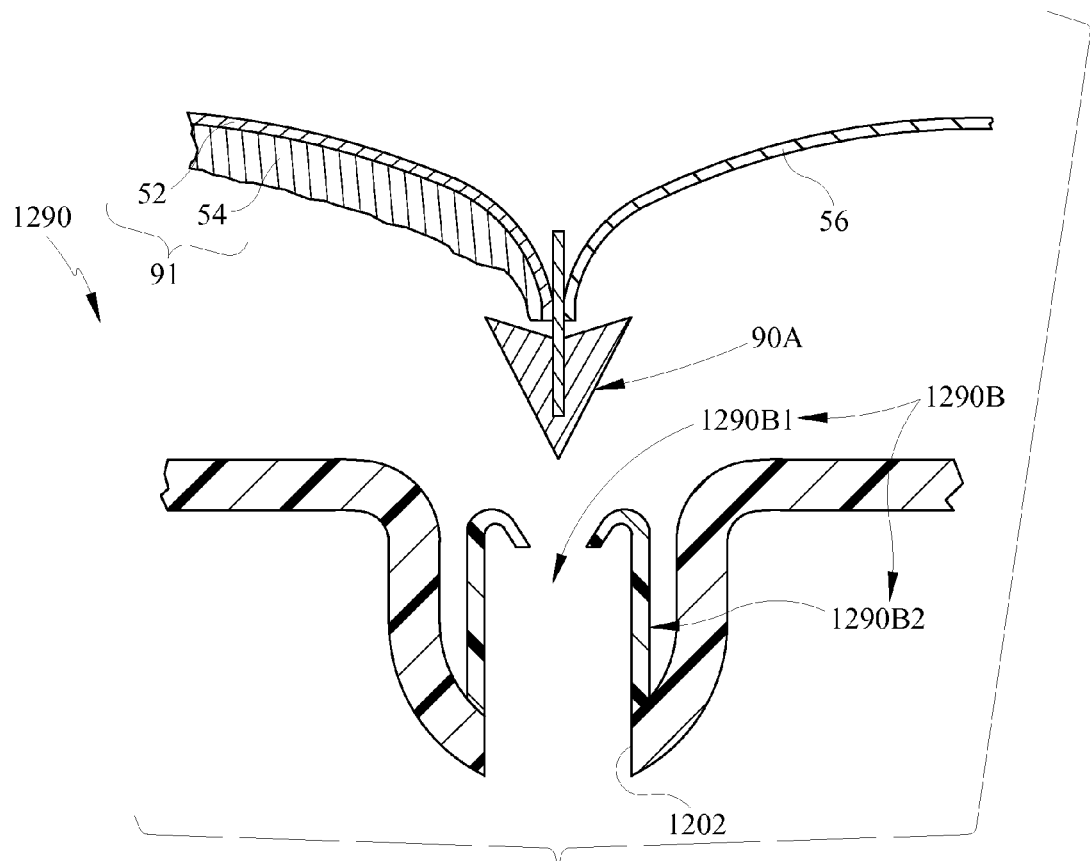
Figure 38B:
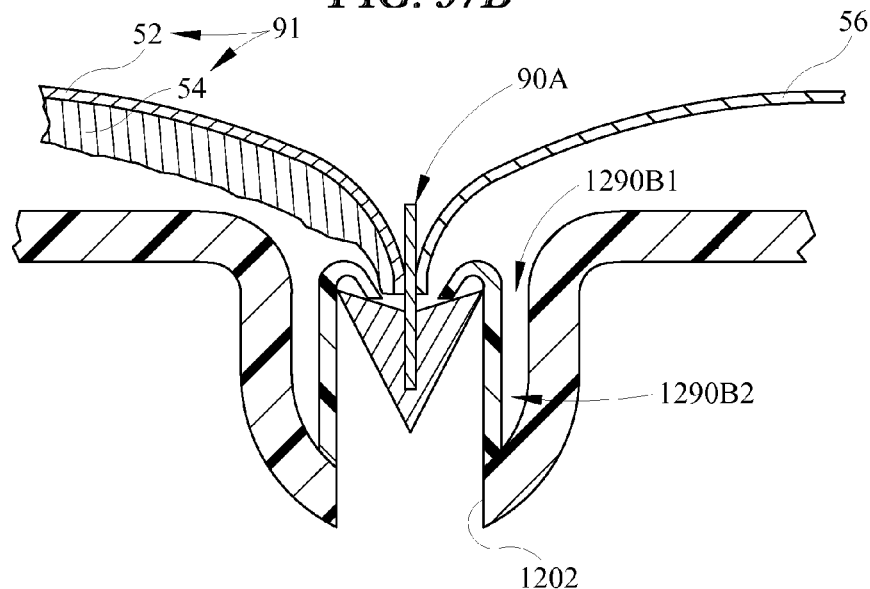
Figure 43A:
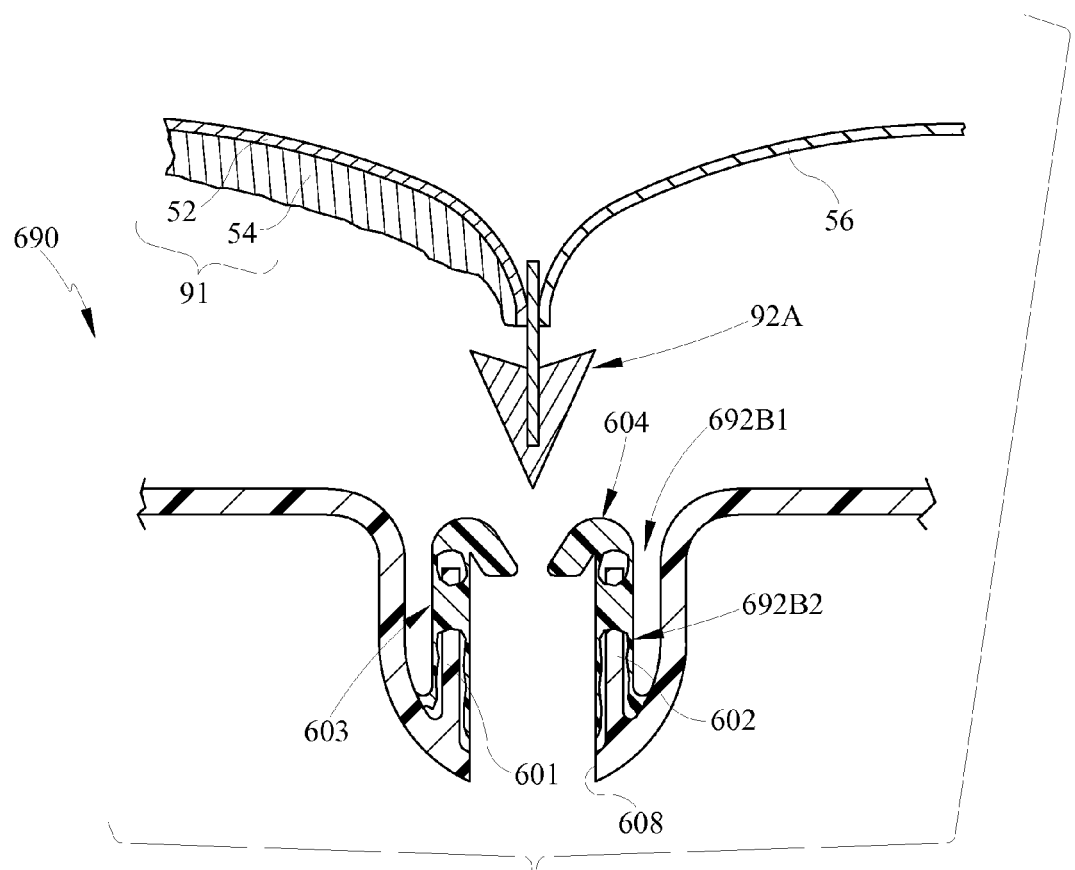
Figure 44A:
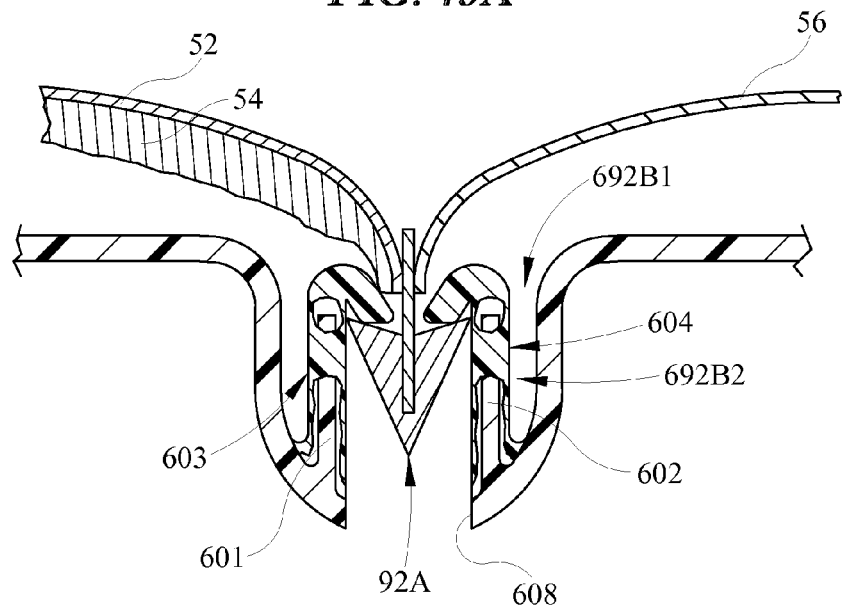
Figure 43B:
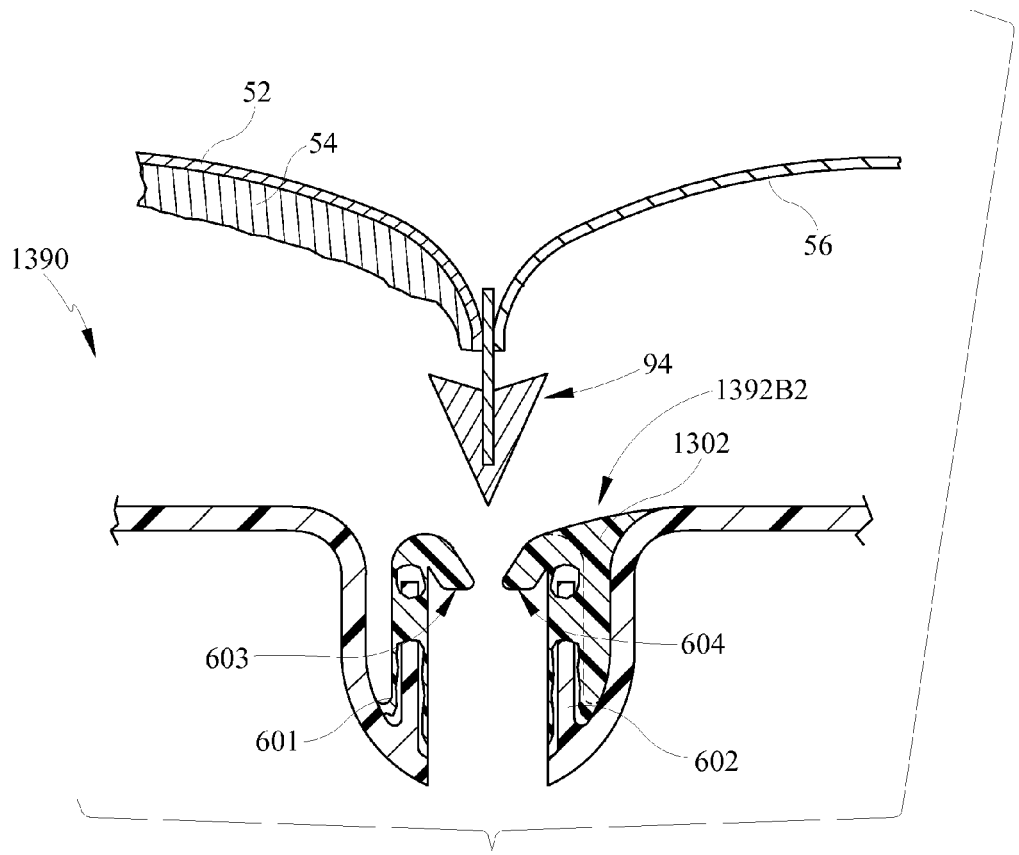
Figure 44B:
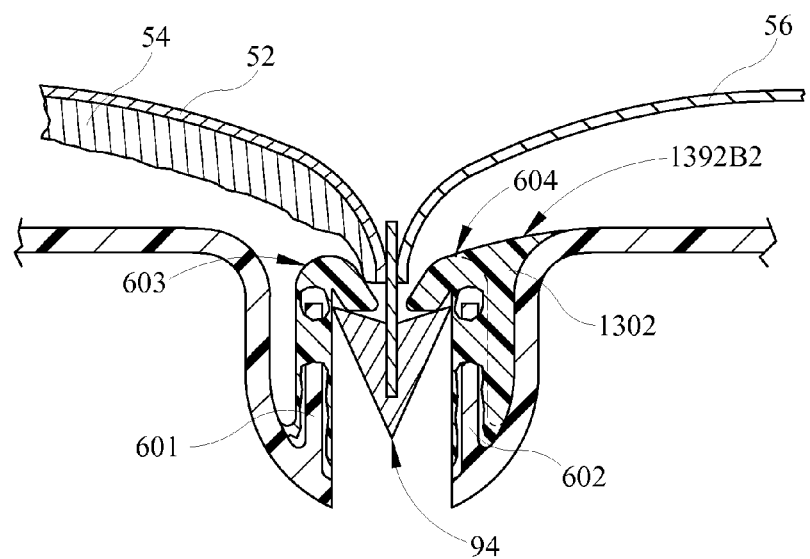
Figure 45:
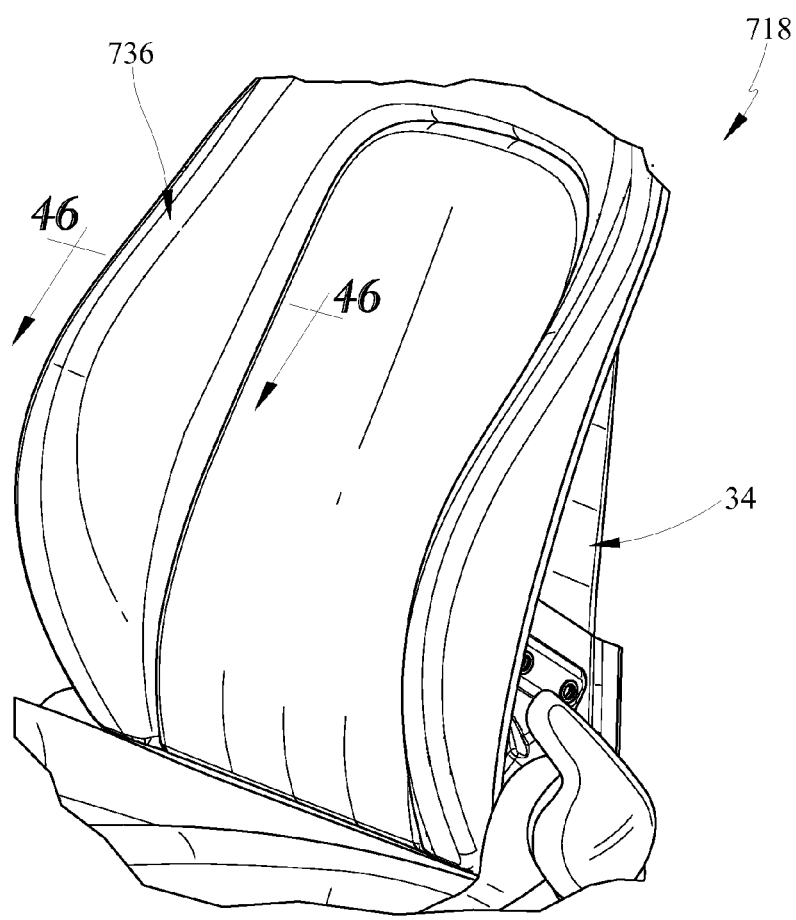
Figure 46:
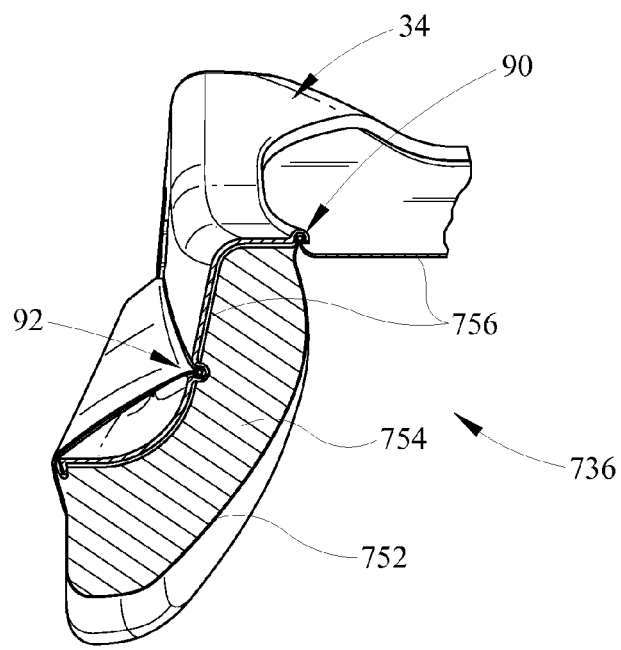
Figure 47:
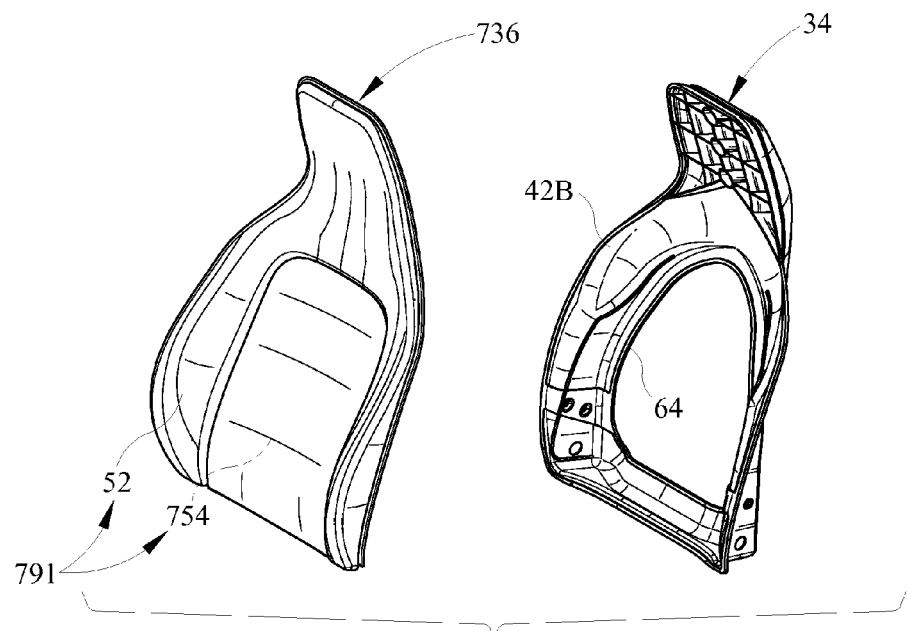
Figure 48A:
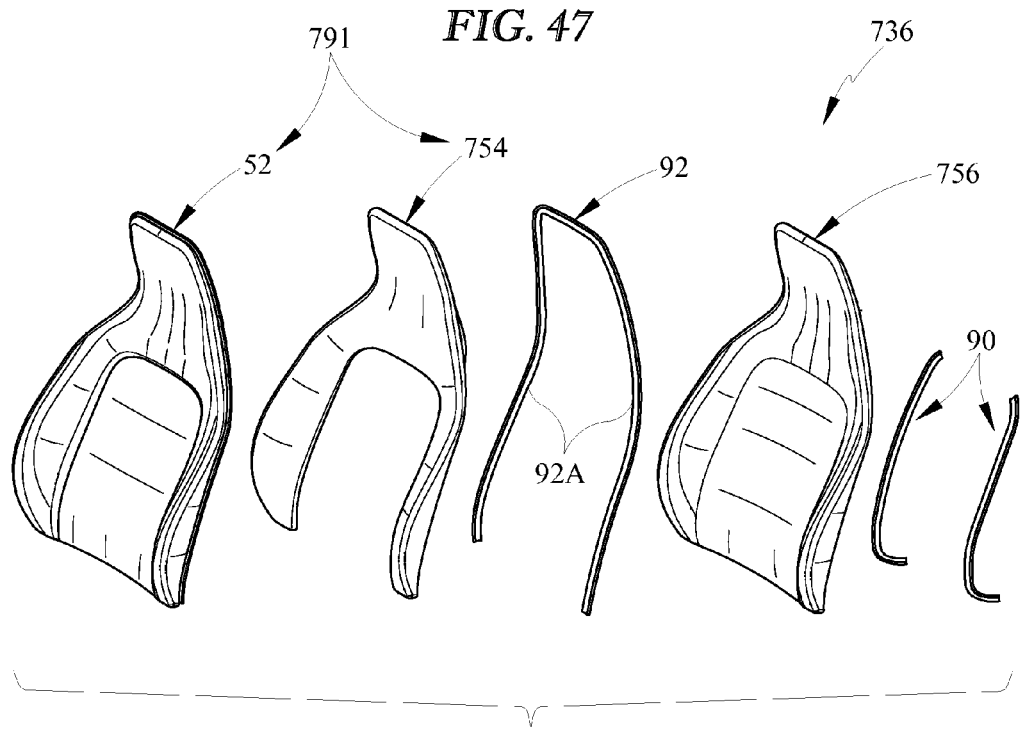
Figure 48B:
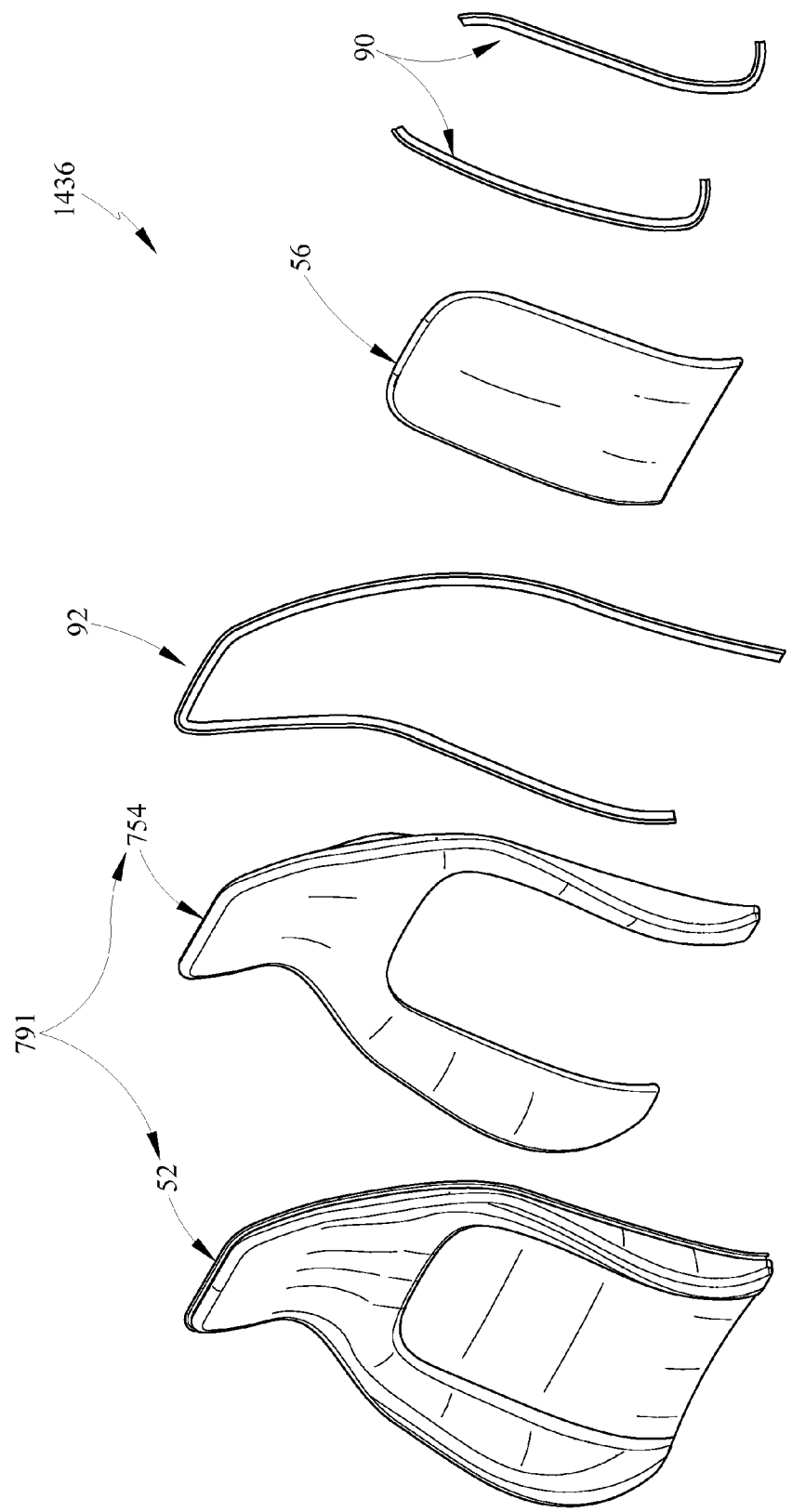
Figure 52:
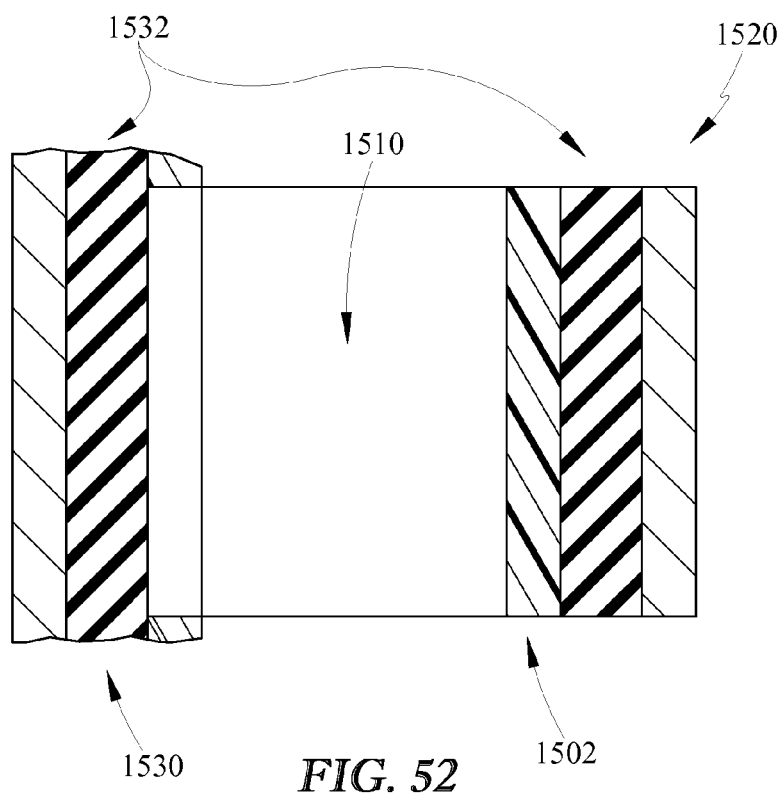
Figure 53:
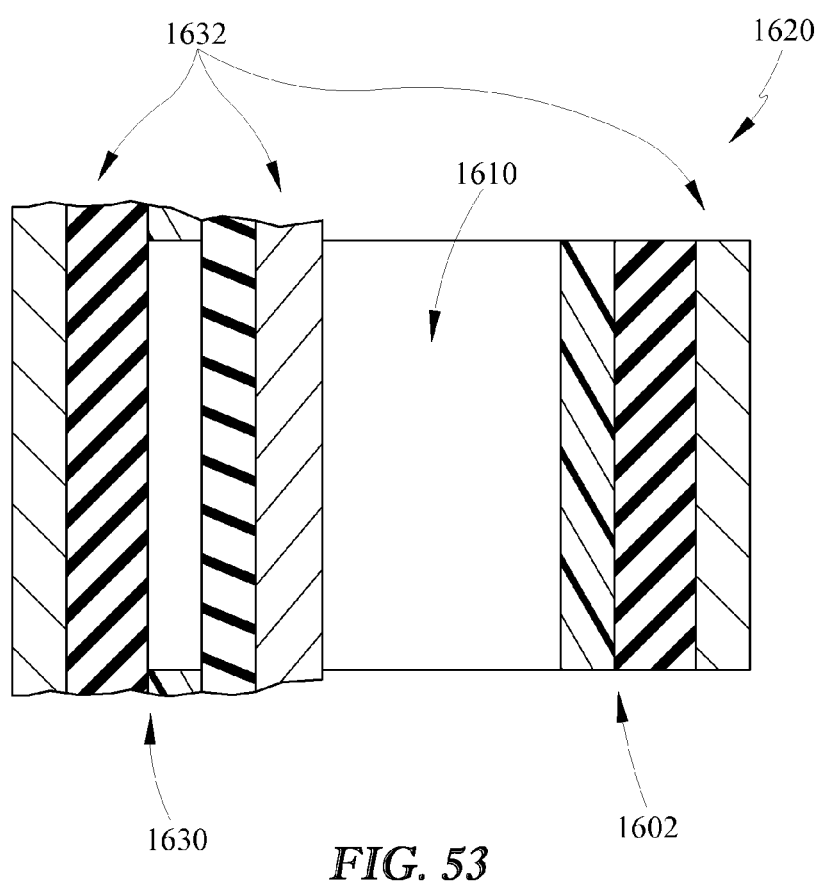
Figure 54:
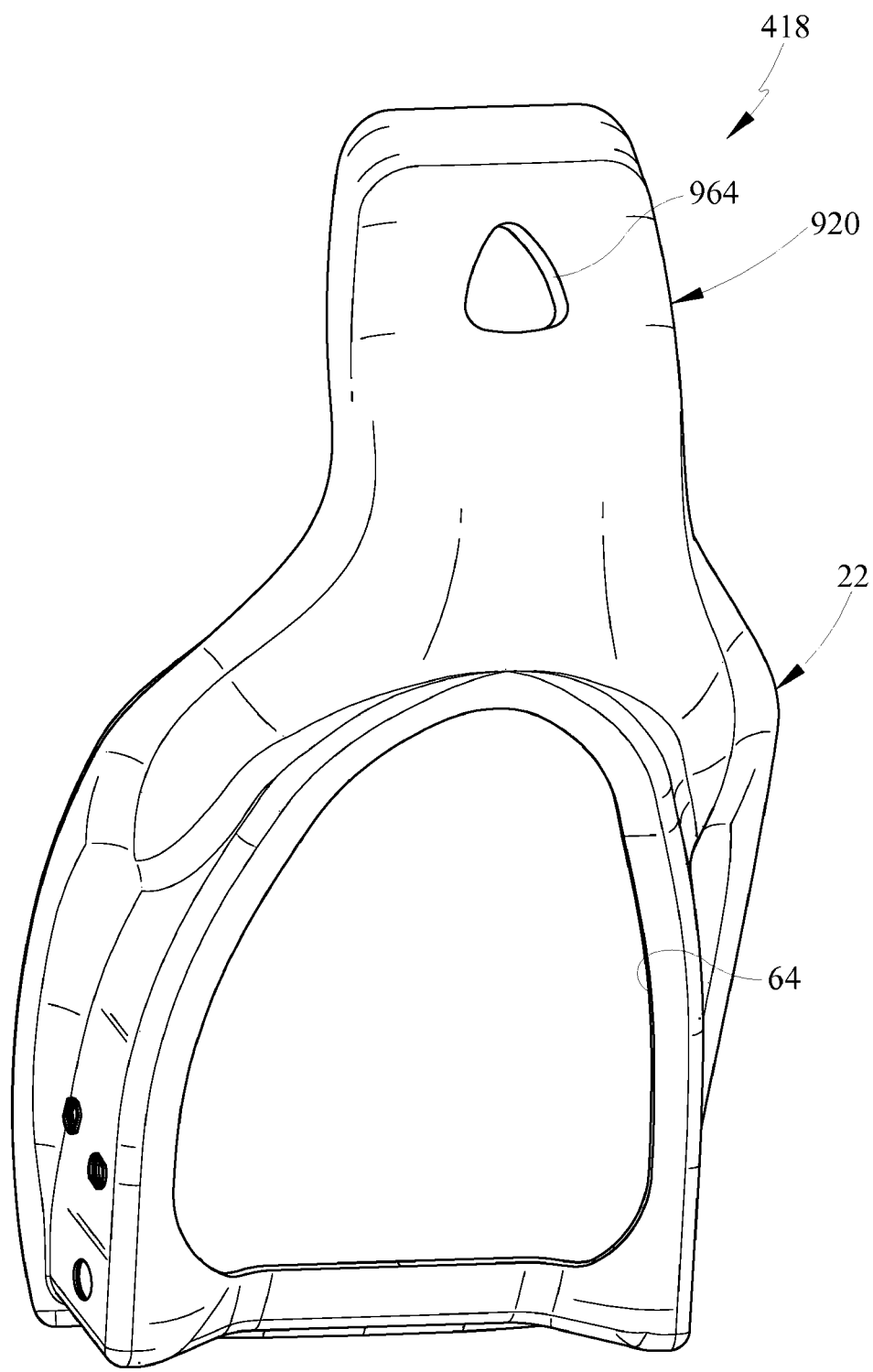

FIG. 4 is a sectional view taken along line 4-4 of FIG. 2 showing that the seat-back cover includes an elastic support web arranged to extend between first and second upright side bolsters included in the monolithic seat-back frame to cover a backrest aperture formed in the seat-back frame and provide support to the occupant resting on the vehicle seat and a seat-back cushion and an outer seat-back sheet arranged to extend from the backrest aperture, around the upright bolsters, and couple to a rear side of the upright bolsters;

FIG. 5 is a diagrammatic view of a manufacturing process in accordance with the present disclosure showing that the manufacturing process includes the stages of forming a body blank, forming a frame, and forming a seat back;

FIG. 6 is a diagrammatic view of the manufacturing process of FIG. 5 showing that each stage of the manufacturing process includes multiple operations;

FIG. 7 is a plan view of a fiber reinforced sheet used to form blanks used in forming a frame body as suggested in FIG. 8A and showing that the blanks (in phantom) are laid out so as to minimize waste of the fiber reinforced sheet;

FIG. 8A is a view similar to FIG. 7 showing that several blanks have been cut from the fiber reinforced blank;

FIG. 9A is a plan view of three blanks aligned to form a general shape of the seat-back frame prior to molding the aligned body blanks to form a frame body as suggested in FIG. 11;

FIG. 8B is a plan view of another fiber reinforce sheet used to form another embodiment of blanks used in forming a frame body as suggested in FIG. 8A and showing that the blanks (in phantom) are laid out so as to minimize waste of the fiber reinforced sheet;

FIG. 9B is a plan view of the four blanks aligned to form a general shape of the seat-back frame prior to trimming the aligned blanks to remove excess waste and molding the trimmed blanks to form a frame body as suggested in FIG. 11;

FIG. 10 is a partial perspective view suggesting that the backrest mount is formed by inserting a pair of bushings into associated bushing apertures formed in one of the upright bolsters and coupling the pair of bushings to the backrest frame;

FIG. 11 is an exploded assembly view of the seat-back frame of FIG. 3 showing that the seat-back frame is established by molding a frame skin (on the left) onto the frame body formed by molding the body blanks as suggested in FIGS. 8B and 9;

FIG. 12 is an exploded assembly view of the seat-back cover of FIG. 3 showing that the seat-back cover includes, from left to right, the seat-back sheet, the seat-back cushion, an outer cover mount, the elastic support web, and an inner cover mount;

FIG. 13A is a perspective view of a second embodiment of a vehicle seat in accordance with the present disclosure showing that the vehicle seat includes the seat bottom and a seat back and showing that the seat back provides a backrest and a backrest mount interconnecting the backrest and the seat bottom;

FIG. 14A is an enlarged partial perspective view of the seat back of FIG. 13A, with portions broken away, showing that the seat back includes a monolithic backrest frame and a backrest cover overlying portions of the backrest frame to provide comfort and support to an occupant resting on the vehicle seat and that the backrest frame is formed to include two apertures configured to provide a headrest mount for a separate headrest;

FIG. 13B is a front perspective view of a third embodiment of a seat-back frame in accordance with the present disclosure showing that the seat-back frame includes an outer flange coupled to a perimeter of a backrest frame to reinforce the backrest frame;

FIG. 14B is a rear perspective view of the seat-back frame of FIG. 13B showing that the seat-back frame further includes a series of spaced-apart reinforcing ribs appended to a rearward facing surface of the seat-back frame and configured to maximize strength of the seat-back frame along a headrest bolster included in the backrest frame and first and second bolster joints also included in the backrest frame;

FIG. 14C is an elevation view of the seat-back frame of FIGS. 13B and 14B showing the outer flange coupled along the perimeter of the backrest frame;

FIG. 15 is a perspective and diagrammatic view of a fourth embodiment of a monolithic seat-back frame in accordance with the present disclosure showing that the monolithic seat-back frame includes a backrest frame including first and second bolster joints including reinforcing ribs formed in a fiber reinforced frame body and a headrest frame coupled to the backrest frame to extend upwardly away from the backrest frame;

FIG. 16 is a sectional view taken along line 16-16 of FIG. 15 showing that the reinforcing ribs are spaced apart from one another and each pair of reinforcing ribs is separated by an associated channel;

FIG. 17A is a perspective and diagrammatic view of a fifth embodiment of a monolithic seat-back frame in accordance with the present disclosure showing that the monolithic seat-back frame includes a backrest frame including first and second bolster joints including a front body flange, a rear body flange spaced apart from the front body flange, and a support web extending therebetween to interconnect the front and rear body flanges at the bolster joints as suggested in FIG. 18A and a headrest frame coupled to the backrest frame to extend upwardly away from the backrest frame;

FIG. 18A is an exploded assembly view of the seat-back frame of FIG. 17A showing that the seat-back frame includes, from left to right, a front body shell including the front body flange, first and second support webs, and a rear body shell including the rear body flange;

FIG. 19A is a sectional view taken along line 19A-19A of FIG. 17A showing that at the first bolster joint, the front body flange is spaced apart from the rear body flange to establish a space therebetween and that the support web is arranged to lie in the space and interconnect the front and rear body flanges;

FIG. 20A is a diagrammatic view of the first bolster joint of FIGS. 17A-19A showing that the first bolster joint includes the front body flange including first, second, and third front fiber reinforced layers, the support web, and the rear body flange includes first, second, and third rear fiber reinforced layers;

FIG. 17B is a front perspective view of a sixth embodiment of a monolithic seat-back frame in accordance with the present disclosure showing that the monolithic seat-back frame includes a backrest frame first and second bolster joints hat include inner and outer reinforcing flanges and a headrest frame coupled to the backrest frame to extend upwardly away from the backrest frame;

FIG. 18B is a rear perspective view of the monolithic seat-back frame of FIG. 17B showing that monolithic seat-back frame further includes a series of reinforcing ribs molded onto a frame body during manufacturing to reinforce the backrest and headrest frames;

19B is an elevation view of the monolithic seat-back frame of FIGS. 17B and 18B showing that the second bolster joint includes the outer reinforcing flange which extends in a rearward direction;

FIG. 20B is a sectional view taken along line 20B-20B of FIG. 17B showing that the headrest frame includes an outer reinforcing flange which extends around a perimeter of the headrest frame and that several reinforcing ribs are appended to a rearward facing surface of the headrest frame to reinforce the headrest frame;

FIG. 21 is an exploded assembly view of a seventh embodiment of a monolithic seat back in accordance with the present disclosure showing that the seat back includes first and second armrest mounts appended to associated first and second upright bolsters and suggesting that an armrest is coupled to the one of the armrest mounts via a snap-fit connection without the use of fasteners as suggested in FIG. 22;

FIG. 22 is a view similar to FIG. 21 with the armrest coupled to the first armrest mount via the snap-fit connection;

FIG. 23 is an enlarged partial perspective view of the first armrest mount of FIG. 21 showing that the first armrest mount includes two retaining tabs and several reinforcing ribs located between the two retaining tabs;

FIG. 24 is an exploded assembly view and diagrammatic view of the armrest of FIGS. 21-23 showing that the armrest includes a mount housing including several ribs configured to mate with the reinforcing ribs formed in the armrest mount, an optional retainer clip, an armrest axle, and an arm support;

FIG. 25 is an exploded assembly view taken from the rear of an eighth embodiment of a seat back in accordance with the present disclosure showing that the seat back includes an airbag mount appended to an upright bolster included in a seat-back frame of the seat back and suggesting that an air bag is coupled to the airbag mount without the use of fasteners;

FIG. 26 is an enlarged partial perspective view of the airbag mount of FIG. 25 with the airbag coupled to the airbag mount and the airbag in an un-inflated state;

FIG. 27 is a view similar to FIG. 26 showing the airbag in an inflated state;

FIG. 28A is an enlarged partial perspective view of the airbag mount of FIG. 25 showing that the airbag mount includes a mount plate, an upper retention ring, and a lower retention clip spaced apart from and below the upper retention ring;

FIG. 29A is a view similar to FIG. 28A suggesting that installation of the airbag is achieved by sliding a pyrotechnic cylinder included in the airbag up through the lower retention clip and upper retention ring and mating an electrical connector included in the airbag to the pyrotechnic cylinder as suggested in FIG. 30A;

FIG. 30A is a view similar to FIG. 29A showing that the electrical connector is coupled to the pyrotechnic cylinder by twisting the electrical connector relative to the pyrotechnic cylinder;

FIG. 29B is a view similar to FIG. 28B showing that pyrotechnic cylinder snapped through the lower retention clip and is then slide into the upper retention ring of the airbag mount until the airbag ring is engaging the retention ring of the airbag mount;

FIG. 30B is a view similar to FIG. 29B showing that the electrical connector is coupled to the pyrotechnic cylinder by twisting the electrical connector relative to the pyrotechnic cylinder;

FIG. 31 is an enlarged partial perspective view of the seat back of FIGS. 1 and 2 showing that the seat back includes the monolithic seat-back frame and the seat-back cover overlying the seat-back frame;

FIG. 32 is a sectional view taken along line 32-32 of FIG. 31 showing that the seat-back cover includes the elastic support web coupled to the first upright bolster by an inner cover mount and a seat-back pad including the seat-back cushion and the seat-back sheet is coupled to the first upright bolster by the inner cover mount and the outer cover mount and showing that the seat-back sheet and seat-back cushion are arranged to overlie only a portion of the first upright bolster while the elastic support web is arranged to extend over and cover the aperture formed in the seat-back frame;

FIG. 33 is a diagrammatic and exploded assembly view of the seat back of FIG. 31 showing that the seat-back cover is coupled to the seat-back frame by the inner and outer cover mounts;

FIG. 34 is an exploded assembly view of the seat-back cover of FIG. 33 showing that the seat-back cover includes, from left to right, the seat-back sheet, the seat-back cushion underlying the seat-back sheet, the outer cover mount, the elastic support web, and the inner cover mount;

FIG. 35 is an enlarged partial perspective view of a portion of the seat-back cover and the seat-back frame showing that the elastic support web, seat-back sheet, and seat-back cushion are coupled to the inner cover mount and that the inner cover mount is configured to mate with an inner mount rim that is formed to include a channel and a series of spaced-apart retention clips located in the channel to retain the inner cover mount in the channel as suggested in FIG. 36;

FIG. 36 is a view similar to FIG. 35 showing the inner cover mount mated with the inner rim to cause the inner cover mount to be retained in the channel to cause the elastic support web to extend to the right over the aperture to support the occupant and the seat-back sheet and cushion to extend to the left over the upright bolster;

FIG. 37A is a sectional view taken along line 37A-37A of FIG. 35 showing that the inner cover mount is shaped to be retained by the retention clips of the inner mount rim and that the retentions clips are made from a plastics material;

FIG. 38A is a sectional view taken along line 38A-38A of FIG. 36 showing the inner cover mount retained in the channel by the retention clips;

FIG. 37B is a view similar to FIG. 38A showing another embodiment of an inner mount rim formed to include an aperture through which a portion of a mold may be inserted there through during molding to form the retention clip by an injection molding process;

FIG. 38B is a view similar to FIG. 38A showing that the inner cover mount is retained in the channel by the injection-molded retention clips;

FIG. 39 is an enlarged partial perspective view of a portion of a fiber reinforced sheet showing an H-shaped cut formed in the fiber reinforced sheet between two phantom construction lines which show where the fiber reinforced sheet will be deformed to establish a channel included in an inner mount rim during molding of a frame body as suggested in FIG. 40;

FIG. 40 is a view similar to FIG. 39 showing that two retention tabs are formed as a result of making the H-shaped cut and that the two retention tabs are arranged to lie in the channel formed during molding of the frame body;

FIG. 41 is a view similar to FIG. 40 showing that the two retention tabs are folded upwardly into the channel during molding of the frame body;

FIG. 42 is a view similar to FIG. 41 showing that another embodiment of a retention clip is established after plastics material is molded around the retention tabs;

FIG. 43A is a view similar to FIG. 37 with portions broken away to show that the fiber reinforced retention tabs are arranged to maximize strength of the retention clips and that an aperture left after folding the retentions tabs into the channel allows a portion of a mold to extend into and channel to mold the retention clip;

FIG. 44A is a view similar to FIG. 38 showing the inner cover mount retained in the channel by the retention clips including the fiber reinforced retention tabs;

FIG. 43B is a view similar to FIG. 43A showing another embodiment of retention clip including fiber reinforced tabs and showing that the retention clip includes a left retention prong and a right retention prong and a reinforcing element located between the left retention prong and a side of the channel to reinforce the right retention prong when exposed to forces imparted on the right retention prong by the elastic support web;

FIG. 44B is a view similar to FIG. 43B showing the inner cover mount retained in the channel by the fiber reinforced retention clips and the reinforcing element;

FIG. 45 is an enlarged partial perspective view of a ninth embodiment of a seat back in accordance with the present disclosure showing that the seat back includes the seat-back frame and a seat back cover overlying the seat-back frame and suggesting that the seat-back cover includes a seat-back sheet and a seat-back cushion and that the seat-back sheet extends over and covers the aperture formed in the seat-back frame;

FIG. 46 is a sectional view taken along line 46-46 of FIG. 45 showing that the seat-back cover includes the seat-back sheet, the seat-back cushion, and the elastic support web, and that both the seat-back sheet and the elastic support web extend over and cover the aperture formed in the seat-back frame and are coupled to the seat-back frame by both the inner and outer cover mounts;

FIG. 47 is an exploded assembly view of the seat back of FIG. 45 with the seat-back cover spaced apart from the seat-back frame to reveal that the seat-back cover is coupled to the seat-back frame by the inner the inner and outer cover mounts;

FIG. 48A is an exploded assembly view of the seat-back cover of FIG. 47 showing that the seat-back cover includes, from left to right, the seat-back sheet, the seat-back cushion, the outer cover mount, the elastic support web, and the inner cover mount;

FIG. 48B is a view similar to FIG. 48A showing another embodiment of a seat-back cover including a seat-back sheet, a seat-back cushion, an outer cover mount, an elastics support web, and an inner cover mount and showing that both the seat-back sheet and cushion extend across a front surface of a seat-back frame;

FIG. 49 is a rear perspective view of a tenth embodiment of a seat back in accordance with the present disclosure showing that the seat back includes a headrest and that the headrest has been formed to include a rectangle-shaped depression configured to receive and retain a tablet computer or smart phone for viewing and use by an occupant sitting behind the seat back;

FIG. 50 is a rear perspective view of an eleventh embodiment of a seat back in accordance with the present disclosure showing that the seat back includes a headrest and that the headrest is formed to include a retention loop adapted to receive a retention clip coupled to a rear side of a tablet computer or smart phone;

FIG. 51 is an enlarged partial perspective view of the retention loop of FIG. 50 showing that the retention loop is formed to include a clip-receiving space that is configured to receive the retention clip therein;

FIG. 52 is a sectional view taken along line 52-52 of FIG. 51 suggesting that the retention loop is formed by cutting the fiber reinforced sheet and deforming the resulting strip outwardly during molding to establish the clip-receiving space and showing that a seat-back cover may be configured to overlie and cover the retention loop;

FIG. 53 is a view similar to FIG. 52 showing another embodiment of a headrest included in a seat back showing that a seat-back cover may be configured to provide cushion and shock absorption to the tablet computer or smart phone by locating portions of the seat-back sheet and cushion in a clip receiving space; and FIG. 54 is a rear perspective view of a twelfth embodiment of a seat-back frame in accordance with the present disclosure showing that a headrest aperture has been formed in a headrest frame included in the seat-back frame.

DETAILED DESCRIPTION

A first embodiment of a vehicle seat 10 in accordance with the present disclosure is shown, for example, in FIGS. 1-4, 11, 12, and 31-34. A process 1100 for making a vehicle seat in accordance with the present disclosure is shown in FIGS. 5-10. Other embodiments of components included in a vehicle seat in accordance with the present disclosure are shown in FIGS. 13A-30B and 45-54. Several different embodiments of cover mounts used to couple a pad to a backrest frame included in a vehicle seat are shown in FIGS. 35-44B.

A first embodiment of a vehicle seat 10 in accordance with the present disclosure is shown, for example, in FIGS. 1-4, 11, 12, and 31-34. A second embodiment of a vehicle seat 110 in accordance with the present disclosure is shown in FIGS. 13A and 14A. A third embodiment of a backrest 1022 in accordance with the present disclosure is shown in FIGS. 13B, 14B, and 14C. A fourth embodiment of a backrest frame 234 in accordance with the present disclosure is shown in FIGS. 15 and 16. A fifth embodiment of a backrest frame 334 in accordance with the present disclosure is shown in FIGS. 17A, 18A, 19A, and 20A. A sixth embodiment of a backrest frame 1134 in accordance with the present disclosure is shown in FIGS. 17B, 18B, 19B, and 20B. A seventh embodiment of a seat back 418 in accordance with the present disclosure is shown in FIGS. 21-24. An eighth embodiment of a seat back 518 in accordance with the present disclosure is shown in FIGS. 25-30B. A ninth embodiment of a seat back 718 in accordance with the present disclosure is shown in FIGS. 45-48A. A tenth embodiment of a seat back 818 in accordance with the present disclosure is shown in FIG. 49. An eleventh embodiment of a seat back 1518 in accordance with the present disclosure is shown in FIGS. 50-53. A twelfth embodiment of a seat back 918 in accordance with the present disclosure is shown in FIG. 54.

Another embodiment of a seat-back cover 1436 in accordance with the present disclosure is shown in FIG. 48B. A first embodiment of an inner cover mount 90 used to couple a pad 91 to backrest frame 26 is shown in FIGS. 35-38A. A second embodiment of an inner cover mount 1290 in accordance with the present disclosure is shown in FIGS. 37B and 38B. A third embodiment of an inner cover mount 690 in accordance with the present disclosure is shown in FIGS. 39-44A. A fourth embodiment of an inner cover mount 1390 in accordance with the present disclosure is shown in FIGS. 43B and 44B.

The first embodiment of vehicle seat 10 in accordance with the present disclosure is shown in FIGS. 1-4, 11, 12, and 31-34. Vehicle seat 10 includes a seat foundation 12 adapted to be anchored to a vehicle floor 14, a seat bottom 16 mounted on seat foundation 12, and a seat back 18 arranged to extend upwardly from seat bottom 16 as suggested in FIGS. 1 and 2. Seat back 18 includes a backrest frame 26 and a backrest cover 28 as shown in FIG. 3. Together backrest frame 26 and backrest cover 28 cooperate to provide means for establishing a sympathetic shape in response to an occupant applying a force to the backrest when an occupant rests on vehicle seat 10 to cause the force to be distributed over a front face 18F of backrest cover 28 so that a reaction force applied back to an occupant is minimized and to cause a weight and a thickness 18T of seat back 18 to be minimized while strength of seat back 18 is maximized so that vehicle seat 10 withstands application of an external impact force to vehicle seat 10 while an occupant is resting on vehicle seat 10.

Seat back 18 includes a headrest 20, a backrest 22, and a backrest mount 24 as shown, for example, in FIG. 2. Backrest mount 24 is arranged to interconnect backrest 22 to seat bottom 16 to cause backrest 22 to pivot back and forth about a pivot axis 21 relative to seat bottom 16. Headrest 20 is appended to backrest 22 and arranged to extend upwardly away from seat bottom 16. As shown, for example, in FIG. 3, headrest 20 and backrest 22 are monolithic.

Backrest 22 includes a backrest frame 26 and a backrest cover 28 as shown in FIG. 3. Backrest frame 26 is coupled to seat bottom 16 by backrest mount 24 as shown in FIG. 1. Backrest cover 28 is coupled to backrest frame 26 to cover a forward surface 26F of backrest frame 26 and provide support to an occupant sitting on vehicle seat 10. Forward surface 26F is arranged to face an opposite rear surface 26R of backrest frame 26.

Headrest 20 includes a headrest frame 30 and a headrest cover 32 as shown in FIG. 3. Headrest frame 30 is appended to backrest frame 26 and arranged to extend upwardly away from backrest frame 26 as shown in FIG. 3. Headrest cover 32 is coupled to backrest cover 28 and arranged to cover a forward surface 30F of headrest frame 30 as shown in FIG. 2. Forward surface 30F is arranged to face an opposite rear surface 30R of headrest frame 30.

Together, headrest frame 30 and backrest frame 26 cooperate to establish a monolithic seat-back frame 34 as shown in FIGS. 3 and 4. Headrest cover 32 and backrest cover 28 cooperate to establish a seat-back cover 36 as shown in FIGS. 1-4 that covers portions of monolithic seat-back frame 34 while providing support to an occupant and maximizing comfort of an occupant sitting on vehicle seat 10.

Seat back 18 is formed in an illustrative manufacturing process 100 as shown, for example, in FIG. 5. Manufacturing process 100 includes a body-blank forming stage 102, a frame forming stage 104, and a seat-back forming stage 106 as illustrated in FIGS. 5 and 6. Body-blank forming stage 102 forms blanks 40 made from composite materials, also called fiber reinforced materials. Frame forming stage 104 forms monolithic seat-back frame 34 using blanks and plastics materials. Seat-back forming stage 106 forms seat-back cover 36 and couples seat-back cover 36 to seat-back frame 34 to establish seat back 18 as suggested in FIG. 6.

Body-blank forming stage 102 includes a providing CFR sheet operation 102A and a cutting blanks operation 102B as shown in FIGS. 6-8. Providing CFR sheet operation 102A provides a Continuous Fiber Reinforced (CFR) sheet 38 which is made from fiber reinforced materials as suggested in FIGS. 6 and 7. Cutting blanks operation 102B cuts CFR sheet 38 to provide several blanks 40 as shown in FIGS. 6, 8A, and 8B.

In one illustrative example, CFR sheet 38 is square with each side having about a same length 39. As an example, the length 39 measures about one meter. A first embodiment of a pattern 42 is laid out on CFR sheet 38 so as to minimize waste of each CFR sheet 38. As suggested in FIG. 7, several blanks 40A, 40B, 40C, 40D, 40E, 40F, and 40G are arranged on CFR sheet 38 prior to cutting operation 102B. As a result, each blank has a maximum width 40T of about 166 millimeters so that waste is minimized. In the example shown in FIGS. 7 and 8A, blanks 40A-40D are generally the same size and shape of every other blank 40A-40D. In addition, base blanks 40E and 40F are about the same shape and size so that they may be used with any pair of blanks 40A-40D as shown in FIGS. 7 and 8A. Once blanks are formed, they are transferred to frame forming stage 104 as shown in FIGS. 5 and 6.

In another example, a second embodiment of a pattern 142 is laid out on CFR sheet 38 so as to minimize waste of each CFR sheet 38 as shown in FIG. 8B. Several blanks 140A, 140B, 140C, 140D, 140E, 140F, 140G, and 140H are arranged on CFR sheet 38 prior to cutting operation 102B. As a result, each blank has the maximum width 40T of about 166 millimeters so that waste is minimized. In the example shown in FIGS. 8B and 9B, blanks 140A, 140B and 140E, 140F are generally the same size and shape. Blanks 140C and 140G are also generally the same size and shape. Finally blanks 140D and 140H are also generally the same size and shape. Once blanks are formed, they are transferred to frame forming stage 104 as shown in FIGS. 5 and 6.

Frame forming stage 104 includes an aligning operation 104A, a coupling operation 104B, a forming frame body operation 104C, a backrest mounting operation 104D, and a skin forming operation 104E as shown in FIG. 6. Aligning operation 104A uses several blanks and aligns them in a general shape of frame body 46 as suggested in FIGS. 9 and 9B.

When using blanks 40A, 40B, and 40F, blanks 40A and 40B are arranged in mirror relation to one another so that portions of the blanks 40A, 40B overlap one another in a headrest area 41 and base blank 40F is arranged to extend between blanks 40A, 40B as shown in FIG. 9A. When using blanks 140A, 140B, 140C, and 140D, blanks 140A are arranged as suggested in FIG. 9B. The blanks are then trimmed in an optional trimming operation to provide a general frame body shape (in phantom) as suggested in FIG. 9B.

As suggested in FIG. 6, coupling operation 104B couples blanks together to form one of a first embodiment of a frame-body blank 44 as shown in FIG. 9A and another embodiment of a frame-body blank 144 as shown in FIG. 9B. Forming frame body operation 104C uses the frame-body blank to form a frame body 46 as suggested in FIG. 11. Backrest mount-forming operation 104D forms backrest mount 24 by inserting two pairs of bushings 48A, 48B into associated apertures 50A, 50B formed backrest frame 26 as shown in FIG. 10. However, mount-forming operation 104D could be performed before, during, or after various other operations in frame forming stage 104. Skin forming operation 104E takes frame body 46 and backrest mount 24 and overlies a skin 50 made from plastics material to establish seat-back frame 34 as suggested in FIG. 11.

In one illustrative example, coupling operation 104B may be accomplished through the use of vacuum to retain blanks in place until forming frame body operation 104E can be completed. In another example, heat may be used to soften plastics material include in CFR sheet 38 to cause blanks to coupled together through intermixing of the plastics material. However, any other suitable alternatives may be used.

Forming frame body operation 104C may be performed using various techniques. In one example, frame-body blank 44, 144 or individual blanks may be arranged for thermoforming where heat is applied to the blanks and a male mold half and a female mold half are brought together to deform the blanks and establish frame body 46 after the mold halves separate. However, any other suitable alternative may be used.

Skin forming operation 104E may be performed using various techniques. In one example, frame body 46 is placed in a mold space formed in a female mold half. A male mold half is then mated with the female mold half and plastics materials are injected into the mold cavity defined between the male and female mold halves. As a result, molten plastics materials flows over frame body 46 in appropriate areas to establish skin 50 as suggested in FIG. 11. However, any other suitable alternatives may be used.

In another example, skin 50 may be established through compression overmolding. In the example of compression overmolding, skin forming and frame body forming may happen at substantially the same time.

As shown in FIG. 6, backrest mount-forming operation 104D may occur after frame-body forming operation 104C and before skin-forming operation 104E. However, backrest mount-forming operation may occur as part of blank-aligning operation 104A where bushings 48A, 48B are inserted into aperture 50A, 50B while the blanks are still flat and un-molded. In another example, bushings 48A, 48B may be inserted into frame body 46 during frame-body forming operation 104C. In this example, bushings 48A, 48B may be inserted into the mold prior to molding. During molding, the bushings are inserted into frame body 46 forming apertures 50A, 50B and coupling bushings 48A, 48B to frame body 46 happens at about the same time.

Once frame body 46 is formed, the process 100 proceeds to seat-back forming stage 106 as shown in FIGS. 5 and 6. Seat-back forming stage 106 includes a cover forming operation 106A and a cover coupling operation 106B as shown in FIG. 6. Cover forming operation 106 forms seat-back cover 36. Seat-back cover 36 includes, for example, seat-back sheet 52, a seat-back cushion 54, and an elastic support web 56 as shown in FIG. 12. Cover coupling operation 106B then couples seat-back cover 36 to seat-back frame 34 to establish seat back 18 as suggested in FIG. 6.

Seat back 18 includes backrest 22 and headrest 20 as shown in FIGS. 1 and 2. Backrest 22 includes backrest frame 26 and backrest cover 28. Backrest frame 26 includes a backrest foundation 58, a horizontal neck bolster 60, and first and second bolster joints 61, 62 as shown in FIG. 11. Backrest foundation 58 has a U-shape and is coupled to seat bottom 16 by backrest mount 24. Horizontal neck bolster 60, also called horizontal bolster 60, is coupled to backrest foundation 58 by first and second bolster joints 61, 62. Together, backrest foundation 58, horizontal neck bolster 60, and bolster joints 61, 62 cooperate to define a backrest aperture 64 as shown in FIG. 11. Headrest 20 is appended to horizontal neck bolster 60.

Backrest foundation 58 includes a backrest base 66, a first upright bolster 68, and a second upright bolster 70 as shown in FIGS. 2 and 11. Second upright bolster 70 is spaced apart from first upright bolster 68. Backrest base 66 is arranged to extend between and interconnect lower ends of first and second upright bolsters 68, 70 as shown in FIG. 11. One pair of bushings 48A, 48B is inserted in each upright bolster 70 as suggested in FIG. 10 to cause backrest mount 24 to interconnect backrest foundation 58 to seat bottom 16. Backrest base 66 is made from composite materials as suggested in FIGS. 9A and 9B.

As shown in FIG. 11, first upright bolster 68 is interconnected to horizontal neck bolster 60 by first bolster joint 61. Second upright bolster 70 is interconnected to horizontal neck bolster 60 by second bolster joint 62. In one illustrative example, upright bolsters 68, 70, bolster joints 61, 62, and horizontal neck bolster 60 are made from composite materials. Headrest frame 30 is appended to horizontal neck bolster 60 and arranged to extend upwardly away from horizontal neck bolster 60. In another example, backrest frame 26 and headrest frame 30 are made from composite materials and monolithic.

As shown in FIGS. 13A and 14A, another embodiment of a vehicle seat 110 includes a backrest 122 and backrest mount 24. Backrest 122 includes a backrest frame 126 and a backrest cover 128. Backrest frame 126 includes a backrest foundation 158, a horizontal neck bolster 160, and first and second bolster joints 161, 162 as shown in FIG. 14A. Backrest foundation 158 has a U-shape and is coupled to seat bottom 16 by backrest mount 24. Horizontal neck bolster 160 is coupled to backrest foundation 158 by first and second bolster joints 161, 162. Together, backrest foundation 158, horizontal neck bolster 160, and bolster joints 161, 162 cooperate to define a backrest aperture 164 as shown in FIG. 14A. While no headrest is shown with seat back 118, a separate movable headrest may be coupled to backrest 122 to move relative to backrest 122.

As shown in FIGS. 13B, 14B, and 14C another embodiment of a vehicle seat includes a backrest 1022 and backrest mount 24. Backrest 1022 includes a backrest frame 1026 and a backrest cover (not shown). Backrest frame 1026 includes a backrest foundation 1058, a horizontal neck bolster 1060, first and second bolster joints 1061, 1062, and a series of reinforcing ribs 1001 as shown in FIGS. 14B and 14C. Backrest foundation 1058 has a U-shape and is coupled to seat bottom 16 by backrest mount 24. As shown in FIG. 14C, backrest frame 1026 further includes an outer reinforcement flange 1002 which is coupled to a portion of a perimeter of backrest frame 1026. Outer reinforcement flange 1002 is arranged to extend from first bolster joint 1061, over horizontal neck bolster 1060, and past second bolster joint 1062 as shown in FIG. 14B. While no headrest is shown with seat back 1010, a separate movable headrest may be coupled to backrest 1022 to move relative to backrest 1022.

Still yet another embodiment of a monolithic seat-back frame 234 is shown, for example, in FIG. 15. Seat-back frame 234 includes a backrest frame 226 and a headrest frame 230 appended to backrest frame 226 as shown in FIG. 15. Backrest frame 226 includes backrest foundation 58, horizontal neck bolster 60, and first and second bolster joints 261, 262 as shown in FIG. 15. Horizontal neck bolster 60 is coupled to backrest foundation 58 by first and second bolster joints 261, 262. Together, backrest foundation 58, horizontal neck bolster 60, and bolster joints 261, 262 cooperate to define backrest aperture 64 as shown in FIG. 15. Headrest frame 230 is appended to horizontal neck bolster 60.

First bolster joint 261 is substantially the same as second bolster joint 262. As a result, only first bolster joint 261 will be discussed in detail. First bolster joint 261 is configured to provide means for blocking bending of headrest 20 about first and second bolster joints 261, 262 relative to backrest foundation 58 in response to application of external impact forces applied to the vehicle carrying monolithic seat-back frame 234. First bolster joint 261 includes, for example, a series of reinforcing ribs 272 spaced apart from one another by an associated series of channels 74 as shown in FIG. 16.

Reinforcing ribs 272 are formed from fiber reinforced material and are configured to maximize strength of seat-back frame 234 in first and second bolster joints 261, 262 as a result to orienting fibers in planes perpendicular to a surface defined by each peak of each reinforcing rib 272. In one illustrative example, the number and size of reinforcing ribs 272 may be varied to provide sufficient strength while maintaining a maximum width 40T of blank 40 of about 166 millimeters. A depth 272D of each reinforcing rib 272 and associated channel 274 may be varied so that different reinforcing ribs 272 have different depths. In one example, the reinforcing rib 272 may be configured to receive a cover retainer for coupling seat-back cover 36 to seat-back frame 234.

Still yet another embodiment of a monolithic seat-back frame 334 is shown, for example, in FIGS. 17A-20A. Seat-back frame 334 includes a backrest frame 326 and a headrest frame 330 appended to backrest frame 326 as shown in FIG. 17A. Backrest frame 326 includes backrest foundation 58, horizontal neck bolster 60, and first and second bolster joints 361, 362 as shown in FIG. 17A. Horizontal neck bolster 60 is coupled to backrest foundation 58 by first and second bolster joints 361, 362. Together, backrest foundation 58, horizontal neck bolster 60, and bolster joints 361, 362 cooperate to define backrest aperture 64 as shown in FIG. 17A.

First bolster joint 361 is substantially the same as second bolster joint 362. As a result, only first bolster joint 361 will be discussed in detail. First bolster joint 361 is configured to provide means for blocking bending of headrest 20 about first and second bolster joints 361, 362 relative to backrest foundation 58 in response to application of external impact forces applied to the vehicle carrying monolithic seat-back frame 334. First bolster joint 361 includes, for example, a front body flange 361A, a support web 361B, and a rear body flange 361C as shown in FIG. 18A. Support web 361B is arranged to lie between and interconnect front and rear body flanges 361A, 361C as shown in FIG. 19A.

Seat-back frame 334 includes a front body shell 346F and a rear body shell 346R as shown in FIGS. 18A and 19A. Portions of front and rear body shells 346F, 346R provide associated front and rear body flanges 361A, 361C in first and second bolster joints 361, 362. Support web 361B lies between front and rear body flanges 361A, 361C. As shown, for example, in FIG. 20A, front body flange 361A includes a first front fiber reinforced layer 361A1, a second front fiber reinforced layer 361A2, and a third front fiber reinforced layer 361A3. Rear body flange 361C includes a first rear fiber reinforced layer 361C1, a second rear fiber reinforced layer 361C2, and a third rear fiber reinforced layer 361C3. Between the front and rear fiber reinforced layers 361A, 361C lies support web 361B.

Bolster joints 361, 362 maximize strength of seat-back frame 334 by using support web 361B to distribute forces applied on front body flange 361A to back body flange 361C. Support web 361B resists shear forces applied to seat-back frame 334 while body flanges 361A, 361C resist bending moments experienced by seat-back frame 334. For example, support web 361B carries both bending and shear loads applied to seat-back frame 334 in planes perpendicular to flanges 361A, 361C. As a result of support web 361B laying in a space defined between flanges 361A, 361C and interconnecting flanges 361A, 361C is more than one dimension, torsion is also resisted by support web 361B.

In one example of manufacture, blanks are formed from a fiber reinforced sheet which includes only three fiber reinforced layers. Several blanks are arranged to form front body shell 346F and several additional blanks are arranged to form a rear body shell 346R. Body shells 346F, 346R may be formed using a thermoforming technique. Body shells 346F, 346R are then loaded in a space formed in a mold where a plastics material is injected between the body shells to establish support web 361B. The plastics material may be substantially solid or may be a cellular plastics material which expands upon exposure to air. Frame body 346 may have skin applied during the initial molding where support web 361B is established or in a subsequent insert molding step.

In another example of manufacture, blanks are formed as discussed above. Several blanks are loaded into a vacuforming mold where they are held in place by vacuum to create a space therebetween. Once the body shells 346F, 346R are established, plastics material may be injected between body shells 346F, 346R to establish support web 361B. The plastics material may be a solid, a cellular material that expands upon contact with air, or a cellular material that expands in response to application of pressure and heat. The frame body 346 may have skin applied during the initial vacuforming where support web 361B is established or in a subsequent insert molding step.

In still yet another example of manufacture, a laminate is formed using thermoforming. The laminate comprises two body blanks arranged as a top layer, two more body blanks arranged as a bottom layer, and a web of material located between body blanks. During thermoforming, the top layer and bottom layer are formed to establish body shells while the web flows to fill space between the front and rear body shells. While thermoforming is discussed, the laminate may be molded using a reflow process in which the plastics material web is heated to a molten state which causes the plastics material to flow into the space formed between the body shells.

In one illustrative example, the support web 361C may be a substantially solid polyamide or any other suitable alternative plastics material. In another example, the support web 361C may be a cellular polymeric material so as to minimize weight and an amount of plastics material used to establish support web 361C. The cellular polymeric material may be formed from polyamide or any other suitable alternative plastics material.

Another embodiment of a monolithic seat-back frame 1134 in accordance with the present disclosure is shown, for example, in FIGS. 17B-20B. Seat-back frame 1134 includes a backrest frame 1126, a headrest frame 1130, and a set of reinforcing ribs 1101 as shown in FIG. 18B. Headrest frame 1130 is appended to backrest frame 1126 and arranged to extend in an upward direction. Reinforcing ribs 1101 are appended to a rearward surface 1102 of headrest frame 1130 and backrest frame 1126 and are configured to provide means for blocking bending of headrest frame 1130 about first and second bolster joints 1161, 1162 relative to backrest frame 1126 in response to application of external impact forces applied to the vehicle carrying seat-back frame 1134.

Seat-back frame 1134 further includes inner and outer reinforcing flanges 1103, 1104 as shown in FIGS. 17B-20B. Inner reinforcing flange 1103 is coupled along a perimeter edge that defines backrest aperture 1164 and extends in the rearward direction. Outer reinforcing flange 1104 is coupled along a portion of a perimeter edge of both headrest frame 1130 and backrest frame 1126 and arranged to extend in the rearward direction. Together, reinforcing flanges 1103, 1004 cooperate to provide means for blocking bending of headrest frame 1130 about first and second bolster joints 1161, 1162 relative to backrest frame 1126 in response to application of external impact forces applied to the vehicle carrying seat-back frame 1134.

Another embodiment of a seat back 418 in accordance with the present disclosure is shown, for example, in FIGS. 21 and 22. Seat back 418 includes headrest 20, backrest 22, a first armrest mount 476, and a second armrest mount 478 as shown in FIGS. 21-23. In one illustrative example, first armrest mount 476 is appended to first upright bolster 68 included in backrest 22. First armrest mount 476 is arranged to extend away from first and second upright bolsters 68, 70 as shown in FIG. 21. Second armrest mount 478 is substantially the same as first armrest mount 476 but is instead coupled to second upright bolster 70. Second armrest mount 478 is arranged to extend away from both first and second upright bolsters 68, 70 as suggested in FIG. 21.

An armrest 480 is coupled to first armrest mount 476 by a snap-fit connection 482 as suggested in FIG. 21. Snap-fit connection 482 permits armrest 480 to be coupled to backrest 22 without the use of fasteners. In addition, both first and second armrest mounts 476, 478 may be coupled to backrest 22 whether armrest 480 is coupled to one or both of armrest mounts 476, 478.

Armrest mount 476 includes a first retaining tab 476A, a second retaining tab 467B, and a plurality of mount reinforcing ribs 476C as shown in FIG. 23. First retaining tab 476A is appended to first upright bolster 68 and arranged to extend away from first and second upright bolsters 70. Second retaining tab 476B is appended to first upright bolster 68 and arranged to extend away from first and second upright bolsters 68, 70. Second retaining tab 476B is positioned to lie in spaced-apart relation below first retaining tab 476A. Mount reinforcing ribs 476C are appended to first upright bolster 68 and are located between first and second retaining tabs 476A, 476B.

Armrest 480 includes a mount housing 480A, an optional retainer 480B, an armrest axle 480C, an arm support 480D, and housing reinforcing ribs 480E as shown in FIG. 24. Mount housing 480A is cooperates with armrest mount 476 to be coupled to armrest mount via snap-fit connection 482. Housing reinforcing ribs 480E are appended to mount housing 480A and arranged to extend toward armrest mount 476. In one illustrative example, housing reinforcing ribs 480E are spaced apart from one another to allow associated mount reinforcing ribs 476C to lie therebetween as shown in FIG. 22. As a result, armrest 480 and armrest mount 476 are able to withstand a load of about 100 pounds applied to a distal end of armrest 480 when armrest 480 is in the lowered horizontal position as shown in FIG. 22.

Armrest axle 480C of armrest 480 is arranged to extend between and interconnect arm support 480D and mount housing 480A to cause arm support 480D to rotate about a pivot axis relative to mount housing 480A. In one example, optional retainer 480B may be used to retain armrest axle 480C to mount housing 480A. In another example, armrest axle 480C and mount housing 480A may be configured so that no retainer is required.

During installation of armrest 480 on seat-back frame 434, armrest 480 is moved relative to armrest mount 476 in a forward direction 484 from front to back as suggested in FIG. 21. During engagement of mount housing 480A with armrest mount 476, retaining tabs 476A, 476B deform to allow mount housing 480A move past retaining tabs 476A, 476B and engage reinforcing ribs 476C and 480E. After mount housing 480A moves past retaining tabs 476A, 476B, retaining tabs 476A, 476B return to the un-deformed state blocking removal of armrest 480. As a result, armrest 480 is coupled to armrest mount 476 without fasteners thus minimizing installation complexity. In addition, cost is minimized further because the same armrest mount 476 may be used on either or both upright bolsters 68, 70 further simplifying the design of the armrest.

In one example of manufacture, armrest mount 476 may be made from plastics materials such as polyamide or another suitable alternative. Armrest mount 476 may be formed during the skin forming step of the manufacturing process when other plastics materials are being coupled to the frame body.

Another embodiment of a seat back 518 in accordance with the present disclosure is shown, for example, in FIG. 25. Seat back 518 includes headrest 20, backrest 22, and an airbag mount 586 as shown in FIGS. 25-27. As shown in FIG. 25, airbag mount 586 is appended to first upright bolster 68 and arranged to extend away from first and second upright bolsters 68, 70. Airbag mount 586 is configured to support and retain an airbag 588 so that the airbag 588 may deploy in response to application of external forces to the vehicle carrying seat back 518 as suggested in FIGS. 26 and 27. While only one airbag mount 586 is shown in FIG. 25, additional airbag mounts may be included in the seat back to support additional airbags.

Airbag mount 586 includes a mount plate 586A, an upper retention ring 586B, and a lower retention clip 586C as shown in FIGS. 26-28B. Mount plate 586A is appended to first upright bolster 68 as shown in FIGS. 28A and 28B. Upper retention ring 586B is appended to an upper end of mount plate 586A and formed to include upper and lower apertures opening into a space formed in the upper retention ring 586B. Lower retention clip 586C is appended to mount plate 586A in spaced-apart relation below upper retention ring 586B. Lower retention clip 586C is formed to include upper and lower apertures opening into a spaced formed in the lower retention clip 586C. Lower retention clip 586C is also formed to include a gap extending between and opening into the upper and lower apertures formed in the lower retention clip 586C.

Airbag 588 includes, for example, an electrical connector 588A, a pyrotechnic cylinder 588B, and an inflatable sack 588C as shown in FIGS. 29A and 30A. Pyrotechnic cylinder 588B is coupled to electrical connector 588A. During an impact to the vehicle, an electrical signal may be sent to the electrical connector 588A which causes pyrotechnic cylinder 588B to detonate. As a result, pressurized gas is discharged into inflatable sack 588C which is coupled to pyrotechnic cylinder 588B to cause airbag 588 to go from a deflated state shown in FIG. 26 to an inflated state shown in FIG. 27.

Airbag 588 is installed on seat back 518 by sliding pyrotechnic cylinder 588B up through lower retention clip 586C and through the lower aperture into the space of the upper retention ring 586B. Next, electrical connector 588A is inserted through the upper aperture into the space of upper retention ring 586B to mate with pyrotechnic cylinder 588B. Finally, electrical connector 588A is rotated relative to pyrotechnic cylinder 588B to couple electrical connector 588A to pyrotechnic cylinder 588B.

Another embodiment of an airbag 1288 includes, for example, an electrical connector 1288A, a pyrotechnic cylinder 1288B, an inflatable sack 1288C, and an airbag ring 1288D as shown in FIGS. 29B and 30B. Airbag ring 1288D is coupled to pyrotechnic cylinder 588B as shown in FIG. 29B. Pyrotechnic cylinder 1288B is coupled to electrical connector 1288A. During an impact to the vehicle, an electrical signal may be sent to the electrical connector 1288A which causes pyrotechnic cylinder 1288B to detonate. As a result, pressurized gas is discharged into inflatable sack 1288C which is coupled to pyrotechnic cylinder 1288B to cause airbag 1288 to go from a deflated state shown in FIG. 26 to an inflated state shown in FIG. 27.

Airbag 1288 is installed on seat back 118 by snapping pyrotechnic cylinder 1288B through a gap 1288E formed in lower retention clip 586C so that airbag ring 1288D is located between upper retention ring 586B and lower retention clip 586C. Pyrotechnic cylinder 1288E is then slid into the space of upper retention ring 1286B. Next, electrical connector 1288A is inserted through the upper aperture into the space of upper retention ring 586B to mate with pyrotechnic cylinder 1288B. Finally, electrical connector 1288A is rotated relative to pyrotechnic cylinder 1288B to couple electrical connector 588A to pyrotechnic cylinder 588B. Airbag ring 1288D is configured to retain pyrotechnic cylinder 1288B coupled to airbag mount 586 when pyrotechnic cylinder 1288B detonates.

In one example of manufacture, airbag mount 586 may be made from plastics materials such as polyamide or another suitable alternative. In another example, portions of the fiber reinforced sheet may be cut to cause a portion of the fiber reinforced sheet to be located in and support airbag mount 586. Plastics material may then be flowed around the fiber reinforced portions to provide an airbag mount. Airbag mount 586 may be formed during the skin forming step of the manufacturing process when other plastics materials are being coupled to the frame body.

Vehicle seat 10 includes monolithic seat-back frame 34 and seat-back cover 36 as shown in FIG. 31. Seat-back cover 36 is arranged to overlie seat-back frame 34 and provide support and comfort to an occupant resting on vehicle seat 10. Seat-back cover 36 includes, for example, elastic support web 56, seat-back cushion 54, and seat-back sheet 52, an inner cover mount 90, and an outer cover mount 92 as shown in FIG. 32. Seat-back cushion 54 and seat-back sheet 52 cooperate to provide a pad 91 as suggested in FIG. 32. Pad 91 is arranged to overlie only a portion of seat-back frame 34 while elastic support web 56 is arranged to extend over and cover backrest aperture 64 formed in seat-back frame 34 as suggested in FIG. 32.

In one example, seat-back cushion 54 includes a backrest cushion 54B and a headrest cushion 54H. Backrest cushion 54B is coupled to a forward surface 26F of backrest frame 26 as shown in FIG. 11. Headrest cushion 54H is coupled to a forward surface 30F of headrest frame 30 as shown in FIG. 11. Together, headrest cushion 54H and backrest cushion 54B cooperate to establish seat-back cushion 54 as shown in FIG. 12.

Seat-back sheet 52 includes a backrest sheet 52B and a headrest sheet 52H as shown in FIG. 12. Backrest sheet 52B is coupled to backrest cushion 54B to locate backrest cushion 54B between backrest sheet 52B and forward surface 26F of backrest frame 26. Headrest sheet 52H is coupled to headrest cushion 54H to locate headrest cushion 54H between headrest sheet 52H and forward surface 30F of headrest frame 30 as shown in FIG. 11. Together, headrest sheet 52H and backrest sheet 52B cooperate to establish seat-back sheet 52 as shown in FIG. 12.

Backrest sheet 52B and backrest cushion 54B cooperate to establish a backrest pad 93 as shown in FIG. 12. Backrest pad 93 has a rear face 93R arranged to face toward forward surface 26F of backrest frame 26 and a front face 93F arranged to face opposite rear face 93R.

Headrest sheet 52H and headrest cushion 54H cooperate to establish a headrest pad 95 as shown in FIG. 12. Headrest pad 95 has a rear face 95R arranged to face toward forward surface 30F of headrest frame 30 and a front face 95F arranged to face opposite rear face 95R. Together, backrest pad 93 and headrest pad 95 cooperate to establish pad 91 as shown in FIG. 12.

Inner cover mount 90 is configured to provide means for coupling elastic support web 56 to backrest frame 26 along a path 94 to cause elastic support web 56 to form a lumbar support 96 arranged to support an occupant's lumbar region 97. As shown in FIG. 33, path 94 is curved. In another example, path 94 is serpentine. In still yet another example, path 94 has an S-shape when viewed from a left side of seat back 18. As suggested in FIG. 33, path 94 has a concave portion 94A that is arranged to extend away from seat bottom 16 and a convex portion 94B that is arranged to extend toward seat bottom 16. Concave portion 94A is arranged to lie above convex portion 94B and is adapted to support an occupant's shoulders and upper back. Convex portion 94B is adapted to an occupant's lower back and lumbar region.

Inner cover mount 90 includes an inner mount band 90A coupled to elastic support web 56 and an inner rim 90B appended to backrest frame 26 as shown in FIGS. 35 and 36. In one example, elastic support web 56 is sewn to inner mount band 90A. Inner rim 90B is formed to include a band-receiving channel 90B1 and a series of space-apart retention clips 90B2 located in band-receiving channel 90B1. In one illustrative example, band-receiving channel 90B1 is a reinforcing rib formed in backrest frame 26 along path 94. In another illustrative example, band-receiving channel 90B1 is formed in plastics material provided during the skin-forming operation.

Each retention clip 90B2 is made from plastics material and established, for example, during the skin forming operation discussed previously. However, each retention clip 90B2 may be formed from plastics materials. Located in band-receiving channel 90B1, and coupled to backrest frame 26. Retention clips 90B2 are shaped and configured to receive inner mount band 90A therein and couple elastic support web 56 to backrest frame 26 to cause only elastic support web 56 to be visible as elastic support web 56 extends across and covers backrest aperture 64 as suggested in FIGS. 37 and 38.

Pad 91 is coupled to both elastic support web 56 and inner cover mount 90 as shown, for example, in FIG. 35. While elastic support web 56 extends over and covers backrest aperture 64, outer cover mount 92 extends away backrest aperture 64 and around backrest frame 26 to cover backrest frame 26 as shown in FIGS. 33 and 34. Pad 91 is again coupled to backrest frame 26 by outer cover mount 92. As an example, outer cover mount 92 may be located at any location on rearward surface 1000 of seat-back frame 34.

Outer cover mount 92 is configured to provide means for coupling pad 91 to seat-back frame 34 along a path 98 to cause pad 91 to conceal portions of seat back 18 so that an aesthetically pleasing appearance is provided. Outer cover mount 92 includes an outer mount band 92A coupled to pad 91 and an outer rim 92B appended to seat-back frame 34 as shown in FIGS. 35 and 36. In one example, pad 91 is sewn to outer mount band 92A. Outer rim 92B is formed to include a band-receiving channel and a series of space-apart retention clips located in band-receiving channel. In one illustrative example, band-receiving channel is a reinforcing rib formed in seat-back frame 34 along path 98. In another illustrative example, band-receiving channel is formed in plastics material provided during the skin-forming operation.

Each retention clip is made from plastics material and established, for example, during the skin forming operation discussed previously. Retention clips are shaped and configured to receive outer mount band 92A therein and couple pad 91 to seat-back frame 34 to cause only pad 91 to be visible as pad 91 extends over seat-back frame 34 as suggested in FIGS. 37A and 38A.

In one example, a cover bracket may be coupled to the seat back to enclose the inner and outer cover mounts. The cover bracket may be made of plastics material and covered with trim to provide an aesthetically pleasing appearance.

Another embodiment of an inner rim 1290B is shown, for example, in FIGS. 37B and 38B. Inner rim 1290B is formed to include a band-receiving channel 1290B1 and a series of space-apart retention clips 1290B2 located in band-receiving channel 1290B1. A series of associated apertures 1202 are formed in the fiber reinforce sheet and configured to provide access through which a portion of a mold may be inserted there through during molding to form each retention clip 1290B2.

Another embodiment of a retention clip 692B2 is shown, for example, in FIGS. 39-44A. Retention clip 692B2 includes a pair of retention tabs 601, 602 formed from the fiber reinforced sheet and retention prongs 603, 604 made from plastics materials which are overmolded around associated retention tabs 601, 602. Overmolding of retention prongs 603, 604 may be performed during the skin forming operation or in a subsequent operation.

Retention clip 692B2 is form by cutting a portion of CFR sheet 38 to have an H-shape cut 605 that forms two retention tabs 601, 602 as shown in FIG. 39. The H-shape cut 605 is located in a band-receiving channel 692B1 which is identified by two spaced-apart phantom lines 606, 607 as shown in FIG. 39. During molding of the frame body, band-receiving channel 692B1 is formed along two spaced-apart phantom lines 606, 607 as shown in FIG. 40. Also during molding, retention tabs 601, 602 are folded away from one another so as to extend up into band-receiving channel 692B1 and establish an aperture 608 as shown in FIG. 41. Finally, plastics materials are flowed over retention tabs 601, 602 to provide for retention prongs 603, 604 and establish retention clip 692B2 as shown in FIGS. 42-44. As a result, strength and resilience of retention clip 692B2 is maximized as a result of including fiber reinforced retention tabs 601, 602.

Another embodiment of a retention clip 1392B2 is shown, for example, in FIGS. 43B and 44B. Retention clip 1392B2 includes the pair of retention tabs 601, 602 formed from the fiber reinforced sheet, retention prongs 603, 604 made from plastics materials, and a reinforcing element 1302 as shown in FIGS. 43B and 44B. Both retention prongs 603, 604 may be overmolded around associated retention tabs 601, 602. Reinforcing element 1302 may also be molded around second retention prong 604 so as to reinforce the second retention tab and prong 602, 604 against forces imparted on second retention prong 604 by elastic support web 56.

In another embodiment in accordance with the present the disclosure, a seat back 718 includes seat-back frame 34 and a seat-back cover 736. Seat-back cover 736 is arranged to overlie seat-back frame 34 and provide support and comfort to an occupant resting on vehicle seat 710. Seat-back cover 736 includes, for example, elastic support web 756, seat-back cushion 754, seat-back sheet 52, inner cover mount 90, and outer cover mount 92 as shown in FIGS. 45 and 46. Seat-back cushion 754 and seat-back sheet 52 cooperate to provide pad 791 as suggested in FIG. 48A. Pad 791 and elastic support web 756 are arranged to overlie only a portion of seat-back frame 34. Seat-back sheet 52 and elastics support web 756 are arranged to extend over and cover backrest aperture 64 formed in seat-back frame 34 as suggested in FIGS. 46 and 48A.

Inner cover mount 90 is configured to provide means for coupling elastic support web 756 and seat-back sheet 52 to backrest frame 26 along path 94 to cause elastic support web 756 and seat-back sheet 52 to form a lumbar support 796 arranged to support an occupant's lumbar region. As shown in FIG. 47, path 94 is curved. In another example, path 94 is serpentine. In still yet another example, path 94 has an S-shape when viewed from a left side of seat back 18. As suggested in FIG. 47, path 94 has a concave portion 94A that is arranged to extend away from seat bottom 16 and a convex portion 94B that is arranged to extend toward seat bottom 16. Concave portion 94A is arranged to lie above convex portion 94B and is adapted to support an occupant's shoulders and upper back. Convex portion 94B is adapted to an occupant's lower back and lumbar region.

In one example, elastic support web 756 is sewn to inner mount band 90A. Inner rim 90B is formed to include a band-receiving channel 90B 1 and a series of space-apart retention clips 90B2 located in band-receiving channel 90B1. In one illustrative example, band-receiving channel 90B 1 is a reinforcing rib formed in backrest frame 26 along path 94. Each retention clip 90B2 is made from plastics material and established, for example, during the skin forming operation discussed previously. Retention clips 90B2 are shaped and configured to receive inner mount band 90A therein and couple elastic support web 756 to backrest frame 26 to cause only elastic support web 56 to be visible from the rear of the vehicle seat through backrest aperture 64.

Pad 791 is coupled to both elastic support web 756 and inner cover mount 90 as shown, for example, in FIG. 47. Both pad 791 and elastic support web 756 extend over and cover backrest aperture 64. Similarly, both pad 791 and elastic support web 756 extends away backrest aperture 64 and around backrest frame 26 to cover backrest frame 26 as shown in FIGS. 45 and 46. Pad 791 and elastic support web 756 are both coupled to backrest frame 26 by outer cover mount 92.

Outer cover mount 92 is configured to provide means for coupling pad 791 and elastic support web 756 to seat-back frame 34 along path 98 to cause pad 791 and elastic support web 756 to conceal portions of seat back 18 so that an aesthetically pleasing appearance is provided. Outer cover mount 92 includes outer mount band 92A coupled to pad 791 and outer rim 92B appended to seat-back frame 34 as shown in FIG. 47 and suggested in FIG. 48A. In one example, pad 791 and elastic support web 756 is sewn to outer mount band 92A.

Another embodiment of a seat-back cover 1436 in accordance with the present disclosure is shown, for example, in FIG. 48B. Seat-back cover 1436 is arranged to overlie seat-back frame 34 and provide support and comfort to an occupant resting on the vehicle seat of which seat-back cover 1436 is included. Seat-back cover 1436 includes, for example, elastic support web 56, seat-back cushion 754, seat-back sheet 52, inner cover mount 90, and outer cover mount 92 as shown in FIG. 48B. Seat-back cushion 754 and seat-back sheet 52 cooperate to provide pad 791 as suggested in FIG. 48B. Pad 791 are arranged to overlie only a portion of seat-back frame 34. Seat-back sheet 52 and elastics support web 756 are arranged to extend over and cover backrest aperture 64 formed in seat-back frame 34 as suggested in FIG. 48B.

Still yet another embodiment of a seat back 818 is shown, for example, in FIG. 49. Seat back 818 includes backrest 22 and a headrest 820. Headrest 820 is formed to include a depression 802 during seat-frame forming. Depression 802 is sized and shaped to receive and retain a tablet computer 804, smart phone, or any other suitable alternative. In the example of FIG. 49, depression 802 has a rectangular shape. However, any other suitable shapes may be employed. A connection port 806 may be included in depression 802 for coupling to an associated data connection included in the tablet computer, smart phone, or other electronic device. In one example, connection port 806 is a USB port.

Another embodiment of a seat back 1518 is shown, for example, in FIGS. 50 and 51. Seat back 1518 includes backrest 22 and a headrest 1520. Headrest 1520 includes a headrest frame 1530 and retention loop 1502 as shown in FIGS. 50 and 51. Retention loop 1502 is adapted to receive a retention clip 1504 coupled to a rear side 1506 of a tablet computer 1508 or other device. Retention clip 1504 is configured to extend through a clip-receiving space 1510 defined between retention loop 1502 and headrest frame 1530.

Headrest 1520 further includes a headrest cover 1532 which extends around headrest frame 1530 and covers retention loop 1502 as shown, for example, in FIG. 52. As a result, a portion of seat-back sheet 1552 and seat-back cushion 1554 are arranged to overlie retention loop 1504 as shown in FIG. 52.

Another embodiment of a headrest 1620 is suggested in FIG. 53. Headrest 1620 also includes a retention loop 1602. A portion of headrest cover 1632 is arranged to extend into clip-receiving space 1610 to provide cushion and shock absorption to a tablet computer or smart phone. Another portion of headrest cover 1632 is arranged to overlie retention loop 1602 as shown in FIG. 53.

Another embodiment of a seat back 918 in accordance with the present disclosure is shown in FIG. 54. Seat back 918 includes backrest 22 and a headrest 920. Headrest 920 is formed to include a headrest aperture 964 as shown in FIG. 54. Headrest aperture 964 may be configured to provide maximized strength to headrest 920 while minimizing an amount of plastics materials used to form reinforcing ribs during the skin forming operation discussed previously. Headrest aperture 964 also may provide cooling to an occupant's head as well as provide an aesthetically pleasing look to headrest 920.

The following numbered clauses include embodiments that are contemplated and non-limiting:

Clause 1. A vehicle seat comprising a seat bottom and a seat back coupled to the seat bottom to extend upwardly away from the seat bottom, the seat back including a backrest adapted to support a back of an occupant resting on the vehicle seat and a backrest mount arranged to interconnect the backrest and the seat bottom to cause the backrest to pivot back and forth about a pivot axis relative to the seat bottom, and the backrest including a backrest frame made from composite materials and having a forward surface adapted to face toward an occupant and an opposite rear surface arranged to face opposite the forward surface and a backrest cover coupled to the backrest frame and including a rear face arranged to face toward and cover the forward surface of the backrest frame and a front face arranged to face opposite the rear face, wherein the backrest frame and the backrest cover cooperate to provide means for establishing a sympathetic shape in response to an occupant applying a force to the backrest when an occupant rests on the vehicle seat to cause the force to be distributed over the front face of the backrest cover so that a reaction force applied back to an occupant is minimized and to cause a weight and a thickness of the seat back to be minimized while strength of the seat back is maximized so that the vehicle seat withstands application of an external impact force to the vehicle seat while an occupant is resting on the vehicle seat.

Clause 2. A vehicle seat comprising a seat bottom and a seat back coupled to the seat bottom to extend upwardly away from the seat bottom, the seat back including a backrest and a backrest mount arranged to interconnect the backrest and the seat bottom to cause the backrest to pivot back and forth about a pivot axis relative to the seat bottom, the backrest including a backrest frame made from composite materials and having a forward surface adapted to face toward an occupant and an opposite rear surface arranged to face opposite the forward surface and a backrest cover being coupled to the backrest frame to move therewith and including a rear face arranged to face toward and cover the forward surface of the backrest frame and a front face arranged to face opposite the rear face.

Clause 3. The vehicle seat of any preceding clause, wherein the backrest frame includes a backrest foundation, particularly a U-shaped backrest foundation, coupled to the seat bottom by the backrest mount, a horizontal bolster spaced apart from the backrest foundation to locate the backrest foundation between the seat bottom and the horizontal bolster, and first and second bolster joints interconnecting and the backrest foundation and the horizontal bolster.

Clause 4. The vehicle seat of any preceding clause, wherein the backrest foundation includes a backrest base, a first upright bolster arranged to extend between and interconnect the first bolster joint and a first end of the backrest base, and a second upright bolster spaced apart from the first bolster joint and arranged to extend between and interconnect second bolster joint and an opposite second end of the backrest base.

Clause 5. The vehicle seat of any preceding clause, wherein the backrest foundation, the horizontal bolster, and first and second bolster joints cooperate to define a backrest aperture formed in the backrest frame.

Clause 6. The vehicle seat of any preceding clause, wherein the seat back further includes a headrest adapted to support a head of an occupant resting on the vehicle seat, coupled to the backrest to extend away from the seat bottom and to locate the backrest between the headrest and the seat bottom Clause 7. The vehicle seat of any preceding clause, wherein the headrest includes a headrest frame made from composite material and having a forward surface adapted to face toward an occupant and an opposite rear surface arranged to face opposite the forward surface of the headrest frame and a headrest cover coupled to the headrest frame and having a rear face arranged to face toward and cover the forward surface of the headrest frame and a front face arranged to face opposite the rear face of the headrest cover.

Clause 8. The vehicle seat of any preceding clause, wherein the headrest frame and the backrest frame cooperate with the headrest frame to establish a monolithic seat-back frame included in the vehicle seat.

Clause 9. The vehicle seat of any preceding clause, wherein the backrest cover further includes an elastic support web.

Clause 10. The vehicle seat of any preceding clause, wherein the backrest cover includes a backrest sheet providing the front face of the backrest cover and being located in spaced-apart relation to the forward surface of the backrest frame and a backrest cushion providing the rear face of the backrest cover and being located between the backrest frame and the backrest sheet.

Clause 11. The vehicle seat of any preceding clause, wherein the elastic support web is coupled to the backrest sheet and the backrest cushion and arranged to extend over and cover a backrest aperture formed in the backrest frame.

Clause 12. The vehicle seat of any preceding clause, wherein the backrest cover further includes an inner cover mount arranged to interconnect the backrest sheet and the backrest cushion.

Clause 13. The vehicle seat of any preceding clause, wherein the inner cover mount interconnects the backrest sheet and the backrest cushion to the backrest frame along a backrest aperture formed in the backrest and configured to provide means for coupling the elastic support web to the backrest frame along a path to cause the elastic support web to form a lumbar support so that a lumbar region of an occupant is supported when an occupant is resting on the vehicle seat.

Clause 14. The vehicle seat of any preceding clause, wherein the backrest cover further includes an outer cover mount arranged to interconnect the backrest sheet and the backrest cushion.

Clause 15. The vehicle seat of any preceding clause, wherein the outer cover mount interconnects the backrest sheet and the backrest cushion to the opposite rear surface of the backrest frame to cause the backrest cover to cover the forward surface of the backrest frame and extend from the opposite rear surface of the backrest frame to a backrest aperture formed in the backrest.

Clause 16. The vehicle seat of any preceding clause, wherein the composite materials of the backrest frame include a frame body made from a continuous fiber reinforced sheet and a skin made from plastics materials.

Clause 17. The vehicle seat of any preceding clause, wherein the skin is located between the frame body and the backrest cover and provides the forward surface of the backrest frame.

Clause 18. The vehicle seat of any preceding clause, wherein the backrest cover includes a backrest pad arranged to cover the forward surface of the backrest frame, an elastic support web arranged to extend over and cover a backrest aperture formed in the backrest frame, and an inner cover mount provided by the skin of the backrest frame.

Clause 19. The vehicle seat of any preceding clause, wherein the inner cover mount is arranged to interconnect the backrest pad to the backrest frame along the backrest aperture and configured to provide means for coupling the elastic support web to the backrest frame along a path to cause the elastic support web to form a lumbar support so that a lumbar region of an occupant is supported when an occupant is resting on the vehicle seat.

Clause 20. The vehicle seat of any preceding clause, wherein the backrest pad, the elastic support web, and the inner cover mount are arranged to couple the backrest pad to the backrest frame along a path to cause the elastic support web to form a lumbar support.

Clause 21. The vehicle seat of any preceding clause, wherein the backrest mount includes a pair of bushings coupled to associated bushing receivers formed in the backrest frame to cause the pair of bushings to extend through the backrest frame from the forward surface to the opposite rear surface.

What is claimed is:

1. A vehicle seat comprising;
    a seat bottom and
    a seat back coupled to the seat bottom to extend upwardly away from the seat bottom, the seat back including a backrest adapted to support a back of an occupant resting on the vehicle seat and a backrest mount arranged to interconnect the backrest and the seat bottom to cause the backrest to pivot back and forth about a pivot axis relative to the seat bottom, and the backrest including a backrest frame made from composite materials and having a forward surface adapted to face toward an occupant and an opposite rear surface arranged to face opposite the forward surface and a backrest cover coupled to the backrest frame and including a rear face arranged to face toward and cover the forward surface of the backrest frame and a front face arranged to face opposite the rear face,
    wherein the backrest frame and the backrest cover cooperate to provide means for establishing a sympathetic shape in response to an occupant applying a force to the backrest when an occupant rests on the vehicle seat to cause the force to be distributed over the front face of the backrest cover so that a reaction force applied back to an occupant is minimized and to cause a weight and a thickness of the seat back to be minimized while strength of the seat back is maximized so that the vehicle seat withstands application of an external impact force to the vehicle seat while an occupant is resting on the vehicle seat,
    wherein the backrest cover includes a backrest sheet providing the front face of the backrest cover and being located in spaced-apart relation to the forward surface of the backrest frame and a backrest cushion providing the rear face of the backrest cover and being located between the backrest frame and the backrest sheet,
    wherein the backrest cover further includes an elastic support web that is coupled to the backrest sheet and the backrest cushion and arranged to extend over and cover a backrest aperture formed in the backrest frame
    wherein the backrest cover further includes an inner cover mount interconnecting the elastic web support to the backrest sheet and the backrest cushion and the inner cover mount attaching the backrest sheet and the backrest cushion to the backrest frame along the backrest aperture formed in the backrest and configured to provide means for coupling the elastic support web to the backrest frame along a path to cause the elastic support web to form a lumbar support so that a lumbar region of an occupant is supported when an occupant is resting on the vehicle seat,
    wherein the inner cover mount comprises an inner mount band and spaced-apart retention clips located in a band-receiving channel that receive the inner mount band to secure the backrest sheet, backrest cushion and elastic support web to the backrest frame.

2. A vehicle seat comprising;
    a seat bottom and
    a seat back coupled to the seat bottom to extend upwardly away from the seat bottom, the seat back including a backrest and a backrest mount arranged to interconnect the backrest and the seat bottom to cause the backrest to pivot back and forth about a pivot axis relative to the seat bottom, the backrest including a backrest frame made from composite materials and having a forward surface adapted to face toward an occupant and an opposite rear surface arranged to face opposite the forward surface and a backrest cover being coupled to the backrest frame to move therewith and including a rear face arranged to face toward and cover the forward surface of the backrest frame and a front face arranged to face opposite the rear face,
    wherein the backrest cover further includes an inner cover mount interconnecting the elastic web support to a backrest sheet and a backrest cushion and the inner cover mount attaching the backrest sheet and the backrest cushion to the backrest frame along a backrest aperture formed in the backrest and configured to provide means for coupling an elastic support web to the backrest frame along a path to cause the elastic support web to form a lumbar support so that a lumbar region of an occupant is supported when an occupant is resting on the vehicle seat,
    wherein the inner cover mount comprises an inner mount band and spaced-apart retention clips located in a band-receiving channel that receive the inner mount band to secure the backrest sheet, backrest cushion and elastic support web to the backrest frame.

3. The vehicle seat of claim 2, wherein the backrest frame is formed to include a backrest aperture and includes a U-shaped backrest foundation coupled to the seat bottom by the backrest mount, a horizontal bolster spaced apart from the U-shaped backrest foundation to locate the U-shaped backrest foundation between the seat bottom and the horizontal bolster, and first and second bolster joints interconnecting and the U-shaped backrest foundation and the horizontal bolster and the U-shaped backrest foundation, the horizontal bolster, and first and second bolster joints cooperate to define the backrest aperture.

4. The vehicle seat of claim 3, wherein the a backrest sheet provides the front face of the backrest cover and is located in spaced-apart relation from the forward surface of the backrest frame, and the backrest cushion provides the rear face of the backrest cover and is located between the backrest frame and the backrest sheet.

5. The vehicle seat of claim 3, wherein the composite materials of the backrest frame include a frame body made from a continuous fiber reinforced sheet and a skin made from a plastics materials, the skin is located between the frame body and the backrest cover and provides the forward surface of the backrest frame.

6. The vehicle seat of claim 1, wherein the backrest frame includes a U-shaped backrest foundation coupled to the seat bottom by the backrest mount, a horizontal bolster spaced apart from the U-shaped backrest foundation to locate the U-shaped backrest foundation between the seat bottom and the horizontal bolster, and first and second bolster joints interconnecting and the U-shaped backrest foundation and the horizontal bolster.

7. The vehicle seat of claim 6, wherein the backrest foundation includes a backrest base, a first upright bolster arranged to extend between and interconnect the first bolster joint and a first end of the backrest base, and a second upright bolster spaced apart from the first bolster joint and arranged to extend between and interconnect the second bolster joint and an opposite second end of the backrest base.

8. The vehicle seat of claim 7, wherein the U-shaped backrest foundation, the horizontal bolster, and first and second bolster joints cooperate to define a backrest aperture formed in the backrest frame.

9. The vehicle seat of claim 8, wherein the seat back further includes a headrest adapted to support a head of an occupant resting on the vehicle seat, coupled to the backrest to extend away from the seat bottom and to locate the backrest between the headrest and the seat bottom.

10. The vehicle seat of claim 9, wherein the headrest includes a headrest frame made from composite material and having a forward surface adapted to face toward an occupant and an opposite rear surface arranged to face opposite the forward surface of the headrest frame and a headrest cover coupled to the headrest frame and having a rear face arranged to face toward and cover the forward surface of the headrest frame and a front face arranged to face opposite the rear face of the headrest cover.

11. The vehicle seat of claim 10, wherein the headrest frame and the backrest frame cooperate with the headrest frame to establish a monolithic seat-back frame included in the vehicle seat.

12. The vehicle seat of claim 1, wherein the backrest cover further includes an outer cover mount arranged to interconnect the backrest sheet and the backrest cushion and the outer cover mount interconnects the backrest sheet and the backrest cushion to the opposite rear surface of the backrest frame to cause the backrest cover to cover the forward surface of the backrest frame and extend from the opposite rear surface of the backrest frame to the backrest aperture formed in the backrest.

13. The vehicle seat of claim 1, wherein the composite materials of the backrest frame include a frame body made from a continuous fiber reinforced sheet and a skin made from plastics materials.

14. The vehicle seat of claim 13, wherein the skin is located between the frame body and the backrest cover and provides the forward surface of the backrest frame.

15. The vehicle seat of claim 14, wherein the inner cover mount is provided by the skin of the backrest frame.

16. The vehicle seat of claim 13, wherein the backrest mount includes a pair of bushings coupled to associated bushing receivers formed in the backrest frame to cause the pair of bushings to extend through the backrest frame from the forward surface to the opposite rear surface.

* * * * *